(12) United States Patent
Almenawer et al.

(10) Patent No.: US 12,019,640 B2
(45) Date of Patent: Jun. 25, 2024

(54) SYSTEMS AND METHODS FOR MULTI-DIMENSIONAL RANKING OF EXPERTS

(71) Applicant: RYTE CORPORATION, Toronto (CA)

(72) Inventors: Saleh Almenawer, Toronto (CA); Serge Bouissou, Toronto (CA)

(73) Assignee: Ryte Corporation, Toronto (CA)

( * ) Notice: Subject to any disclaimer, the term of this patent is extended or adjusted under 35 U.S.C. 154(b) by 0 days.

(21) Appl. No.: 18/353,585

(22) Filed: Jul. 17, 2023

(65) Prior Publication Data
US 2024/0054139 A1 Feb. 15, 2024

Related U.S. Application Data

(63) Continuation of application No. 17/886,588, filed on Aug. 12, 2022, now Pat. No. 11,748,361.

(51) Int. Cl.
| | |
|---|---|
| *G06F 16/00* | (2019.01) |
| *G06F 16/242* | (2019.01) |
| *G06F 16/2457* | (2019.01) |
| *G06F 16/28* | (2019.01) |

(52) U.S. Cl.
CPC .... *G06F 16/24578* (2019.01); *G06F 16/2428* (2019.01); *G06F 16/285* (2019.01)

(58) Field of Classification Search
CPC .......................... G06F 16/285; G06F 16/24578
USPC ........................................................ 707/723
See application file for complete search history.

(56) References Cited

U.S. PATENT DOCUMENTS

| | | | |
|---|---|---|---|
| 8,852,549 B2 * | 10/2014 | Virnig | C22B 3/30 423/24 |
| 8,892,549 B1 | 11/2014 | Thakur | |
| 2006/0047615 A1 * | 3/2006 | Ravin | G06N 5/022 706/50 |
| 2016/0132608 A1 * | 5/2016 | Rathod | H04W 4/21 707/722 |
| 2017/0161625 A1 * | 6/2017 | Jannson | G06N 7/01 707/707 |

(Continued)

OTHER PUBLICATIONS

Document received in relation to PCT Application No. PCT/CA2023/051034 mailed on Oct. 15, 2023 (International Search Report and Written Opinion), 12 pages.

*Primary Examiner* — Alexandria Y Bromell
(74) *Attorney, Agent, or Firm* — Bennett Jones LLP

(57) ABSTRACT

Various embodiments are provided herein for systems and methods for real-time, or near real-time, multi-dimensional ranking of experts. In at least one embodiment, receiving one or more evaluation datasets; for each given evaluation dataset, associating the evaluation dataset with: (i) at least one evaluation data category, (ii) at least one taxonomy category, and (iii) at least one expert of the plurality of experts; subsequently, receiving one or more search filter criteria for ranking at least a subset of the plurality of experts; generating a ranking of the at least subset of the plurality of experts, wherein the ranking is based on the search filter criteria, and is further generated based on the associations determined for each evaluation dataset; and displaying, on a user interface, at least a portion of the plurality of rankings as the multi-dimensional ranking of the plurality of experts.

20 Claims, 33 Drawing Sheets

(56) References Cited

U.S. PATENT DOCUMENTS

| | | | |
|---|---|---|---|
| 2020/0265520 A1* | 8/2020 | Cunningham | G06Q 10/067 707/707 |
| 2022/0245574 A1* | 8/2022 | Cella | G06Q 10/087 707/707 |
| 2023/0176557 A1* | 6/2023 | Cella | G05B 23/024 700/117 |

* cited by examiner

| Rank | First Name | Last Name | Title | Department | Institution | City | Country |
|---|---|---|---|---|---|---|---|
| 1 | Emily | Smith | MD | Surgery | Mayo Clinic | Rochester | United States |
| 2 | Christopher | Lopez | MD | Oncology | Singapore General Hospital | Singapore | Singapore |
| 3 | Alex | Zhang | MD, PhD | Pediatrics | Brigham and Women's Hospital | Boston | United States |
| 4 | Tim | Park | MBBS | Geriatrics | Toronto General Hospital | Toronto | Canada |
| ... | | | | | | | |

632

Dr. Emily Smith, MD
Mayo Clinic, Rochester, United States
Surgery, Oncology, Medical Devices Dr. Emily Smith is a surgeon in the surgery department of the Mayo Clinic. Dr. Emily Smith has over 20 years of experience. Dr. Emily Smith has published over 100 papers related to surgery. ...

630b

| Institution | Rank |
|---|---|
| John Hopkins | 1 |
| Harvard Medical School | 2 |
| Cleveland Clinic | 3 |
| Mayo Clinic | 4 |
| ... | ... |

630c

| Country | Rank |
|---|---|
| Boston | 1 |
| New York | 2 |
| Toronto | 3 |
| Seoul | 4 |
| ... | ... |

630d

| City | Rank |
|---|---|
| United States | 1 |
| Germany | 2 |
| China | 3 |
| Switzerland | 4 |
| ... | ... |

640

610

- Disease
  - Search...
  - ☐ Gastritis
  - ☐ Glaucoma
  - ☒ Glioblastoma
  - ☐ Granulomatosis
  - ...
- Procedure
  - Search...
  - ☐ Surgery
  - ☐ Radiation Therapy
  - ☒ Craniotomy
  - ☐ Drug Therapy
  - ...
- Specialty +
- Outcome +
- Reviews +
- Awards +
- Clinical Trials +
- Publications +
- ...

FIG. 10L

SYSTEMS AND METHODS FOR MULTI-DIMENSIONAL RANKING OF EXPERTS

CROSS-REFERENCE TO RELATED APPLICATION

This application is a continuation of U.S. patent application Ser. No. 17/886,588, filed on Aug. 12, 2022. The entire contents of the applications are hereby incorporated by reference.

FIELD

The described embodiments generally relate to identifying, rating, and ranking experts and, in particular, to generating multi-dimensional rankings of experts, e.g., real-time, or near real-time.

BACKGROUND

The following is not an admission that anything discussed below is part of the prior art or part of the common general knowledge of a person skilled in the art.

Many types of users frequently rely on rankings of experts to inform important decisions. For example, a patient may rely on a ranking of medical professionals to decide which medical professional will treat their medical condition. As another example, a lawyer may rely on a ranking of expert witnesses to decide which expert witness to retain to testify at trial. As a further example, a program manager may rely on a ranking of engineers to select an engineer to design a technical system.

Inaccurate rankings of experts can have significant consequences for these example users. However, it can be difficult to generate an accurate ranking of experts. Manual, or non-computer-generated, rankings are often subjective, inaccurate, or rely on small datasets. Further, manual or non-computer generated rankings cannot generate and update rankings, in real-time or near real-time, based on newly available data.

In contrast, computer-implemented methods may process larger quantities of data as compared to manual methods. Nevertheless, existing computer-implemented methods often struggle to handle and efficiently parse through large datasets to rank experts. Such processing may be computationally intensive and may require large quantities of computer resources, especially when processed inefficiently. As a result, many conventional computer-implemented methods result in inaccurate rankings of experts that fail to consider various expert data. Further, many existing computer-implemented methods may fail to leverage computing technology to generate and update rankings in real-time or near real-time based on newly available data, especially when dealing with the domain of large volumes of newly available data.

SUMMARY OF VARIOUS EMBODIMENTS

The following introduction is provided to introduce the reader to the more detailed discussion to follow. The introduction is not intended to limit or define any claimed or as yet unclaimed invention. One or more inventions may reside in any combination or sub-combination of the elements or process steps disclosed in any part of this document including its claims and figures.

In at least one broad aspect, there is provide a method for generating a multi-dimensional ranking of a plurality of experts, in real-time or near real-time, the method comprising: receiving one or more evaluation datasets; for each given evaluation dataset, associating the evaluation dataset with: (i) at least one evaluation data category, (ii) at least one taxonomy category, and (iii) at least one expert of the plurality of experts; subsequently, receiving one or more search filter criteria for ranking at least a subset of the plurality of experts; generating a ranking of the at least subset of the plurality of experts, wherein the ranking is based on the search filter criteria, and is further generated based on the associations determined for each evaluation data set; and displaying, on a user interface, at least a portion of the plurality of rankings as the multi-dimensional ranking of the plurality of experts.

In at least some embodiments, generating the rankings based on the search filter criteria further comprises: identifying one or more taxonomy categories associated with the search filter criteria; for each of the one or more identified taxonomy category, determining a set of relevant taxonomy-specific evaluation data that is associated with that taxonomy category; for each given expert, of the plurality of experts, and in relation to each of the identified taxonomy categories: identifying a set of expert-specific evaluation data associated with that taxonomy category, wherein the set of expert-specific evaluation data corresponds to a portion of the taxonomy-specific evaluation data associated with the given expert; identifying one or more evaluation data categories associated with the taxonomy category; determining, in relation to each of the one or more evaluation data categories, a corresponding category-specific score, wherein the category-specific score is determined by analyzing expert-specific evaluation data associated with that evaluation data category; determining a taxonomy score, for the taxonomy category, wherein the taxonomy score is generated by combining the one or more category-specific scores; determining an expert-specific score by combining the taxonomy scores for each of the one or more taxonomy categories; and generating the rankings based on the expert-specific scores.

In at least some embodiments, wherein each taxonomy score is generated using a weighted-combination of each of the one or more category-specific scores and is based on the importance of the respective evaluation data category to the rankings.

In at least some embodiments, the weighted bias measures are user selectable.

In at least some embodiments, each expert-specific score is generated using a weighted-combination of each of the taxonomy scores.

In at least some embodiments, determining the category-specific scores, for each evaluation data category, comprises: determining one or more data-specific scores, each data-specific score being determined for a separate evaluation dataset associated with the evaluation data category; and determining the category-specific score as a weighted or un-weighted combination of the data-specific scores.

In at least some embodiments, determining the data-specific scores comprises: identifying one or more evaluation data dimensions associated with the evaluation data category; for each evaluation data dimension: identifying one or more assessment factors; for each assessment factor, determining a respective factor score; determining a dimension score, for that evaluation data dimension, using a weighted or un-weighted combination of the factor scores; determining the data-specific score using a weighted or un-weighted combination of the dimension scores, for each evaluation data dimension.

In at least some embodiments, determining the one or more taxonomy categories associated with the search filter criteria is based on a one-to-one mapping between each search filter criteria and a corresponding taxonomy category.

In at least some embodiments, determining the one or more taxonomy categories associated with the search filter criteria comprises, for a given search filter criteria: determining at least one primary taxonomy category associated with the search filter criteria; and determine at least one secondary taxonomy category related to the at least one primary taxonomy category, wherein the determining of the at least one taxonomy category is based on a pre-defined relational model.

In at least some embodiments, the method further comprises receiving search limiting criteria to further limit of the scope of the rankings.

In at least one embodiment, the method further comprises performing disambiguation and normalization using trained machine learning models.

In at least some embodiments, there is provided a system for generating a multi-dimensional ranking of a plurality of experts in real-time or near real-time, the system comprising: at least one data storage operable to store evaluation data associated with the plurality of experts; at least one processor in electronic communication with the at least one data storage, the at least one processor being operable to perform the method for generating a multi-dimensional ranking of a plurality of experts, in real-time or near real-time, the method comprising: receiving one or more evaluation datasets; for each given evaluation dataset, associating the evaluation dataset with: (i) at least one evaluation data category, (ii) at least one taxonomy category, and (iii) at least one expert of the plurality of experts; subsequently, receiving one or more search filter criteria for ranking at least a subset of the plurality of experts; generating a ranking of the at least subset of the plurality of experts, wherein the ranking is based on the search filter criteria, and is further generated based on the associations determined for each evaluation data set; and displaying, on a user interface, at least a portion of the plurality of rankings as the multi-dimensional ranking of the plurality of experts.

In at least some embodiments, there is provided a non-transitory computer-readable medium storing executable programmable instructions, which when executed by at least one processor, are configurable to cause the at least one processor to perform the method for generating a multi-dimensional ranking of a plurality of experts in real-time or near real-time, the system comprising: at least one data storage operable to store evaluation data associated with the plurality of experts; at least one processor in electronic communication with the at least one data storage, the at least one processor being operable to perform the method for generating a multi-dimensional ranking of a plurality of experts, in real-time or near real-time, the method comprising: receiving one or more evaluation datasets; for each given evaluation dataset, associating the evaluation dataset with: (i) at least one evaluation data category, (ii) at least one taxonomy category, and (iii) at least one expert of the plurality of experts; subsequently, receiving one or more search filter criteria for ranking at least a subset of the plurality of experts; generating a ranking of the at least subset of the plurality of experts, wherein the ranking is based on the search filter criteria, and is further generated based on the associations determined for each evaluation data set; and displaying, on a user interface, at least a portion of the plurality of rankings as the multi-dimensional ranking of the plurality of experts.

BRIEF DESCRIPTION OF THE DRAWINGS

Several embodiments will be described in detail with reference to the drawings, in which:

FIG. 6A is a screenshot of an example user interface for displaying multi-dimensional rankings of experts, in accordance with an example embodiment;

Figure 1:
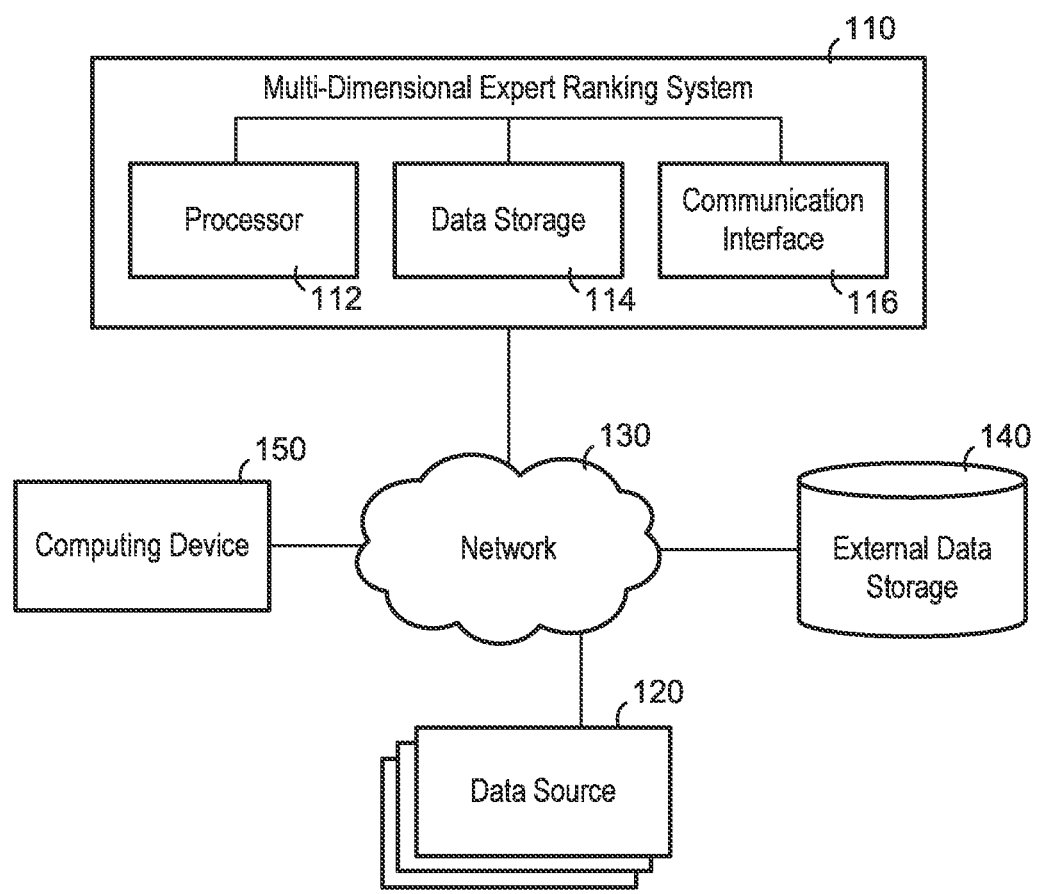
FIG. 1 is a block diagram of components interacting with an example system for generating multi-dimensional rankings of experts, in accordance with an example embodiment.

The drawings, described below, are provided for purposes of illustration, and not of limitation, of the aspects and features of various examples of embodiments described herein. For simplicity and clarity of illustration, elements shown in the drawings have not necessarily been drawn to scale. The dimensions of some of the elements may be exaggerated relative to other elements for clarity. It will be appreciated that for simplicity and clarity of illustration, where considered appropriate, reference numerals may be repeated among the drawings to indicate corresponding or analogous elements or steps.

DESCRIPTION OF EXAMPLE EMBODIMENTS

Various systems or methods will be described below to provide an example of an embodiment of the claimed subject matter. No embodiment described below limits any claimed subject matter and any claimed subject matter may cover methods or systems that differ from those described below. The claimed subject matter is not limited to systems or methods having all of the features of any one system or method described below or to features common to multiple or all of the apparatuses or methods described below. It is possible that a system or method described below is not an embodiment that is recited in any claimed subject matter. Any subject matter disclosed in a system or method described below that is not claimed in this document may be the subject matter of another protective instrument, for example, a continuing patent application, and the applicants, inventors or owners do not intend to abandon, disclaim or dedicate to the public any such subject matter by its disclosure in this document.

1. General Overview

Referring now to FIG. 1, there is shown an example system 110 for generating multi-dimensional rankings of experts.

The experts ranked by the system 110 can be any professionals, specialists, or other authorities, including, but not limited to, medical doctors, nurses, dentists, veterinarians, pharmacists, physiotherapists, engineers, lawyers, accountants, professors, chefs, etc. The experts may be located anywhere in the world such that the rankings are global in scope.

Multi-dimensional ranking system 110 can provide a user with rankings of experts according to various criteria (herein referred to as "search filter criteria"). The search filter criteria can depend on the type of expert to be ranked. For example, the multi-dimensional ranking system 110 may generate a ranking of the top medical doctors for treating a particular medical condition. As another example, the multi-dimensional ranking system 110 may generate a ranking of the top engineers for designing a particular type of technical system.

An advantage of the multi-dimensional ranking system 110 is that a user can select various search filter criteria by which to rank the experts. Hence, the multi-dimensional ranking system 110 can be employed in a wide variety of use cases.

As an example use case, a multidisciplinary tumor board may require a team of medical professionals, such as a radiologist, oncologist, surgeon, chemotherapist, immunologist, etc. Depending on the patient's treatment plan, some of these medical professionals may be required to be located relatively close to the patient, while other medical professionals may be able to be located anywhere in the world. In this case, the multi-dimensional ranking system 110 can be used to rank medical professionals based on both their specialty and location.

As another example, a journal publisher may use the multi-dimensional ranking system 110 to determine the top experts in a particular field to conduct peer review of paper submissions. As a further example, a journalist may use the multi-dimensional ranking system 110 to determine the top experts to interview for a particular story. As still another example, a university, hospital, or ministry of health may use the multi-dimensional ranking system 110 to determine the top medical doctors or researchers to employ for a particular position.

The multi-dimensional ranking system 110 can generate the multi-dimensional rankings of experts based on a variety of different types, or categories, of data associated with the experts (herein referred to as "evaluation data categories").

For example, based on the particular expert field, the evaluation data categories may include, but are not limited to, publications authored by the experts, institutions affiliated with the experts, credentials held by the experts, reviews of the experts, outcomes associated with the experts, social media content regarding the experts, etc.

The multi-dimensional ranking system 110 can generate rankings of experts using various machine-learned or artificial intelligence (AI) models (herein referred to as AI engines) that process the evaluation data to determine the rankings. The AI engines can be used to process large datasets in an efficient manner. As a result, the multi-dimensional ranking system 110 can generate complex and accurate rankings that consider a wide variety of expert factors.

The AI engines described herein can be any type of machine-learned or AI models. For example, the AI engines may include artificial neural networks, decision trees, support-vector machines, regression models, Bayesian networks, genetic algorithms, and the like.

Preferably, the AI engines are trained based on training data to make predictions or decisions without being explicitly programmed to do so. The AI engines can be trained using supervised learning, unsupervised learning, reinforcement learning, etc.

In various embodiments, the AI engines may utilize various natural language processing and sentiment analysis techniques. For example, the AI engines may parse, classify, and extract information from the evaluation data. As another example, the AI engines may be used to translate data into different languages. As a further example, the AI engines may assign or adjust scores or weights to generate rankings of experts.

It should be appreciated that the AI engines described herein may be combined into fewer AI engines or divided into additional AI engines. For example, a first AI engine and a second AI engine may be a single AI engine, or the first AI engine may be made up of multiple AI engines.

The multi-dimensional ranking system 110 can generally be implemented using various hardware, or a combination of hardware and software. For example, the multi-dimensional ranking system 110 may be implemented using an electronic tablet device, a personal computer, workstation, server, portable computer, mobile device, personal digital assistant, laptop, smart phone, WAP phone, or any combination of these. In some embodiments, the multi-dimensional ranking system 110 may be implemented using two or more computers distributed over a wide geographic area and connected through a network.

As shown, the multi-dimensional ranking system 110 can include a processor 112, a data storage 114, and a communication interface 116. Each of these components may be divided into additional components or combined into fewer components. In some embodiments, two or more of the components may be distributed over a wide geographic area and connected through a network.

Processor 112 can be implemented with any suitable processor, controller, digital signal processor, graphics processing unit, application specific integrated circuits (ASICs), and/or field programmable gate arrays (FPGAs) that can provide sufficient processing power for the configuration, purposes and requirements of the multi-dimensional ranking system 110. The processor 112 can include more than one processor with each processor being configured to perform different dedicated tasks. The processor 112 can execute various instructions stored in the data storage 114 to implement the various multi-dimensional ranking methods described herein. For example, the processor 112 may be configured to process various evaluation data using various AI engines to determine the multi-dimensional rankings of experts.

Data storage 114 can include RAM, ROM, one or more hard drives, one or more flash drives or some other suitable data storage elements such as disk drives. The data storage 114 may be used to store an operating system that provides various basic operational processes for the processor 112. The data storage 114 may include one or more databases, such as a relational database (e.g., a SQL database), for example. The data storage 114 can store instructions that can be executed by the processor 112 to implement the various multi-dimensional ranking methods described herein.

The data storage 114 can also store various data used or generated by the multi-dimensional ranking methods described herein, such as various publication, affiliation, credential, review, and/or outcome data. The data storage 114 can also store the various AI engines used to process such data to generate the multi-dimensional rankings of experts.

Communication interface 116 can include any interface that enables the multi-dimensional ranking system 110 to communicate with other devices and systems. The communication interface 116 can include at least one of a serial port, a parallel port or a USB port, in some embodiments. The communication interface 116 may also include an interface to a component via one or more of a Bluetooth, WiFi, Internet, Local Area Network (LAN), Ethernet, Firewire, modem, fiber, or digital subscriber line connection.

Various combinations of these elements may be incorporated within the communication interface 116. For example, the communication interface 116 may receive input from various input devices, such as a mouse, a keyboard, a touch screen, a thumbwheel, a track-pad, a track-ball, a card-reader, voice recognition software and the like depending on the requirements and implementation of the multi-dimensional ranking system 110.

As shown, the multi-dimensional ranking system 110 can be in communication with various components through the network 130, including, but not limited to, data sources 120, an external data storage 140, and a computing device 150.

Network 130 may be any network capable of carrying data, including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g., Wi-Fi, WiMAX), SS7 signaling network, fixed line, local area network, wide area network, and others, including any combination of these, capable of interfacing with, and enabling communication between, the multi-dimensional ranking system 110 and various components.

External data storage 140 can store various data associated with the operation of the multi-dimensional ranking system 110, similar to the data storage 114. For example, various data associated with multi-dimensional rankings of experts may be stored on the external data storage 140 for retrieval by the multi-dimensional ranking system 110 or the computing device 150. In some embodiments, the external data storage 140 may store older, or less frequently used data as compared the data storage 114.

Computing device 150 may be any networked device operable to connect to the network 130. A networked device is a device capable of communicating with other devices through a network, such as the network 130. A network device may couple to the network through a wired or wireless connection. The computing device 150 may include at least a processor and memory, and may be an electronic tablet device, a personal computer, workstation, server, portable computer, mobile device, personal digital assistant, laptop, smart phone, WAP phone, an interactive television, video display terminals, gaming consoles, and portable electronic devices or any combination of these.

The computing device 150 may be operated by a user to access various services provided by the multi-dimensional ranking system 110. For example, the computing device 150 may be operated by a user to view various rankings of experts. Although only a single computing device 150 is shown in the illustrated example, it should be appreciated that there may be any number of computing devices 150. To this end, in some cases, the system 110 may be hosted directly on the computing device 150. In other cases, the system 110 is hosted externally (e.g., on a remote server).

Data sources 120 can generally include any source of evaluation data for the multi-dimensional ranking system 110. For example, the data sources 120 may include Internet databases of publications, such as PubMed®, Science Direct®, Google Scholar®, etc. The data sources 120 may include various publicly available information sources, such as websites, social media platforms, review services, etc. In some embodiments, the data sources 120 may include private, restricted, or "paywalled" data sources, such as scientific journals, clinical outcome databases, etc.

Although only three data sources 120 are shown in the illustrated example, it should be appreciated that there may be any number of data sources 120. In some embodiments, there may be only one data source 120. In some embodiments, the data sources 120 may be integrated into the data storage 114, computing device 150, or external data storage 140.

Data sources 120 can include many different types of data sources that store many different types of evaluation data. In other words, the data sources 120 may be disparate and contain heterogenous datasets. For example, data sources 120 may be located in different countries and may contain data that is stored in different languages. The data sources 120 may include various search engines, databases, or websites.

In operation, the multi-dimensional ranking system 110 can retrieve, or automatically receive, various evaluation data from the data sources 120. For example, the multi-dimensional expert system 110 may use one or more application programming interfaces (API) to retrieve the evaluation data from the online data sources 120. The multi-dimensional expert system 110 can then process the evaluation data using various AI engines to generate the multi-dimensional rankings of experts.

In at least some embodiments, the evaluation data may be transmitted to the multi-dimensional ranking system 110 in response to a request from the system 110. For example, the system 110 may transmit a request to known data sources (e.g., website, etc.) providing known evaluation data. In other cases, the data may be transmitted automatically, from the data source 120—e.g., continuously or at pre-defined frequency or time intervals.

Transmission of data, from the data sources 120 to the system 110, may occur in real-time or near real-time. That is, as new evaluation data is made available on the respective data sources, the data sources may automatically transmit (e.g., "push") the evaluation data to the system 110. Accordingly, the system 110 is able to receive a stream of up-to-date evaluation data. In other cases, the up-to-date evaluation data is made available upon request from the system 110.

II. Example Evaluation Data Categories

As discussed above, system 110 may receive and/or retrieve evaluation data from a number of data sources 120. The evaluation data is then analyzed to rate and rank various experts.

It has been appreciated, however, that a challenge in enabling the system to rate or rank experts is allowing the system to analyze large volumes of data received from a multitude of data sources 120, for a multitude of experts. As the number of experts increases, the volume of data—that is required to be processed by the system—also exponentially increases.

Accordingly, in at least one embodiment herein, system 110 may initially categorize the received data into one or more evaluation data categories (e.g., based on the data type). This may simplify the analysis of the large volume of data and, in turn, enhance the data processing efficiency of the system 110. For example, the system can generate rankings for large numbers of experts with faster computational speeds.

To this end, by enabling the system 110 to generate rankings for large numbers of experts with fast computational speed, the value of the system to the end-user is increased. That is, the end-user can rely on the system to immediately rank all potential experts, and identify the top experts in any relevant field, with minimal computing processing latency. For example, a display GUI of the computer can update with minimal delay or latency to show top experts in response to a user search query.

Figure 2:
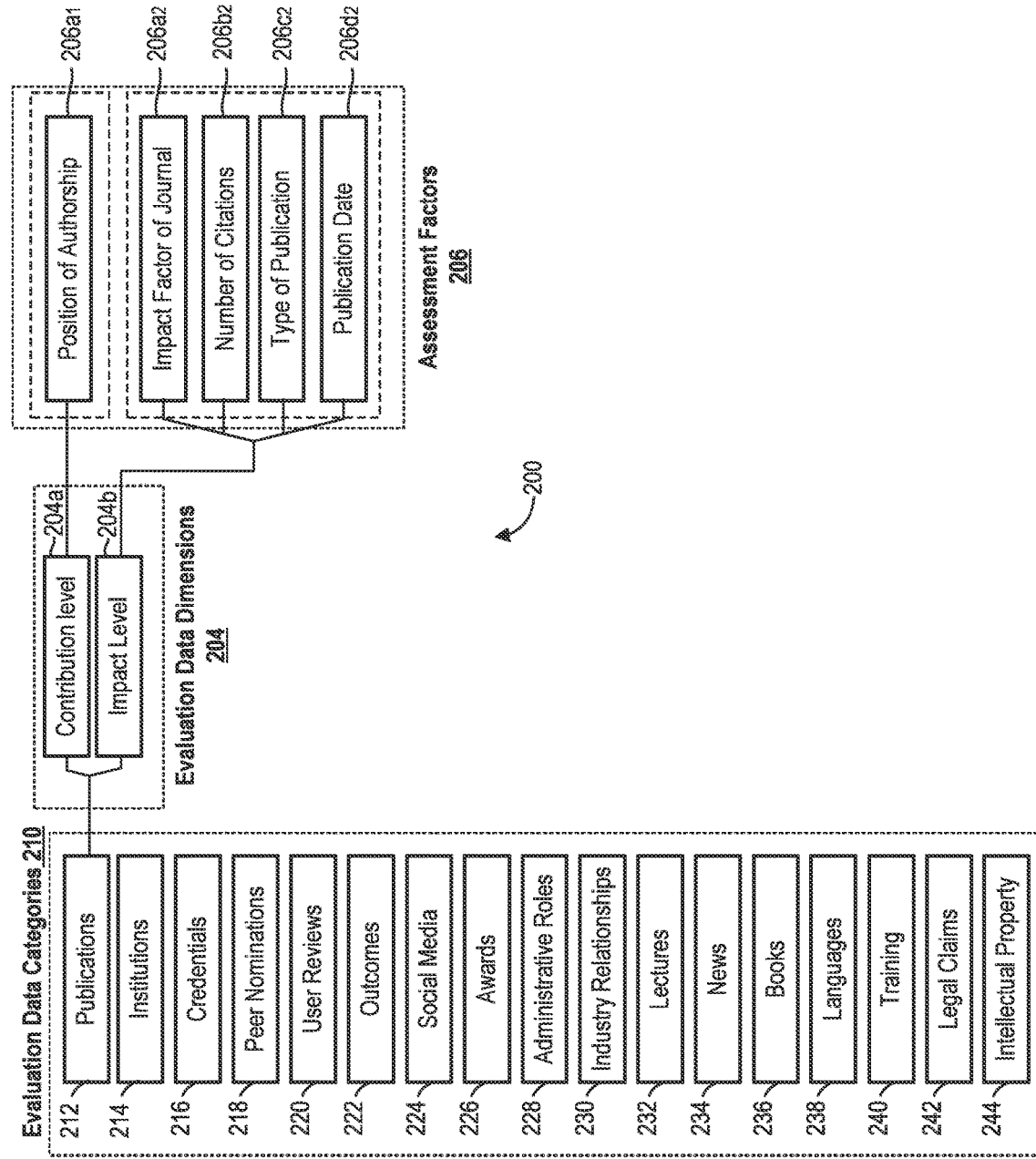
FIG. 2 is a simplified block diagram of various example evaluation data categories, evaluation data dimensions and assessment factors, in accordance with an example embodiment.

Referring now to FIG. 2, there is shown a simplified illustration of various evaluation data categories 210 used for categorizing received evaluation data.

Evaluation data categories 210 in FIG. 2 are provided for an example application involving identifying, rating and ranking medical experts. However, the same concept may be applied to other applications and ranking systems (e.g., using different evaluation data categories 210).

As shown, in at least one example application, the evaluation data categories 210 can include, by way of non-limiting examples: publication data 212, institution data 214, credential data 216, peer nomination data 218, user review data 220, outcome data 222, social media data 224, award data 226, administrative role data 228, industry relationship data 230, lecture data 232, news data 234, book data 236, language data 238, training data 240, legal claims data 242, and intellectual property data 244.

Accordingly, evaluation data received from data sources 120 may be analyzed and associated with at least one of these categories. It will be understood that these categories are only presented herein by way of example, and more or less categories may be introduced.

Considering the example evaluation data categories now, in more detail:

Publication data 212 may include any evaluation data associated with any publications, journal papers, technical articles, etc. authored or co-authored by an expert. For example, the publication data 212 for a medical doctor may include various research papers published by that medical doctor. The publication data 212 may include the content (e.g., text, figures, equations, etc.) of the publications as well as bibliographic information of the authors of the publications. The publication data 212 may also include other types of publications, such as books, bulletins, newsletters, magazine articles, newspaper articles, blog posts, or any other publications associated with an expert.

Institution data 214 may include any evaluation data associated with any affiliations, departments, foundations, or other institutions associated with an expert. For example, the institution data 214 for a medical doctor may include a hospital, department, and/or research group affiliated with that medical doctor. In particular, the institution data can comprise the corpus of information available on an institution's website, with respect to a particular expert (e.g., such as what is made available on a university hospital's website regarding a doctor, such as by way of personal and professional biographical data as well as previous experiences, accolades, published work, etc.). In some embodiments, the institution data 214 may be derived from the publication data 212.

Credential data 216 may include any data associated with any licenses, degrees, diplomas, certificates, certifications, or any other credentials held by an expert. For example, the credential data 216 for a medical doctor may include their doctorate degree, such as a Doctor of Medicine (MD), Doctor of Osteopathic Medicine (DO), Bachelor of Medicine, Bachelor of Surgery (MBBS, MB ChB, BMBS, MB BCh, MB BCHhir, or BM CH), etc. The credential data 216 for a medical doctor may also include other degrees obtained by the medical doctor, such as a bachelor's degree, master's degree or Doctor of Philosophy. In some embodiments, the credential data 216 may be derived from the publication data 212.

Peer nomination data 218 may include any data associated with any evaluations, assessments, surveys, or other reviews of an expert by his or her peers. For example, the peer nomination data 218 for a medical doctor may include various Ongoing Professional Practice Evaluations (OPPE), Focused Professional Practice Evaluations (FPPE), and the like.

User review data 220 may include any data associated with any evaluations, assessments, surveys, or other reviews of an expert by one or more users. For example, the patient review data 220 for a medical doctor may include online reviews of that medical doctors by his or her patients.

Outcome data 222 may include any data associated with any reports, records, or any other data associated with various outcomes associated with an expert. For example, the clinical outcome data 222 for a medical doctor may include various patient outcome data, such as volume data (e.g., the number of treatments performed by the medical doctor), mortality data (e.g., the number of patients who died during or after a treatment performed by the medical doctor), morbidity data (e.g., the number of side effects or complications related to a treatment performed by the medical doctor), hospitalization data (e.g., the number of patients who were readmitted to a hospital or emergency room after being treated by the medical doctor), and the like.

Social media data 224 may include any data associated with social media content associated with an expert, such as various content from Facebook, Instagram, LinkedIn, Twitter, WeChat, or any other social media platform. For example, the social media data 224 for a medical doctor may include any social media content in which patients, peers, or any other party mentions that medical doctor.

Award data 226 may include any data associated with any accolades, honors, accomplishments, prizes, or any other awards associated an expert. For example, the award data 226 for a medical doctor may include any medicine awards granted to that medical doctor by any hospitals, universities, foundations, companies, or other sponsors.

Administrative role data 228 may include any data associated with any administrative duties, responsibilities, obligations, or other roles that an expert may be responsible for. For example, the administrative role data 228 for a medical doctor may include any hospital administrative duties that are performed by that medical doctor.

Industry relationship data 230 may include any data associated with any industry partnerships, associations, affiliations, or other relationships held by an expert. For example, the industry relationship data 230 for a medical doctor may include any partnerships that medical doctor may have with have with any life sciences, medical device, or pharmaceutical companies.

Lecture data 232 may include any data associated with any lectures, talks, speeches, conferences, or videos associated with an expert. For example, the lecture data 232 for a medical doctor may include any medical conferences at which that medical doctor presented.

News data 234 may include any data associated with any stories, announcements, broadcasts, press releases, mentions, or other news associated with an expert. For example, the news data 234 for a medical doctor may include news stories featuring that medical doctor.

Book data 236 may include any data associated with any books, chapters, or other publications authored or co-authored by an expert. The book data 236 may include the content of the books as well as bibliographic information of the authors of the books. For example, the book data 236 for a medical doctor may include the title, bibliographic information, and full text of any books written by that medical doctor.

Language data 238 may include any data associated with any languages in which an expert may be knowledge, whether written or oral. For example, the language data 238 for a medical doctor may indicate the languages in which that medical doctor is fluent or conversational.

Training data 240 may include any data associated with any certifications, experiences, education, or other training completed by an expert. For example, the training data 240 for a medical doctor may include the completion of any post-graduate medical training programs, such as residency.

Legal claim data 242 may include any data associated with any claims, obligations, debts, burdens, responsibilities, or other legal liabilities associated with an expert. For example, the legal claim data 242 for a medical doctor may indicate any malpractice claims by any patients against that medical doctor.

Intellectual property data 244 may include any data associated with any intellectual property created by or owned by an expert, such as various patents, trademarks, copyrights, etc. For example, the intellectual property data 244 for a medical doctor may include any patents in which that medical doctor is an inventor.

As provided herein, in at least some embodiments, each of these types of evaluation data 210 can be factored in by one or more AI engines to determine the multi-dimensional rankings of experts. Various aspects of each type of evaluation data 210 may be considered by the AI engines.

For example, when processing the publication data 212, an AI engine may factor in the relative importance of a publication and the relative contribution of an author to that publication. In other words, even within a given type of evaluation data 210, a ranking can be considered "multi-dimensional" in the sense that the ranking can be determined based on multiple aspects (e.g., "dimensions") within that type of evaluation data 210.

Various types of evaluation data 210 may be combined into fewer categories or divided into additional categories. The evaluation data 210 may also differ for different types of experts. For example, for an engineer, the data types may not include patient outcome data and may instead include data related to projects that the engineer worked on previously.

III. Example Methods for Multi-Dimensional Ranking of Experts

Figure 3A:
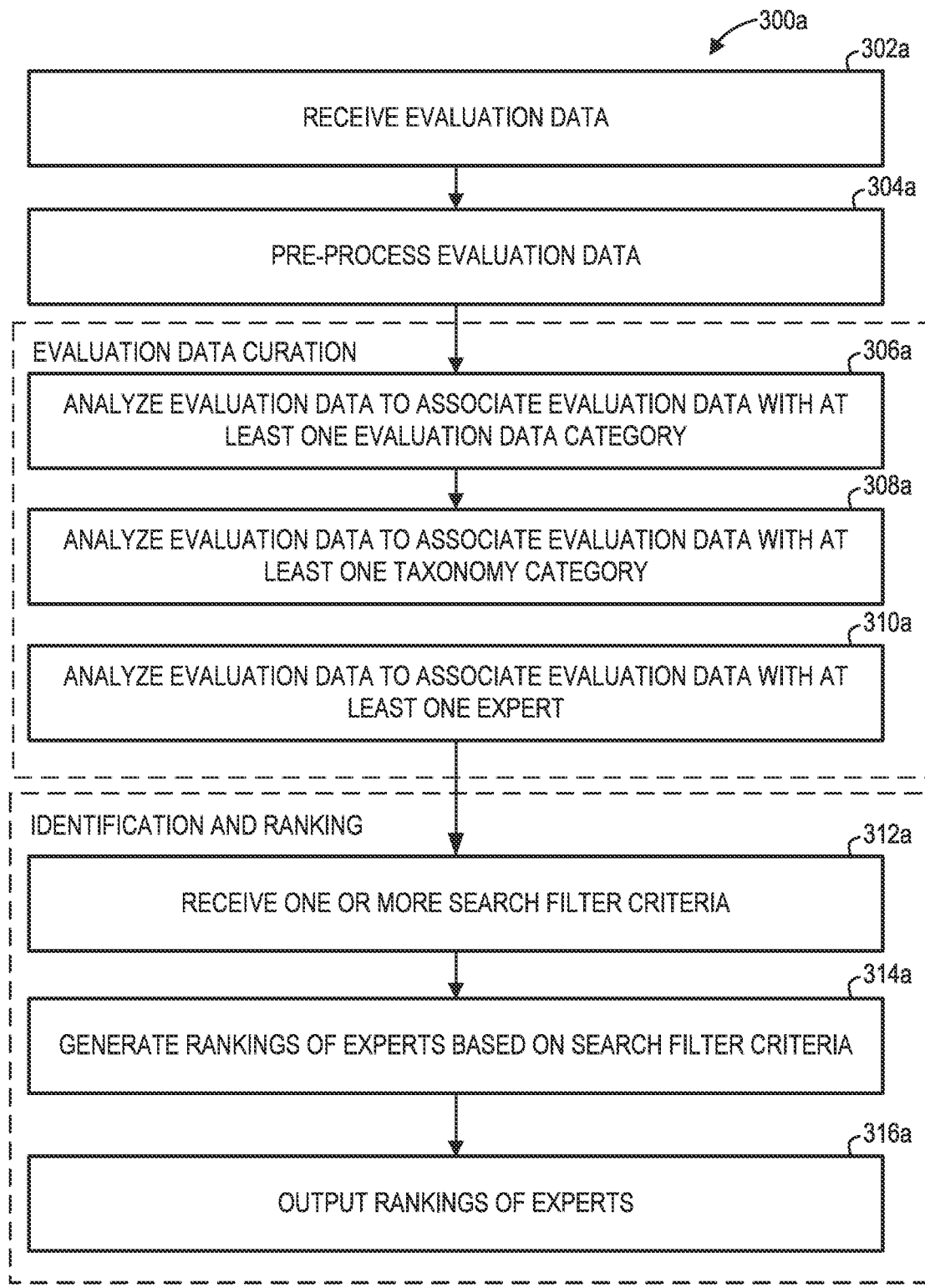
FIG. 3A is a process flow for an example embodiment of a method for generating multi-dimensional rankings of experts, in accordance with an example embodiment.
Figure 3B:
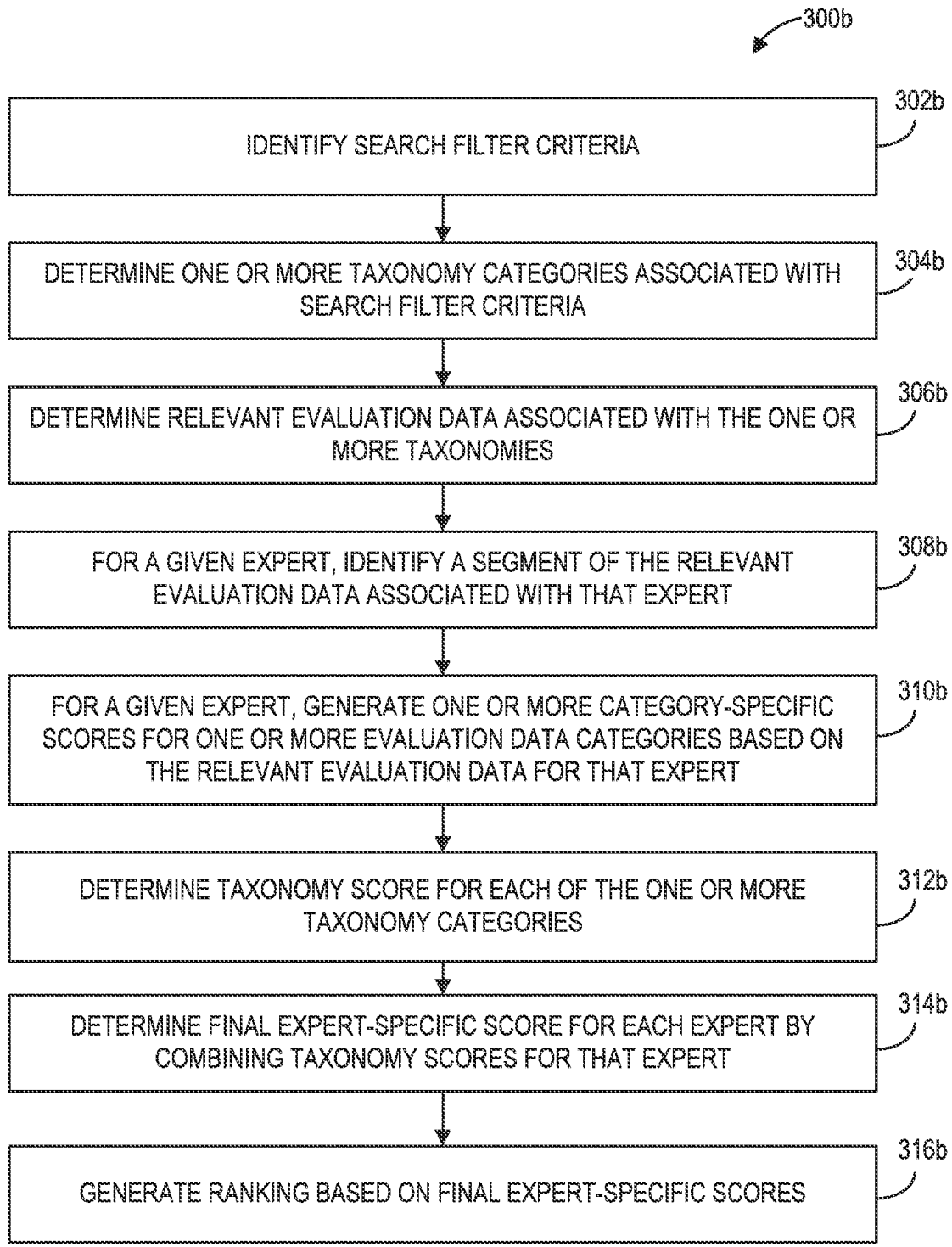
FIG. 3B is a process flow for an example embodiment of a method for generating multi-dimensional rankings of experts, in accordance with some other example embodiments.

FIGS. 3A and 3B show examples methods for multi-dimensional ranking of experts. FIG. 3B shows an example of act 314a (FIG. 3A), in which rankings are generated based on search filter criteria.

Referring now initially to FIG. 3A, there is shown a flowchart of an example method 300a for generating a multi-dimensional ranking of a plurality of experts. The multi-dimensional ranking method 300a can be implemented using the multi-dimensional ranking system 110.

As shown, at 302a, one or more evaluation datasets are received. As described herein, evaluation data can include any data that can be used to generate the multi-dimensional rankings of experts. In at least one embodiment, the rankings can be generated by one or more AI engines.

In at least some embodiments, processor 112 may receive evaluation data (also referred to herein as evaluation dataset(s)) from the data storage 114, external data storage 140, data sources 120, and/or computing device 150.

To this end, the evaluation datasets can originate from a variety of different data sources. For example, evaluation datasets may originate from data sources located in different countries, and may contain data stored in different languages. As noted above, the evaluation datasets may be automatically retrieved from online data sources 120, including online websites and databases via respective APIs.

The evaluation data can be received in a variety of different ways. In some embodiments, the evaluation data can be automatically received. For example, the evaluation data can be automatically retrieved by the processor 112, or automatically transmitted to the processor 112.

As well, the evaluation data can be received on a regular or irregular basis. For example, evaluation data may be automatically requested by the processor 112 every week, every two weeks, etc. In other embodiments, the evaluation data may be received intermittently. In at least some embodiments, the evaluation data may be received in real-time, or near real-time, from the data sources 120. For example, as data becomes available on the data sources 120, it may be automatically transmitted and/or retrieved, in real-time or near real-time, by processor 112.

In at least some embodiments, the evaluation data may only include data associated with specific time periods. For example, the evaluation data may only include publications published within the last 10 years, last 20 years, etc.

At 304a, the evaluation data may be initially pre-processed to generate standardized evaluation data, e.g., evaluation data presented in a standardized format.

For example, as the system retrieves a large volume of data from a variety of data sources, this data may have different forms of expression. For example, the data may be expressed in different languages if the data sources are global in nature.

In at least one embodiment, one or more AI engines can be used to translate the evaluation data. For example, one or more AI engines may be used to translate text to determine institutions or departments affiliated with an expert. Similarly, one or more AI engines may be used to translate the title, abstract, and full text of publications authored by an expert. An advantage of using AI engines to translate the evaluation data is that various technical or scientific terms can be translated accurately.

In some cases, the data pre-processing may also involve standardizing the data file format in which the data is received. Standardizing the received data can increase the efficiency of processing the data.

In some examples, as provided in greater detail herein—the pre-processing may involve applying one or more disambiguation and normalization engines to the data.

Once the evaluation data is received and pre-processed, the remainder of method 300a is broadly segmented into two portions: (i) curation of the standardized evaluation data (acts 306a-310a), and (ii) analyzing and processing of the curated evaluation data for identification and ranking of experts (acts 312a-316a).

Referring initially to the curation of evaluation data (acts 306a-310a): this process organizes and categorizes large volumes of evaluation data such as to enable more efficient data processing when identifying, rating and ranking experts. As explained previously, this is important to enhance the computational speed by which the system is able to parse through large volumes of data, such as to generate expert rankings with minimal processing latency. It also assists in updating a graphical interface, of a user computer, with minimal delay to display requested rankings.

As shown, at 306a, the evaluation data is analyzed to associate the evaluation data with different evaluation data categories.

The evaluation data categories 210 may be analogous to those previously described with reference to FIG. 2. For instance, in some examples involving ranking medical professionals—the evaluation data can be categorized as being publications 212 authored by the medical professionals. For example, the evaluation data may include a plurality of publications. Each publication can have at least one author that is one of the experts in the plurality of experts. However, it should be appreciated that the evaluation data may differ depending on the type of expert to be ranked.

Other evaluation data categories can include, for instance: institutions 214 affiliated with the medical professionals, credentials 216 held by the medical professionals, peer nominations 218 of the medical professionals, patient reviews 220 of the medical professionals, clinical outcomes 222 associated with the medical professionals, social media 224 associated with the medical professionals, etc.

In at least one embodiment, the processor 112 may associate the evaluation data with an evaluation data category 210 by analyzing the actual contents of the evaluation data (e.g., textual or visual contents). For example, the processor 112 can determine that a particular evaluation data is a publication by analyzing the text content. Similarly, the processor 112 can analyze the content of the data to determine that the data is a credential 216, a user review 220, etc.

In other cases, the processor 112 may associate the evaluation data with an evaluation data category 210 based on identifying the data source 120 supplying the data. For instance, data received from specific data sources 120 may be known, ahead of time, to be publication-type data based on the known data sources.

In at least one embodiment, one or more AI engines may be configured to analyze the evaluation data and/or data sources, to associate the evaluation data with an evaluation data category.

With continued reference to FIG. 3A, at 308a, the processor 112 may further analyze the evaluation data to associate the evaluation data with at least one taxonomy category. In some embodiments, this processing may also be performed using one or more AI engines.

Figure 4A:
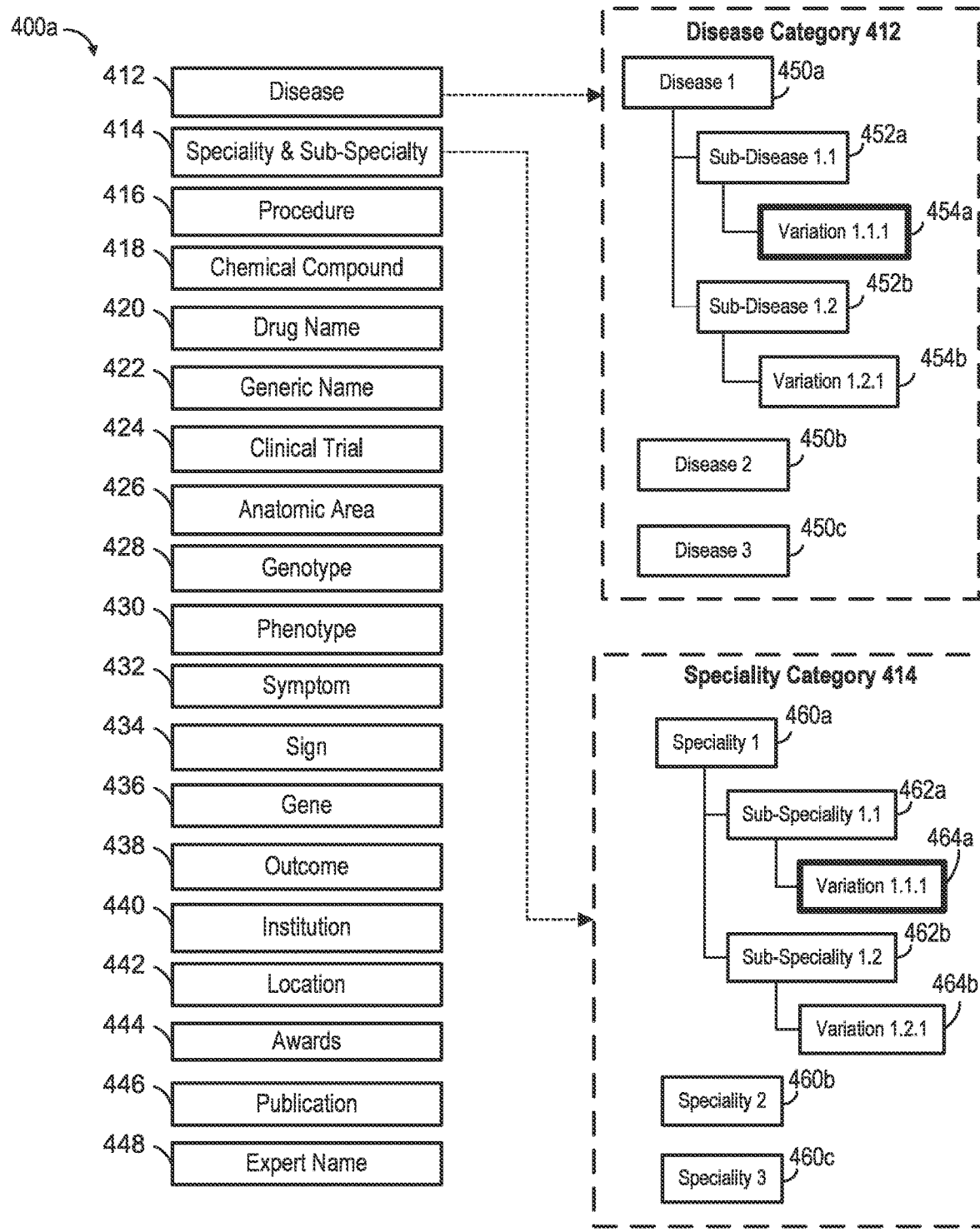
FIG. 4A is a simplified block diagram of various example taxonomy categories and sub-categories, in accordance with an example embodiment.

The various taxonomies categories may vary depending on the type of expert being ranked. To this end, FIG. 4A shows a simplified block diagram 400a of various example taxonomy categories and sub-categories that can be associated with the evaluation data, at act 308a of method 300a (FIG. 3A).

In the illustrated example, the multi-dimensional rankings of experts are rankings of medical doctors, and the taxonomy categories 400a include, for example, diseases 412 and specialties and subspecialties 414.

Diseases 312 may include any type of injury, disability, disorder, syndrome, infection, or any medical condition. For example, the diseases 312 may include various types of cancer, such as glioblastoma. To this end, the diseases category 312 may comprise multiple taxonomy categories (e.g., for different types of diseases 450a, 450b, 450c). Further, within each disease category 450, there may be multiple taxonomy sub-categories (e.g., for sub-diseases 452a, 452b).

Figure 4B:
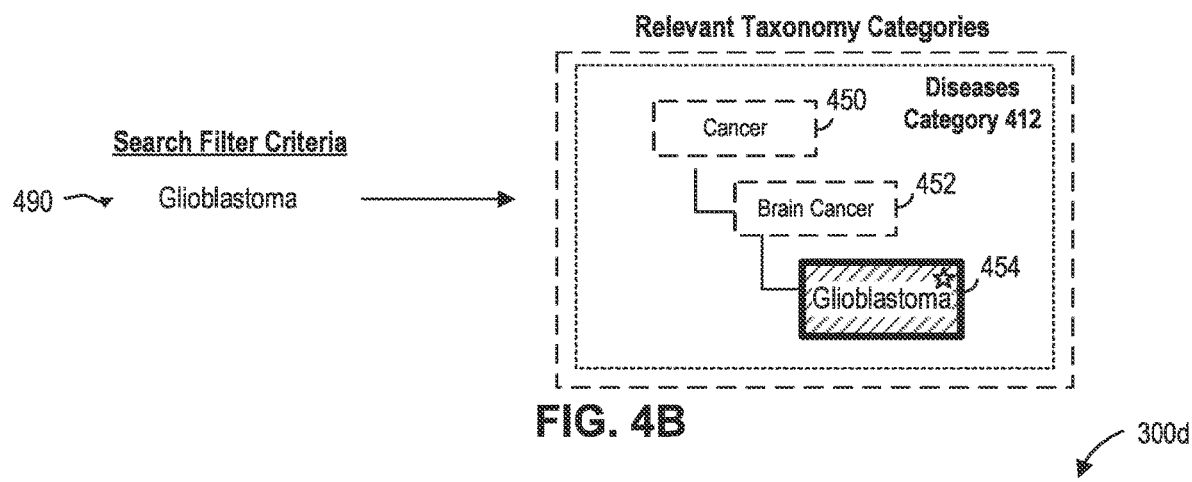
FIG. 4B is an example of identifying taxonomy categories associated with a search filter criteria.
Figure 4C:
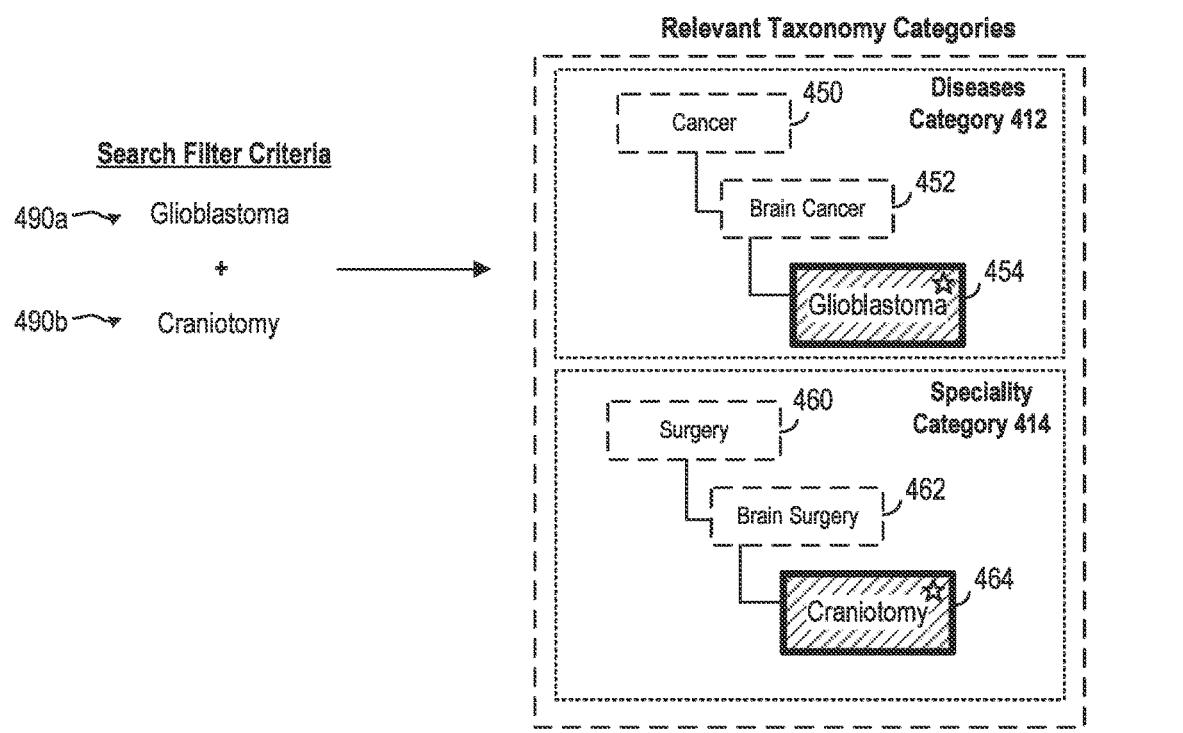
FIG. 4C is another example of identifying taxonomy categories associated with search filter criteria.

Still further, within each taxonomy sub-category, there may be still further taxonomy sub-categories for different variations of diseases 454a, 454b. For example, as shown in FIGS. 4B and 4C, the disease category 450 may be "cancer", the sub-disease category 452 may be "brain cancer", and the disease variation 454 may be "glioblastoma".

As such, at 308a in FIG. 3A, the evaluation data can be associated with one or more disease taxonomy categories. For instance, if the evaluation data is a publication in respect of treating glioblastoma—at 308a, the publication can be associated with the following taxonomy categories: (i) cancer category 450a, (ii) brain cancer sub-category 452a and (iii) glioblastoma sub-category 454a. In this manner, the evaluation data is associated with a plurality of taxonomy categories, and sub-categories, that may be represented in hierarchical fashion.

In cases where the publication discusses treatment of multiple diseases (e.g., cancer and liver dysfunction), the publication can be associated with multiple disease categories 450a, 450b (FIG. 4A).

Specialties and subspecialties 414 may include any categories, subcategories, branches, or types of medical practice. For example, the specialties and subspecialties 414 may include anesthesiology, emergency medicine, internal medicine, surgery, geriatrics, psychiatry, neurology, pediatrics, oncology, pathology, family medicine, obstetrics, gynecology, radiology, hematology, and the like. Accordingly, evaluation data can be associated with a particular specialty if it is relevant to that specialty. For example, a publication may be relevant to surgical procedures, or emergency medicine.

Similar to the diseases 412, there may also be a hierarchy of taxonomy categories and sub-categories in respect of the type of specialties 414. For example, this can include various specialties 460a, 460b, 460c, various sub-specialties 462a, 462b and various specialty variations 464a, 464b. For example, as shown in FIG. 4C, the evaluation data can be associated with the broader specialty 460 (e.g., surgery), as well as a sub-specialty 462 (e.g., brain surgery) as well as a specialty variation 464 (e.g., craniotomy).

As further shown in FIG. 4A, the evaluation data can also be associated with various other types of taxonomy categories. For example, these include procedures 416, chemical compounds 418, drug names 420, generic names 422, clinical trials 424, anatomic areas 426, genotypes 428, phenotypes 430, symptoms 432, signs 434, genes 436, outcomes 438, institutions 440, locations 442, awards 444, publications 446 and expert names 448.

Procedures 416 can include any diagnostic, therapeutic, surgical, rehabilitatory, or other medical procedures. For example, the procedures 416 may include various surgical procedures, such as ganglionectomy, sympathectomy, neurectomy, etc.

Chemical compounds 418 can include any drugs, medications, or other chemical substances. For example, the chemical compounds 418 may include various painkillers, such as various NSAIDs, opioids, anesthetics, and the like. Similarly, the drug names 420 may include the brand names of any of the chemical compounds 418. Likewise, the generic names 422 may include the brand names of the generic versions of the drug names 420. Additionally, the clinical trials 424 can include any clinical trials associated with any of the chemical compounds 418, drug names 420, or generic names 422.

Anatomic areas 426 may include any regions, portions, or parts of the human body as well as tissue types. For example, the anatomic areas 426 may include the cranial region, facial region, thoracic region, mammary region, etc.

Genotypes 428 and phenotypes 430 may include any genetic or observable characteristics or traits. For example, the genotypes 430 and phenotypes 432 may include blood type, hair color, etc. and the corresponding genetic details.

Symptoms 432 may include any indications of an illness, injury, or medical condition observed by a patient. Similarly, the signs 434 may include any indications of an illness, injury, or medical condition observed by another person. For example, the symptoms 432 and signs 434 may include a rash, elevated blood pressure, etc.

Genes 436 may include any genetic criteria. For example, the genes 336 may include various DNA sequences.

Similar to the disease category 412 and the specialty category 414, each of the taxonomy categories 416-448 may likewise have multiple different sub-taxonomy categories, which evaluation data can be associated with.

Outcomes 438 may include any patient outcome criteria. For example, the outcomes 438 may include various volume, mortality, morbidity, and/or hospitalization criteria.

Institutions 440 may include any facilities, departments, foundations, or other institutions that may be affiliated an expert. For example, the institutions 440 may include various hospitals and research groups. Similarly, the locations 442 may include any locations associated with any of the institutions 440 or experts. For example, the locations 442 may include various cities, states, provinces, and/or countries in which the institutions 440 or experts may be located.

Awards 444 may include any accolades, honors, accomplishments, prizes, or any other awards associated an expert. The awards 444 may refer to a number of awards 444 or one or more specific awards 444.

Publications 446 may include any publications, journal papers, technical articles, books, bulletins, newsletters, magazine articles, etc. associated an expert. The publications 446 may refer to a number of publications or one or more specific publications. The expert's name 448 can refer to one or more experts, by name, To this end, it should be appreciated that the taxonomies are not limited to those shown in the illustrated example. Fewer, additional, or alternate taxonomies may be used to classify the evaluation data, and generate the multi-dimensional rankings of experts. Some of the taxonomies 400a may be combined into fewer taxonomies or divided into additional taxonomies. The taxonomies 400a may differ for different types of experts. For example, for a lawyer, the taxonomies 400a may not include disease 412, but may include practice area, etc.

In at least one embodiment, evaluation data can be associated with taxonomy categories or sub-categories based on analyzing the content (e.g., textual or visual content) of the data.

As a more specific example, an AI engine can process a plurality of evaluation data—e.g., classified at act 306a as being publications—to classify each publication as being associated with one or more taxonomies based on keywords in that publication.

For instance, a publication containing keywords such as "nervous system" (e.g., disease 412), "neuroscience" (e.g., specialty 414), "neurosurgery" (e.g., procedure 416), etc. can be classified as being associated with the relevant taxonomies. In other cases, this is determined based on the data source 120 providing the evaluation data. In other words, specific data sources 120 may be known to provide publications associated with certain taxonomies, etc.

Likewise, other types of evaluation data can be associated with different taxonomy categories. For example, various institution and credential data can be associated with one or more taxonomies. For instance, an affiliation with a neurology department or a residency in neurology can be classified as being associated with neurology. As another example, an award related to a particular specialty can be classified as being associated with that specialty. The various types of evaluation data described herein can each be classified as being associated with one or more taxonomies.

In various embodiments, one or more AI engines can disambiguate the evaluation data with respect to one or more taxonomies, as provided herein. The AI engines may reconcile differences across multiple data sources, or even the same data source.

For example, with respect to the institution taxonomy 440, the AI engines may differentiate between institutions being named using different variations in the same or different data sources. For instance, The Johns Hopkins Hospital may be referred to as Johns Hopkins, etc. As another example, the AI engines may differentiate between variations in the names of specialties. For instance, neurology may be referred to as nervous system, neuroscience, neurosurgery, etc. Examples of the disambiguation process are presented further below.

It will now be understood that, in at least one example, evaluation data categories (act 306a) correspond to the nature or type of evaluation data (e.g., a publication, award, etc.), while the taxonomy categories (act 310a) may correspond to the type of content included in the evaluation data.

Referring now back to FIG. 3A, at 310a, the evaluation data may be further analyzed to associate the evaluation data with one or more expert names.

For example, a publication 212 can be associated with one or more experts identified as authors of the publication. Alternatively, or in addition, a credential 216, peer nomination 218, user review 220, etc., may be associated with the relevant expert to which the data pertains to. In this manner, each expert may be associated with a set of expert-specific evaluation data that is associated with that expert. As explained herein, the expert-specific evaluation data can be analyzed to generate ratings and rankings of the expert, as well as to generate profiles of these experts.

In at least one embodiment, the processor 112 may use one or more AI engines to process and associate the evaluation data with different experts. As a more specific example, an AI engine can be used to process a plurality of publications to classify each publication as being associated with at least one expert in the plurality of experts based on the at least one author of the publication. For instance, a publication authored by Dr. James Smith can be classified as being associated with Dr. James Smith.

In some embodiments, some of the authors may not be associated with any experts and may be excluded from further analysis. For example, various credential data can be processed to determine whether an expert should be excluded. For example, for a ranking of medical doctors, authors that do not have a medical degree (e.g., a Doctor of Medicine (MD), Doctor of Osteopathic Medicine (DO), Bachelor of Medicine, Bachelor of Surgery (MBBS, MB ChB, BMBS, MB BCh, MB BCHhir, or BM CH), etc.) may be excluded.

Likewise, other types of evaluation data can be classified using one or more AI engines in a similar manner. For example, various institution and credential data can be associated with one or more experts. For instance, an institution employing a particular expert can be classified as being associated with that expert. As another example, an award granted to a particular expert can be classified as being associated with that expert. The various types of evaluation data described herein can each be classified as being associated with one or more expert.

On this note, a challenge in associating evaluation data with expert names is the process of disambiguating the evaluation data. In particular, in various cases, the same expert may be referenced by different names in different sources (e.g., J. Smith, James Smith, Dr. J. Smith, etc.). Accordingly, to ensure the accuracy of the system, it is important to reconcile differences in the names of experts across multiple data sources, or even the same data source.

To mitigate this problem at least partially, in at least one embodiment, at 310a, one or more AI engines can be used to disambiguate the evaluation data with respect to one or more experts. The AI engines may be used to reconcile differences in the names of experts across multiple data sources, or even the same data source. For example, the AI engines may be used to differentiate between experts having the same or similar names, or different spellings of the same expert's name. For instance, Dr. James Smith may be referred to as James, Dr. Smith, Smith et al. etc. As another example, the AI engines may utilize computer vision to perform facial recognition of experts in photo or video data. Examples of the disambiguation AI engine are presented further below.

In some embodiments, the association of the evaluation data and the experts can be used to generate a pedigree for each expert. The pedigree can define a chronological or other logical dataset of an expert. For example, the pedigree may include a historical record of an expert's education, training, work history, etc. For instance, a pedigree of a medical doctor may include various information associated with their general education, medical school, residency, fellowship, full practicing positions, and academic positions. In this manner, the pedigree can include a full history of an expert that has been associated with multiple institutions or locations. This pedigree may comprise part of the expert-specific data for that expert, and can be included in that expert's profile.

Referring back to FIG. 3A, after the completion of act 310a, the evaluation data can now be said to be curated. In particular, each piece of evaluation data (also known as each evaluation dataset, of the plurality of evaluation datasets) is now associated with: (i) one or more evaluation data categories; (ii) one or more taxonomy categories or subcategories; and (iii) one or more expert names.

Here, it will be understood that acts 306a to 310a may be performed in any order, concurrently or at least partially concurrently.

As explained previously, the data curation process enables the system to more efficiently handle and process large volumes of the evaluation data (e.g., millions of evaluation data sets) for a multitude of experts, in order to rank and rate relevant experts, and with minimal delay and latency in generating the identification and ranking. Accordingly, this facilitates the scaling-up of the system to handle ranking of thousands, or hundreds of thousands of experts in a multitude of geographic regions. In this manner, users may rely on the system as an accurate and trusted source for a unified and consolidated ranking.

In at least some embodiments, the data pre-processing and/or curation (e.g., acts 304a-310a) may occur in real-time or near real-time. That is, as new data becomes available from data sources 120, it may be immediately pre-processed and/or curated such that the data is immediately available for identifying, rating and/or ranking experts.

Figure 5:
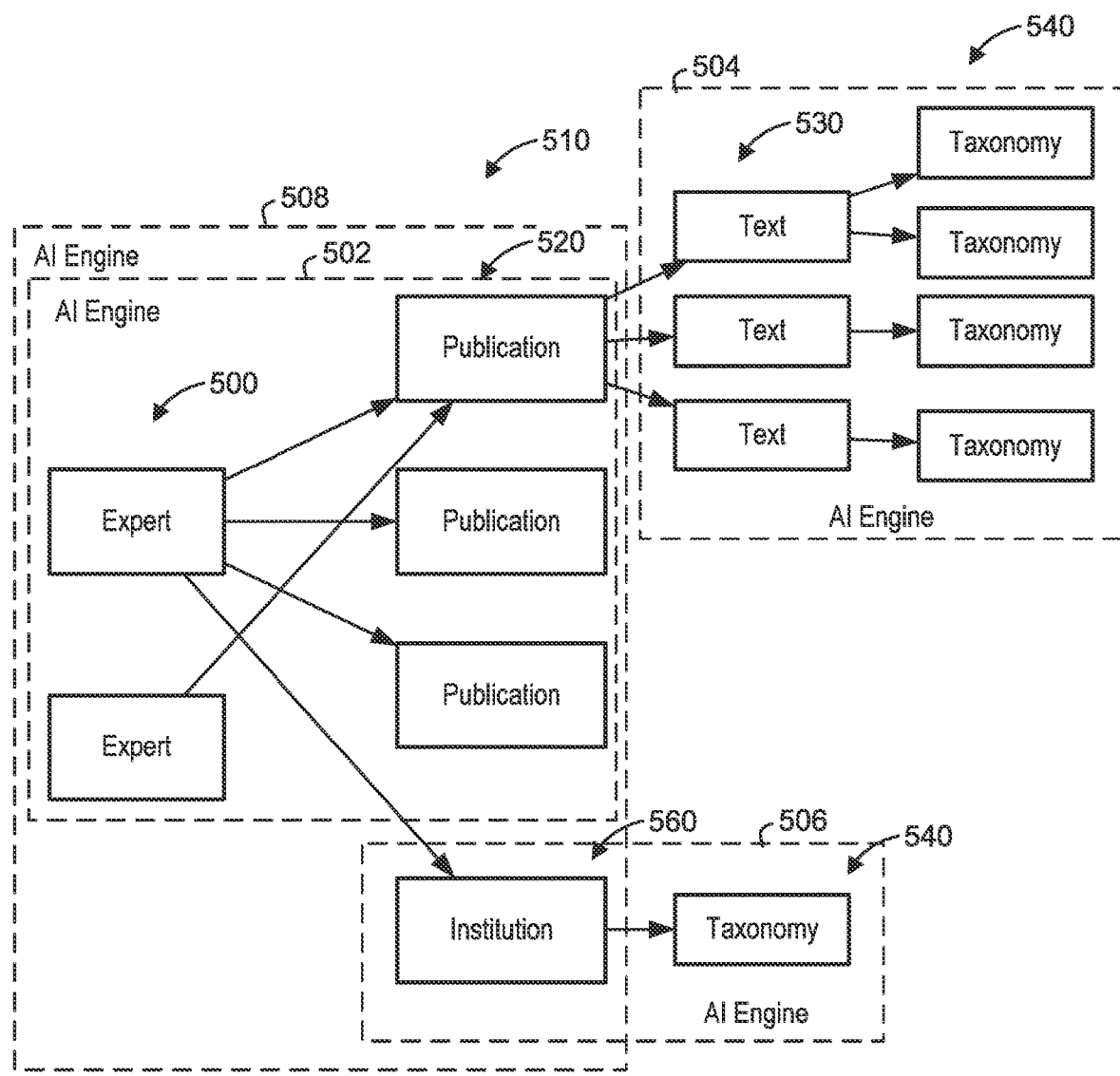
FIG. 5 is a schematic diagram of an example method for generating multi-dimensional rankings of experts, in accordance with an example embodiment.

Referring now to FIG. 5, with continued concurrent reference to FIG. 3A, there is shown a simplified diagram of an example process for evaluation data curation.

FIG. 5 is an example visual representation of acts 306a to 310a of method 300a (FIG. 3A), and in example embodiments where the data curation is performed by one or more AI engines.

As shown, there may be plurality of experts 500. The plurality of experts are associated with various evaluation data 510. In the illustrated example, the evaluation data 510 is processed by an AI engine to associate the data with different evaluation data categories (e.g., act 306a in FIG. 3A). For example, this includes classifying the evaluation data as being a plurality of publications 520 and/or institution data 560.

As shown, each publication 520 can be further processed by a further AI engine 502 to classify each publication as being associated with one or more experts 500 (e.g., act 310a of FIG. 3A).

Likewise, each publication 520 can be processed by an AI engine 504 to classify each publication 540 as being associated with one or more taxonomy categories 540 based on various text 530 associated with the publication 540 (e.g., act 308a of FIG. 3A). The text 530 can be any text associated with the publications 540, such as the abstract, title, full text, etc. The institution data 560 can be processed by another AI engine 506 to classify each affiliation 560 as being associated with one or more taxonomies 540 (e.g., act 308a of FIG. 3A).

Referring back to FIG. 3A, once the data curation is completed, method 300a may proceed to acts 312a-316a. At acts 312a-316a, the system 110 can identify and rank experts. To this end, acts 312a-316a may occur at a separate and/or subsequent point in time, from acts 302a-310a, when a user (e.g., a user of computing device 150), desires an identification and ranking of experts.

At 312a, the system 110 can receive one or more search filter criteria. For example, the search filter criteria may be received via an input of a user of the computing device 150. The search filter criteria can correspond to the user's requirements for experts they are searching for, and for which they require a ranking.

In at least one embodiment, the search filter criteria may correspond to searching different taxonomy categories and sub-categories (FIG. 4A). For example, a search filter criteria may limit the search to identifying and ranking experts specialized in a particular disease 412, specialty 414 and/or procedure 416. Accordingly, the system 110 may identify these experts, and rank these experts accordingly (e.g., a ranking of experts specialized in surgery). The search filter criteria may also limit the search to experts specialized in a particular variation of a disease (e.g., variation 1.1.1 454 in FIG. 4A), or experts having a specialty in a particular variant 464 (FIG. 4A).

FIG. 6A shows a screenshot of an example user interface 600a for displaying multi-dimensional identification and rankings of experts 630a-630d (collectively referred to as 630). These are example interfaces, that can be displayed on user computer 150, and which can be updated with minimal delay owing to the efficient computing methods described herein.

The interface 600a may allow the user to input one or more search filter criteria. For example, the search filter criteria 610 can include stipulating a particular disease (e.g., glioblastoma) and a particular procedure (e.g., craniotomy). Accordingly, in response, the system 110 filters and identifies experts specialized in glioblastoma and craniotomy, and the rankings of experts 630 is generated. In other words, in the illustrated example, the rankings 630 correspond to the top medical doctors for both treating glioblastoma and performing craniotomy.

Figure 6B:
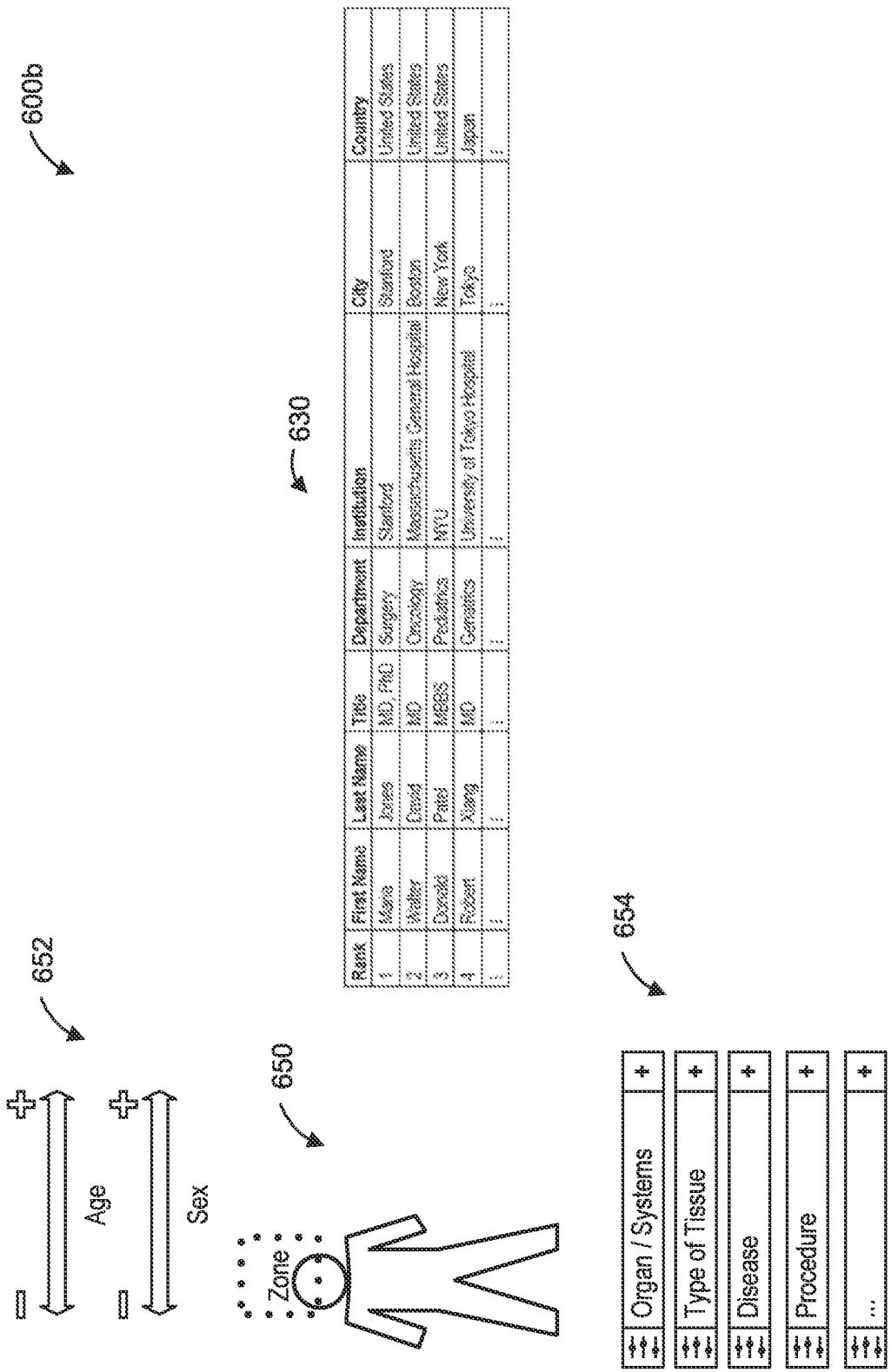
FIG. 6B is a screenshot of an example user interface for displaying multi-dimensional rankings of experts, in accordance with an example embodiment.

FIG. 6B shows another screenshot of an example user interface 600b, and is yet another interface by which users can input search filter criteria (e.g., act 312a in FIG. 3A).

In the illustrated example, a user can select one or more anatomic zones of a human body using a human model 650. The human model 650 may be two-dimensional or three-dimensional. For example, a user may be able to zoom in or zoom out on the model 650 to select a specific organ, tissue, or constituent of an organ. As shown, the user can also select an age or sex using sliders 652.

The search filter criteria 654, by which to rank the experts, can be automatically populated based on the user's input using model 650 and sliders 652. In this manner, the user may not need to manually select all of the search filter criteria 654 in the manner shown in FIG. 6A.

Figure 6C:
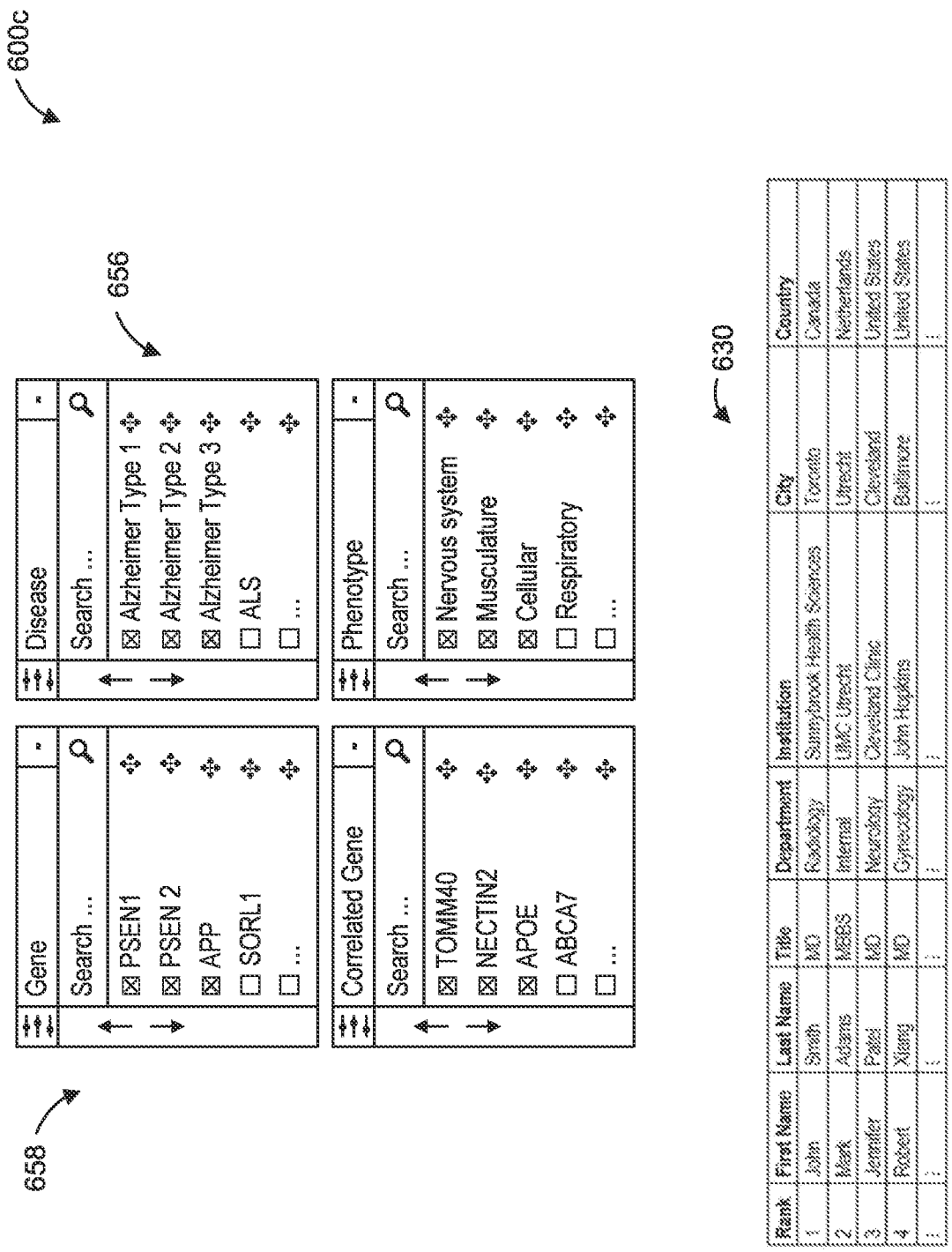
FIG. 6C is a screenshot of an example user interface for displaying multi-dimensional rankings of experts, in accordance with an example embodiment.

FIG. 6C shows another screenshot of an example user interface 600c, and is still yet another interface by which users can input search filter criteria (e.g., act 312a in FIG. 3A).

In the illustrated example, a user can select one or more genes 658 as a search filter criteria. The other search filter criteria 656, by which to rank the experts (e.g., correlated genes, disease, phenotype, etc.), can be automatically populated based on the user's selection. In this manner, the user may not need to manually select all of the search filter criteria 656 in the manner shown in FIG. 6A.

Referring now back to FIG. 3A, at 314a, in response to receiving (or identifying) one or more search filter criteria—the processor 112 may analyze the evaluation data to identify and rank experts that satisfy the one or more search filter criteria identified at act 312a.

For example, as shown in FIG. 6A, the ranking of the plurality of experts 630a represents the top experts for treating glioblastoma and performing craniotomy. That is, the system can identify top experts based on the filter criteria of treating glioblastoma (e.g., the disease 412) and performing craniotomy (e.g., the procedure 416).

The ranking of the plurality of institutions 630b represents the institutions that have the top experts for treating glioblastoma and performing craniotomy The ranking of the plurality of countries 630c and the plurality of cities 630d represents the countries and cities that have the top experts for treating glioblastoma and performing craniotomy. As shown, the multi-dimensional rankings of experts 630 can be considered "multi-dimensional" in the sense that the rankings can include multiple different types (e.g., "dimensions") of rankings.

With continued reference to FIG. 3A, at 316a, at least a portion of the rankings are output (e.g., displayed) as the multi-dimensional ranking of the plurality of experts.

For example, the processor 112 can display, using a user interface, at least a portion of the rankings. As described herein, various types of rankings can be displayed as the multi-dimensional ranking of experts.

For example, as shown in FIG. 6A, the multi-dimensional ranking of experts may include a ranking of the plurality of experts 630a, a ranking of a plurality of institutions 630b, and/or a ranking of a plurality of locations 630c, 630d.

As shown, the user interface 600a can be interactive and display different multi-dimensional rankings 630 in response to user input. For example, a user may select a different search filter criteria 610, and the multi-dimensional rankings 630 can be updated (e.g., the user interface can be updated) to reflect the different search filter criteria 610.

For example, a user may select additional or alternate diseases or procedures by which to rank the experts. The user may also select additional or alternate search filter criteria 610 by which to rank the experts, such as by specialty, outcome, reviews, awards, clinical trials, publications, etc. Owing to the efficient method of data curation and data analysis, the update can occur near instantaneously, and with minimal latency or delay.

The user interface 600a may also include various graphical representations associated with the multi-dimensional rankings of experts 630. In the illustrated example, the user interface 600 includes a map 640 illustrating the locations of the top experts from the multi-dimensional rankings 630. As shown, the user interface 600a can also include various information associated with the ranked experts, such as, their name, title, department, institution, location, etc., as well as more detailed biographical information 632.

In various cases, as discussed above, the displayed rankings may be updated in real-time or near real-time based on updated evaluation data, that may also be received in real-time or near real-time. In other words, the method 300a may be performed iteratively as new evaluation data is received to generate up-to-date rankings of experts, as previously explained.

Reference is now made to FIG. 3B, which shows a process flow for an example embodiment of a method 300b for identifying and generating rankings of experts, based on one or more search filter criteria.

Method 300b may be performed by processor 112 in the course of executing act 314a of FIG. 3A.

Figure 3C:
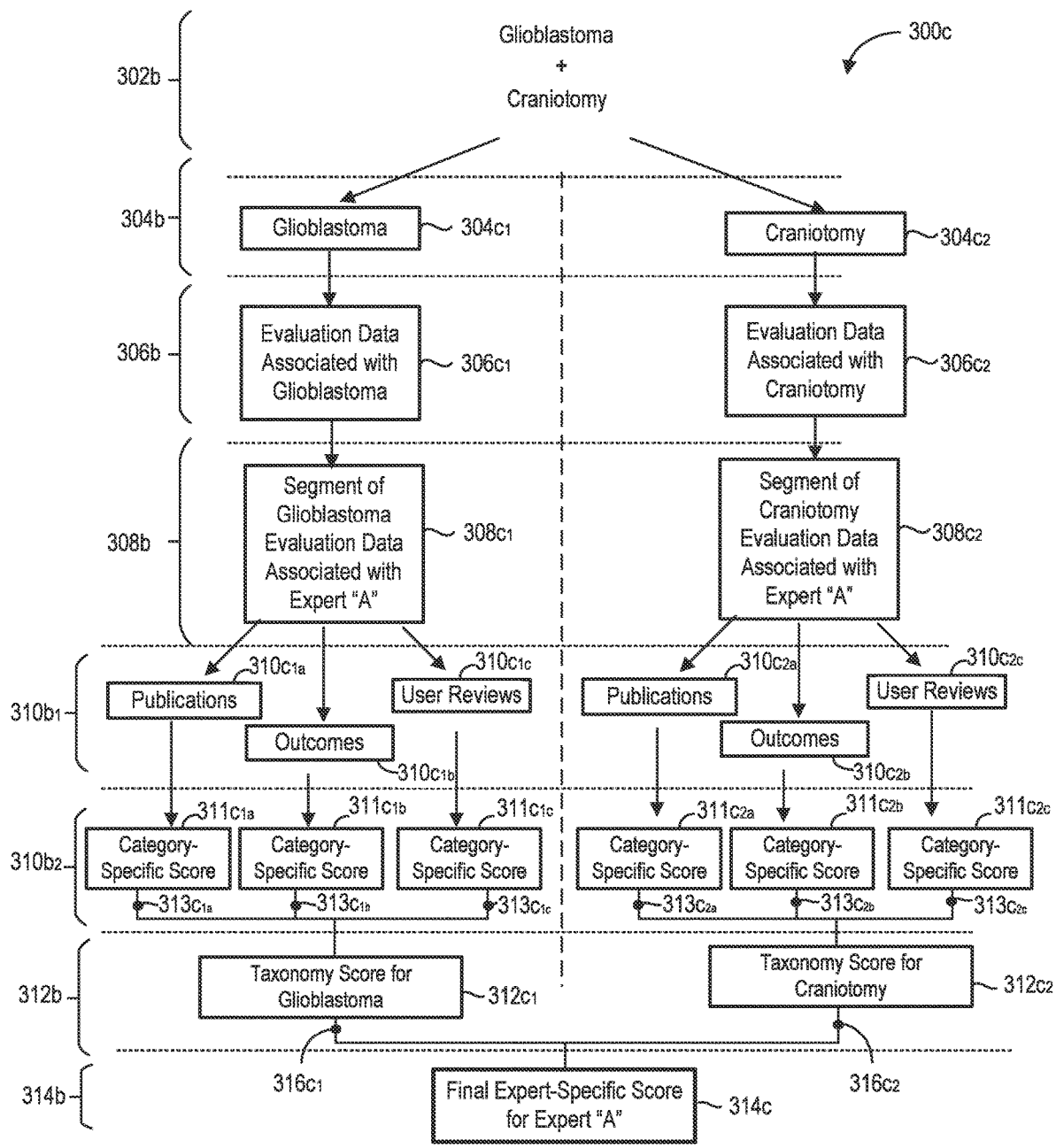
FIG. 3C is a simplified block diagram level illustration of the method in FIG. 3B.
Figure 3D:
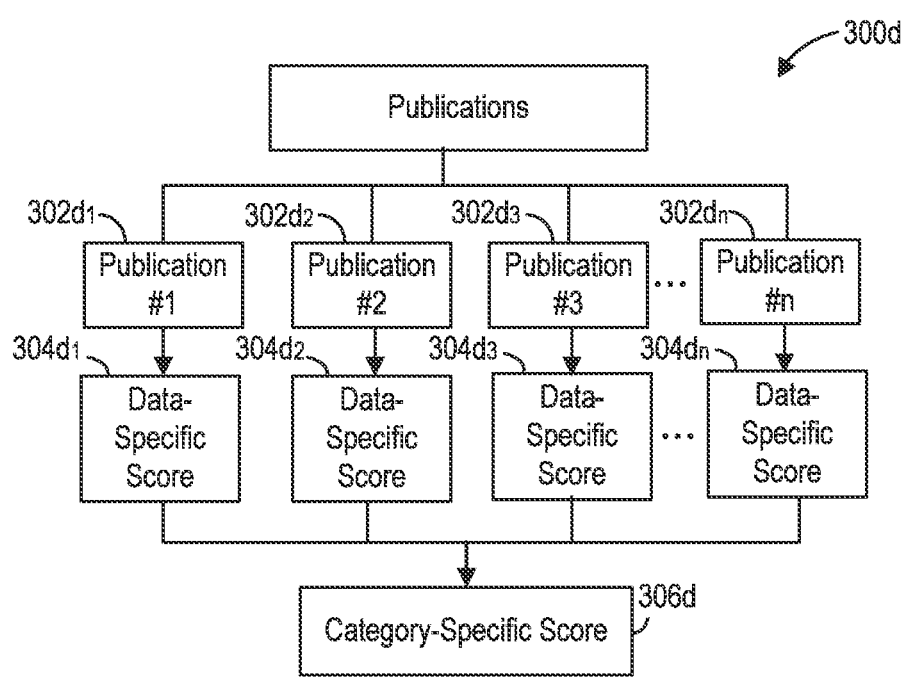
FIG. 3D is a simplified block diagram level illustration of a portion of the method in FIG. 3B.
Figure 3E:
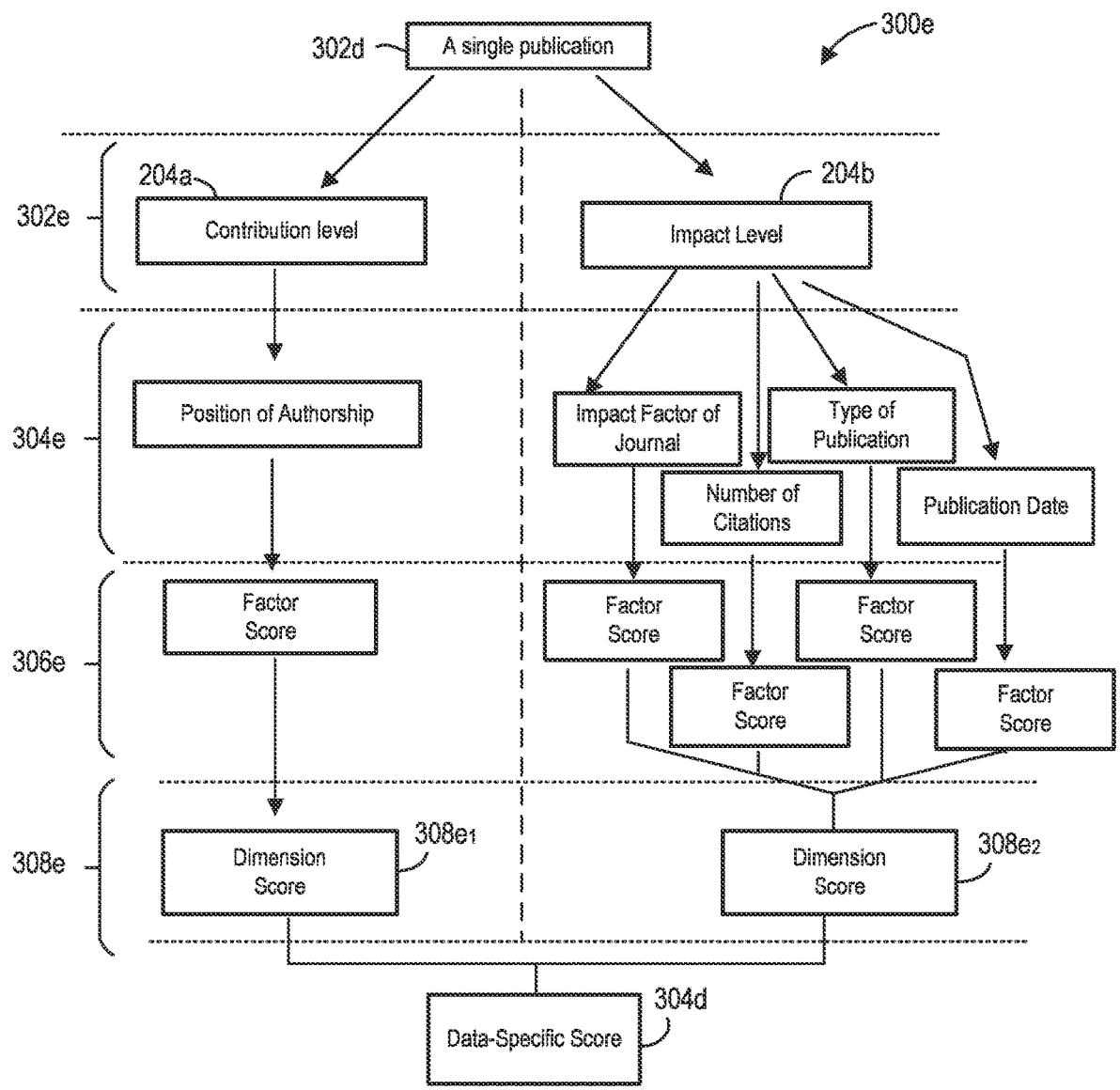
FIG. 3E is a simplified block diagram level illustration of a portion of the method in FIG. 3B.

Concurrent reference is also made to FIGS. 3C-3E, which provide respective alternate visual illustrations 300c-300e of the method 300b, for greater clarity.

At 302b, the search filter criteria selected at act 302a, in method 300a, is identified. For example, this may correspond to "glioblastoma" and "craniotomy" (FIG. 3C).

At 304b, the search filter criteria is associated with one or more taxonomy categories (FIG. 4A).

For example, as shown in FIG. 4B, the search filter criteria glioblastoma 490 is associated with the taxonomy variant disease category "glioblastoma" 454 (e.g., which itself is a sub-category of the sub-disease "brain cancer" 452 which, in turn, is a sub-category of the broader disease "cancer" 450) (see e.g., 304c1 in FIG. 3C).

Similarly, as shown in FIG. 4C, if there are multiple search criteria, each search filter criteria may be associated with one or more respective taxonomy categories or sub-categories at act 304b. For example, while glioblastoma is associated with the taxonomy sub-category "glioblastoma" 454, the search filter "craniotomy" may be associated with the taxonomy specialty sub-category "craniotomy" 464 (e.g., which itself is a sub-category of the sub-specialty "brain surgery" 462 which, in turn, is a sub-category of the broader specialty "surgery" 460) (see e.g., 304c2 in FIG. 3C).

Accordingly, at act 304b, the system 110 may effectively perform a mapping between the "search filter criteria" and the pre-defined taxonomy categories (FIG. 4A).

In some cases, the available search filter criteria, on the user interface, may be intentionally limited to enable only a one-to-one mapping to the pre-defined taxonomy categories. That is, the available search filter criteria may overlap identically with the available taxonomy categories.

In at least one embodiment, the system 110 may also map search filter criteria to one or more of the other taxonomy categories and sub-categories previously explained with reference to FIG. 4A.

At 306b, the relevant evaluation data—associated with the one or more taxonomies at act 304b—is identified. This is also referred to herein as taxonomy-specific evaluation data.

For example, as shown in FIG. 3C, the evaluation data associated with taxonomy sub-category "glioblastoma" is identified (306c1), and the evaluation data associated with taxonomy sub-category "craniotomy" is identified (306c2). In some cases, there may be some overlap between these two evaluation data sets.

It will be appreciated that act 306b is facilitated by virtue of act 308a (FIG. 3A), which previously associated different evaluation data with different taxonomy categories and sub-categories.

At 308b, for a given expert, system 110 can identify the segment of the relevant evaluation data (e.g., determined at 306b), associated with that expert (also referred to herein as the relevant expert-specific evaluation data).

For example, as shown in FIG. 3C, this can involve, (i) at 308c1, identifying the segment of glioblastoma evaluation data associated with each expert (e.g., an expert "A"); and (ii) at 308c2, identifying the segment of craniotomy evaluation data associated with each expert (e.g., an expert "A").

To this end, act 308b is also facilitated by virtue of act 310a (FIG. 3A), which previously associated evaluation data with different expert names.

At 310b, for each expert, the processor 112 may further analyze the relevant expert-specific evaluation data, and may generate one or more weighted scores for one or more evaluation data categories (also known as category-specific scores).

For example, as shown in FIG. 3C: (i) initially, at 310b1, for the relevant expert-specific evaluation data associated with glioblastoma—the system 110 can separately identify the evaluation data categorized as publications ($310c_{1a}$), outcomes ($310c_{1b}$) and user review ($310c_{1c}$). This act is facilitated by act 306a (FIG. 3A), which previously associated the evaluation data with different evaluation data categories; and (ii) subsequently, at 310b2, the system 110 can analyze the evaluation data, in each category 310c, to generate category-specific scores.

To further clarify act (ii) (i.e., analyzing data in each category to generate category-specific score)—as shown, the category-specific score $311c_{1a}$ for the publications category can indicate the Expert A's score in respect of publishing in glioblastoma. For instance, a higher score may indicate that the expert is well-published in glioblastoma, while a lower score may indicate that the expert is poorly published in glioblastoma.

Similarly, the category-specific score $311c_{1b}$ may be generated in respect of the expert's outcomes in glioblastoma treatment. For example, a medical doctor that is associated with a larger volume of treatments, better mortality rate, better morbidity rate, better hospitalization rate, etc. may be assigned a better category-specific score than another medical doctor that has fewer or worse clinical outcomes. Various AI engines can be used to process the clinical outcome data to determine the weighted scores.

Still yet, the category-specific score $311c_{1c}$ may be generated in respect of the expert's user reviews in respect of treating glioblastoma.

A similar process may be performed for expert-specific data related to craniotomy (e.g., $310c_{2a}$-$310c_{2c}$, and $311c_{2a}$-$311c_{2c}$).

It will be appreciated that FIG. 3C only shows three evaluation data categories, but any number of evaluation data categories may be analyzed to generate respective category-specific scores. For example, the category-specific scores, at 310b, can also be determined based on credentials associated with the experts. In particular, each expert can be associated with at least one credential, and the category-specific scores assigned to each expert for a given taxonomy is based on the at least one credential associated with that expert. For instance, a medical doctor that has additional credentials to his or her medical degree, such as master's degree or doctor of philosophy, may be assigned a better category-specific score than another medical doctor that has fewer credentials.

Various AI engines can be used to determine the association between experts and credentials. In some embodiments, the AI engines may process data to determine the associations. For example, an AI engine may be used to classify the authors of publications as being associated with one or more credentials based on keywords in the publications. However, in other embodiments, the associations can be determined based on other types of data.

In some embodiments, the category-specific scores, at 310b, can also be determined based on peer nominations of the experts. For example, the evaluation data may include a plurality of peer nominations and each peer nomination may be associated with at least one expert on the plurality of experts. The category-specific score assigned to each expert for a given taxonomy can be determined based on one or more peer nominations associated with that expert. For instance, a medical doctor that has better peer nominations may be assigned a better weighted score than another medical doctor that has worse peer nomination. Various AI engines can be used to process the peer nomination data to determine the weighted scores.

In some embodiments, the category-specific scores, at 310b, can also be determined based on user reviews of the experts. For example, the evaluation data may include a plurality of user reviews and each user review may be associated with at least one expert on the plurality of experts. The category-specific score assigned to each expert for each taxonomy can be determined based on one or more user reviews associated with that expert. For instance, a medical doctor that has better patient reviews may be assigned a better weighted score than another medical doctor that has worse patient reviews. Various AI engines can be used to process the user review data to determine the weighted scores.

In some embodiments, the category-specific scores, at 310b, can also be determined based on institutions associated with the experts. For example, each expert can be associated with at least one institution, and the weighted score assigned to each expert for each taxonomy can be based on the published ranking level of at least one institution associated with that expert. For instance, a medical doctor that is affiliated with a highly ranked medical institution may be assigned a better weighted score than another medical doctor that is affiliated with an institution that has lower ranking. Various AI engines can be used to determine the association between experts and institutions. In some embodiments, the AI engines may process publication data to determine the associations. For example, an AI engine may be used to classify the authors of publications as being associated with one or more institutions based on keywords in the publications. However, in other embodiments, the associations can be determined based on other types of data.

Referring back to FIG. 3B, at 312b, the category-specific scores are combined to determine a taxonomy score for each of the one or more taxonomies identified at 304b.

For instance, as shown in FIG. 3C, a taxonomy score 312c1 is generated for the "glioblastoma" category. This taxonomy score 312c1 is generated by combining the category-specific scores $311c_{1a}$-$311_{c1}$ for the "glioblastoma" category. For example, the category-specific scores $311c_{1a}$-$311_{c1}$ can be averaged, added or multiplied to generate the taxonomy score 312c1.

In some cases, the taxonomy score 312c1 can be a weighted combination of the category-specific scores $311c_{1a}$-$311_{c1}$ such that the taxonomy score $312c_1$ is a weighted taxonomy score $312c_1$. For example, each of the category-specific scores may be allocated a respective weighted bias measure $313c_{1a}$-$313c_{1c}$, $313c_{2a}$-$313c_{2c}$. The weighted bias measure may reflect the importance of that category-specific score to the overall ranking.

For example, some types of evaluation data categories may be considered primary factors that are assigned a greater weighted bias measure as compared to other types of evaluation data categories that are considered secondary factors. For instance, publications may be considered a primary factor, whereas social media may be considered a secondary factor. However, it should be appreciated any type of evaluation data categories can be deemed a primary or secondary factor.

Figure 3F:
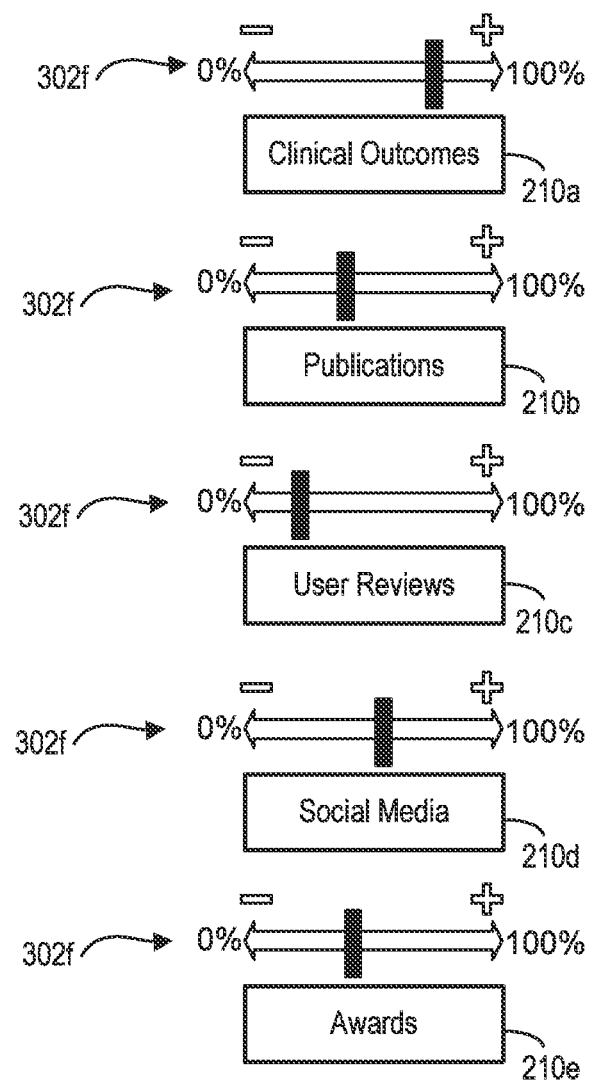
FIG. 3F is a simplified illustration of a user interface for adjusting bias weights for different evaluation data categories.

In some cases, the weighted bias measures may be user selectable. For example, referring to FIG. 3F a user can adjust the weighted bias measures of each evaluation data category 210a-210e to adjust the relative effect of that evaluation data category on the overall rankings of experts.

For example, the user may adjust the weighted bias measure in a range of 0% to 100% (e.g., using a slider 302f), whereby 0% indicates that no weight should be allocated to the evaluation data category (e.g., in generating the rankings), and 100% indicates full weight should be allocated to the evaluation data category. Accordingly, in FIG. 3C, the weighted bias measures $313c_{1a}$-$313c_{1c}$, $313c_{2a}$-$313c_{2c}$ may be allocated based on the user's selection.

Referring to FIG. 3C, in some embodiments, the weighted bias measures $313c_{1a}$-$313c_{1c}$, $313c_{2a}$-$313c_{2c}$ may be the same for all taxonomy categories. For example, the bias measure $313c_{1a}$ for publications under "glioblastoma" is the same as the bias measure $313c_{2a}$ for publications under "craniotomy".

In other cases, the assignment of the bias measures 313c may depend on the taxonomy. For example, for taxonomy "surgery", the category "clinical outcomes" may be given a greater weighted bias measure as compared to publications. On the other hand, for the taxonomy "medical devices", the category "publications" may be given a greater weighed bias measure as compared to clinical outcomes. Various weightings can be used, depending on the type of expert being ranked and the taxonomy.

Referring again back to FIG. 3B, at 314b, the final score, for each expert (herein referred to as the expert-specific score), is determined by combining the taxonomy scores for that expert.

For instance, as shown in FIG. 3C, the expert-specific score is determined by combining the taxonomy score for glioblastoma (312c1), with the taxonomy score for craniotomy (312c2), to generate the final expert-specific score 314c. Accordingly, the final expert-specific score 314c represents the expert's score for the search filter criteria "glioblastoma AND craniotomy". Any suitable method may be used for combining the taxonomy scores (e.g., sum, averaging, multiplication, etc.) to generate the final score.

In some cases, the final expert-specific score is a weighted combination of taxonomy scores. For instance, as shown in FIG. 3C, a first bias weight $316c_1$ may be applied to the glioblastoma taxonomy score $312c_1$, and a second bias weight $316c_2$ may be applied to the craniotomy taxonomy score $312c_2$. Accordingly, the final expert-specific score may be calculated as a weighted average, e.g., Final Expert-Specific Score=(Weighted Bias $316c_1$*Glioblastoma Taxonomy Score $312c_1$)+(Weighted Bias $316c_2$*Glioblastoma Taxonomy Score $312c_2$).

At 316b, in FIG. 3B, the final expert-specific scores can be used to generate a final ranking of the various experts. For example, experts with greater or larger expert-specific scores may be ranked more highly than experts with lower expert-specific scores.

In some embodiments, one or more AI models can determine the rankings. For example, one or more AI engines may determine the rankings based on the final expert-specific scores. The AI engines may adjust the bias measures 313c and/or 316c based on various factors. For example, AI engines may give more weight to certain evaluation data categories and/or taxonomies as compared to other data evaluation categories and/or taxonomies. For instance, the AI engines may rank a medical doctor relatively low because of the presence of a malpractice claim, despite that medical doctor having a prestigious history of research publications.

To this end, FIG. 6A shows an example ranking of experts 630a representing the top medical doctors for treating glioblastoma and performing craniotomy.

Other rankings of experts can also be generated. For example, different rankings can be generated for other search filter criteria. For instance, a ranking of the top medical doctors based on outcome and having the most awards may be generated.

In some embodiments, the plurality of rankings may include a plurality of institution rankings. Each institution ranking can be determined based on the expert-specific scores of the experts associated that institution and the one or more search filter criteria. For example, an institutional ranking may represent the top hospitals having the top medical doctors for treating a particular disease and performing a particular procedure. For instance, FIG. 6A shows an example institution ranking 630b representing the top hospitals having the top medical doctors for treating glioblastoma and performing craniotomy.

In some embodiments, the plurality of rankings may include a plurality of location rankings. Each location ranking can be determined based on the expert-specific scores of the experts associated with that location and the one or more search filter criteria. For example, a location ranking may represent the top cities or countries having the top medical doctors for treating a particular disease and performing a particular procedure. For instance, FIG. 6A shows example location rankings 630c, 630d representing the top counties and cities having the top medical doctors for treating glioblastoma and performing craniotomy.

The institution and location rankings can be useful to determine top groups of experts. For example, a patient seeking cancer diagnosis and treatment may be interested in finding a hospital having a good team of diagnosticians, oncologists, and surgeons, instead of finding the single best surgeon. In this manner, the institution and location rankings can provide a more holistic ranking that may be more useful for certain users.

In some cases, as explained with respect to FIG. 10, the system may enable filtering and ranking of experts based on various scope limiting criteria (e.g., geographic location, institution, etc.).

Reference is now made to FIGS. 3D and 3E, which show simplified block diagrams for example process flows 300d and 300e, respectively, for determining category-specific scores (e.g., the category-specific scores 311c in FIG. 3C).

Process flows 300d and 300e further clarify act 310b in method 300b (FIG. 3B). Methods 300d and 300e may be performed by processor 112.

Referring first to FIG. 3D—as shown, within each evaluation data category, in method 300c of FIG. 3C, there may be a plurality of evaluation data sets.

For example, within the publications $310c_{1a}$, $310c_{2a}$ category, there may be in-fact multiple publications associated with that expert, in respect of glioblastoma and/or craniotomy (e.g., if the expert is well published). Similarly, there may be multiple outcomes sets $310c_{1b}$, $310c_{2b}$ and multiple user review sets $310c_{1c}$, $310c_{2c}$. Therefore, to determine the category-specific score—for each evaluation data category—the system 110 can analyze each separate evaluation data set (e.g., each publication, outcome, user review, etc.) included in that respective category.

To further clarify this concept, FIG. 3D shows an example where multiple publications are included in the publications category (e.g., $310c_{1a}$, $310c_{2a}$), and demonstrating, by example, how to determine the category-specific score for publications.

As shown, the publications category includes multiple publications $302d_1$-$302d_n$. To determine the category-specific score 306d for publications (e.g., $310c_{1a}$, $310c_{2a}$ in FIG. 3C), data-specific scores $304d_1$-$304d_n$ are determined in relation to each separate publication associated with the expert.

As explained in greater detail with respect to FIG. 3E, data-specific scores $304d_1$-$304d_n$ can reflect the quality of that publication. For example, a higher-quality publication in glioblastoma or craniotomy is assigned a higher data-specific score.

The data-specific scores $304d_1$-$304d_n$ are then combined, to determine the category-specific score 306d. The combining may occur in any manner, and in accordance with any formula, and may represent a weighted or unweighted combination.

A similar method may be applied to other category-specific scores. For example, to determine the category-specific score for outcomes (e.g., $310c_{1b}$, $310c_{2b}$), data-specific scores are determined for each separate outcome associated with glioblastoma ($310c_{1b}$) or craniotomy ($310c_{2b}$), and then respectively combined to determine the category-specific score for glioblastoma outcomes ($311c_{1b}$) or craniotomy outcomes ($311c_{2b}$). A similar method is also performed to determine category-specific scores for user reviews ($311c_{1c}$, $311c_{2c}$), e.g., by combining data-specific scores for each user review.

Referring now to FIG. 3E, there is shown, in more detail, a process flow for a method 300e for determining data-specific scores 304d (e.g., in FIG. 3D).

Method 300e exemplifies the process for determining a data-specific score 304d for a single publication 302d (FIG. 3D). It will be appreciated that a similar method may be applied for determining data-specific scores in relation to other types of evaluation data categories.

As shown, at 302e, the system 110 can determine one or more evaluation data category dimensions, associated with the category (e.g., publications). For instance, as exemplified in FIGS. 2 and 3E, the publications category 212 may be evaluated against: (i) a contribution level dimension 204a, and (ii) an impact level dimension 204b.

The contribution level dimension 204a can assess the level of contribution of the expert to that publication 302d (FIG. 3D). In contrast, the impact level dimension 204b can assess the impact of that publication, which the expert is named on, in the relevant field.

To this end, evaluation data dimensions 204a, 204b assist in generating a dimension-specific score for each publication 302d, e.g., based on the contribution level of the expert and the impact level of the publication.

More particularly, as shown in FIG. 3E, in respect of each evaluation data dimension 204a, 204b—a dimension score 308e is determined. For example, a dimension score $308e_1$ is determined for the contribution level dimension 204a, and a dimension score $308e_2$ is determined for the impact level dimension 204b. The dimension scores are then combined, at 308e, to determine the data-specific score 304d for that publication. The combining may occur in any manner, and in accordance with any formula, and may represent a weighted or unweighted combination.

In more detail, to determine the respective dimension scores 308e: for each dimension, one or more assessment factors are evaluated at 304e (see e.g., FIG. 2). At 306e, a factor score is assigned to each assessment factor.

For example, to determine the contribution level dimension score $308e_1$: the relevant assessment factors can include the "position of authorship" $206a_1$. For example, an author who is the first named author may be assigned a higher factor score 304e for that publication than an author who is the last-listed author on the publication.

Similarly, to determine the impact level dimension score $308e_1$, the relevant assessment factors can include, but are not limited to, (i) an impact factor of the journal in which the publication is published $206a_2$, (ii) the number of citations of the publication $206b_2$, (iii) the type of publication $206c_2$, and/or (iii) the publication date $206d_2$ (FIG. 2). Accordingly, a factor score may be assigned to each one of these assessment factors.

For example, in respect of the impact factor of the journal $206a_2$—a publication in a journal having a higher impact factor (e.g., a prestigious or well-regarded journal) may be assigned a greater score than a publication in a journal having a lower impact factor.

For example, the system 110 may have a pre-stored database of various journals, as well as pre-determined numerical grades associated with their impact factor. Accordingly, the system 110 can determine the journal associated with the publication 302d (e.g., by analyzing the publication text or based on the data source 120 supplying the publication). The system 110 can then cross-reference that journal to the database to determine the numerical grade of that journal. The factor score for "impact factor of journal" may then correspond to the numerical grade for the journal. In other cases, the impact factor of the journal may be received from an external data source. For example, external third-party organizations may provide impact factor ratings, which may be relied on to determine the impact factor.

In respect of the number of citations of the publication $206b_2$ (FIG. 2), a publication with larger number of citations may be allocated a higher factor score than a publication with a lower number of citations. Accordingly, the system 110 may determine the number of times the publication was cited, and based on this, can allocate a higher or lower factor score.

In respect of the type of publication $206c_2$, more important publication types (e.g., a guideline or clinic trial versus a case report, letter to the editor, etc.) can be allocated a higher factor score than less important publication types. To this end, the system 110 may also have a pre-stored database that correlates different types of publication to different factor scores.

In respect of the publication date $206d_2$, a more recent publication date may be assigned higher factor scores than dated publication dates.

In FIG. 3E, the factor scores—for each dimension—may then be combined to determine the respective dimension score. In some cases, this is an unweighted combination. In other cases, this is a weighted combination (e.g., to weight some assessment factors more heavily than others).

It will be appreciated that the evaluation data dimensions and assessment factors in FIG. 3E are unique to the publications category, and that different evaluation data dimensions and assessment factors can be used to determine data-specific scores for other evaluation data categories (e.g., outcomes, user reviews, etc.).

Figure 7A:
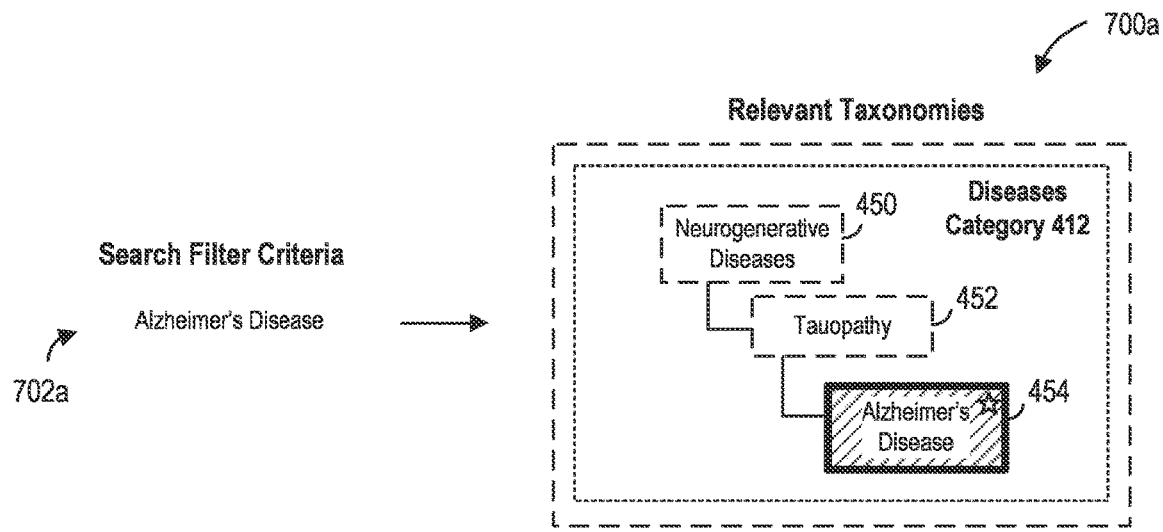
FIG. 7A is an example of identifying taxonomy categories associated with a search filter criteria, according to some example embodiments.
Figure 7B:
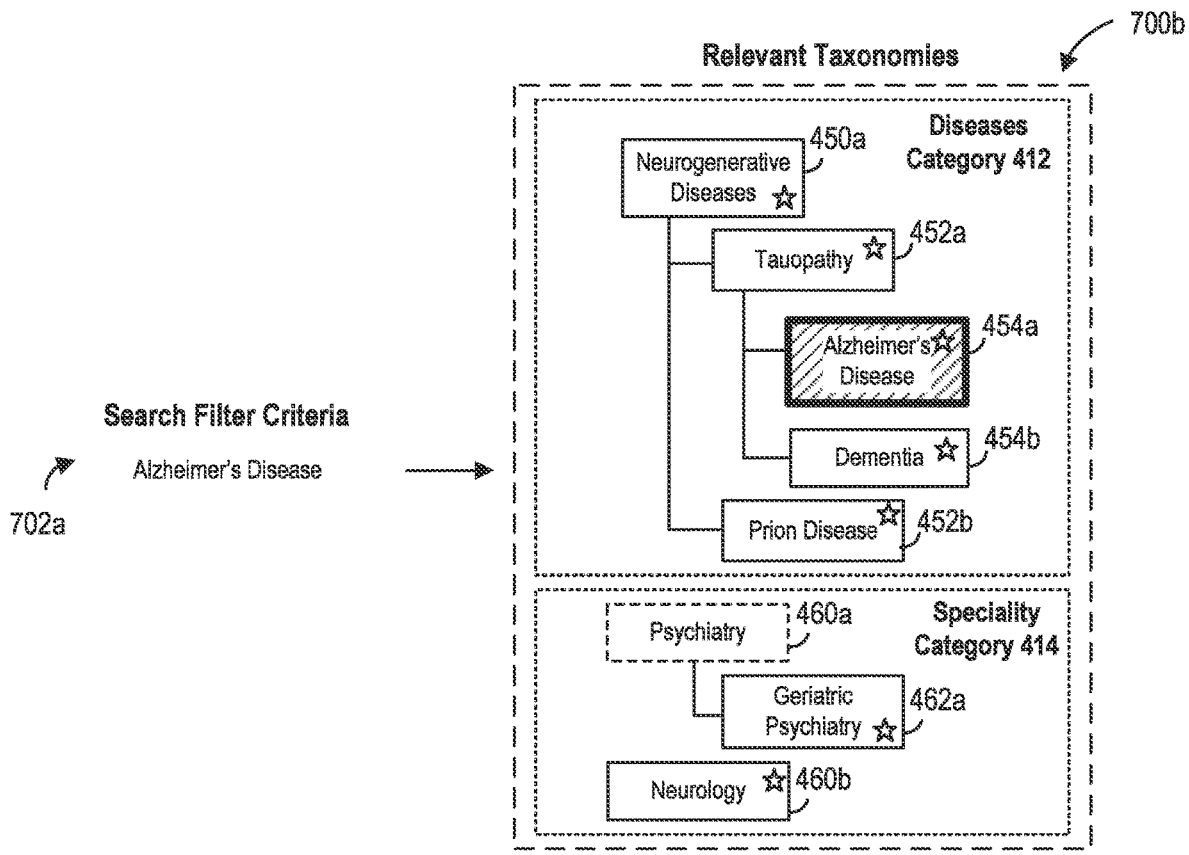
FIG. 7B is an example of identifying taxonomy categories associated with a search filter criteria, according to some other example embodiments.
Figure 7C:
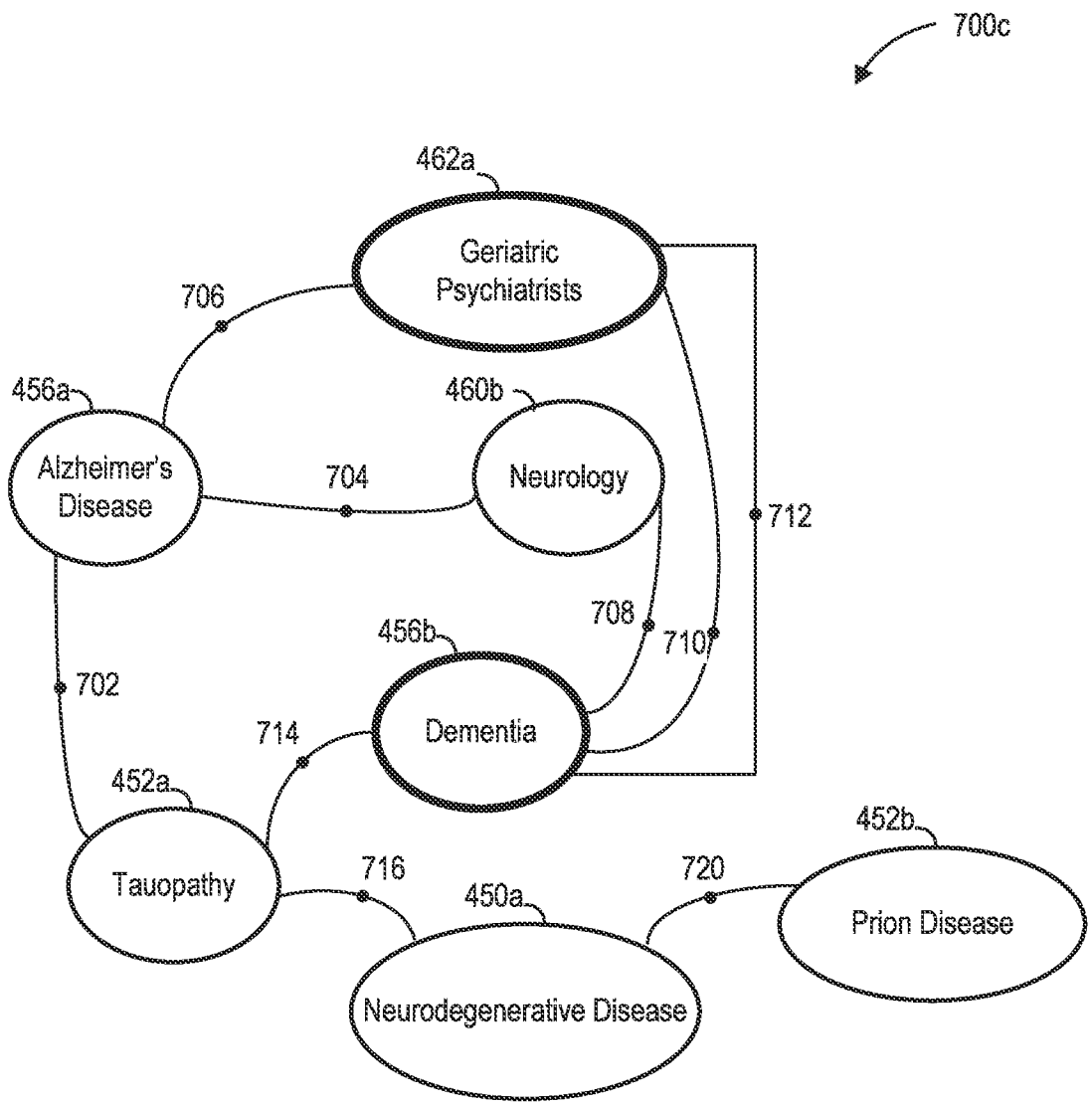
FIG. 7C is an example embodiment of a relational model between multiple taxonomy categories and sub-categories.

Referring now to FIG. 7A-7C, in some cases, the expert ranking system 110 may allow for higher-order, or more complex ranking processes. These processes, in turn, can generate more accurate rankings More particularly, at act 304b in FIG. 3B: in addition to identifying taxonomy categories directly associated with the search criteria (also referred to herein as primary taxonomy categories), the system 110 can also identify one or more taxonomy categories indirectly relevant to the search criteria (also referred to herein as secondary taxonomy categories). Analysis of the secondary categories, in methods 300a and 300b, may enhance the overall accuracy of the ranking of experts.

To further clarify this concept, FIG. 7A shows an example where the search filter criteria 702a is Alzheimer's disease (act 302b in FIG. 3B), e.g., a user desires a ranking of experts specialized in Alzheimer's.

As shown, in a simplified case, at act 304b of FIG. 3B—the system 110 simply maps the search criteria "Alzheimer's disease" to the relevant taxonomy category of "Alzheimer's disease" (e.g., a disease variation taxonomy sub-category 454). That is, a one-to-one mapping between search criteria and taxonomy category as previously exemplified in FIGS. 4B and 4C. At act 306b of FIG. 3B, the system 110 proceeds to analyze evaluation data associated with the taxonomy sub-category 454.

As noted above, in some cases, more accurate rankings can be generated by considering a larger number of related taxonomy categories and sub-categories.

For example, referring now to FIGS. 7B and 7C, in some embodiment—at act 304b in FIG. 3B, in addition to identifying the taxonomy category associated with "Alzheimer's disease", the system 110 may also identify other relevant secondary categories. For example, this can include identifying the sub-disease taxonomy category "tauopathy" 452a, as well as the general disease taxonomy category "neurogenerative diseases" 450a.

More particularly, it is appreciated that, to generate accurate rankings of experts in treating Alzheimer's, the system can also consider how these experts perform, more generally, in treating the broader class of tauopathy diseases and neurogenerative diseases. That is, experts skilled—more broadly—in the treatment of tauopathy-based and neurogenerative diseases, are likely to perform better in treating Alzheimer's disease. Accordingly, the expert-specific evaluation data, associated with taxonomy categories tauopathy 452a and neurogenerative diseases 450a, is also considered (e.g., at act 306b in FIG. 3B), when generating rankings of experts for Alzheimer's disease.

By a similar token, system 110 may also consider highly related tauopathy diseases (e.g., dementia 454b) as well as highly related neurogenerative diseases 450a (e.g., prion disease 452b).

The system 110 can also identify relevant specialty taxonomy categories 414. For example, evaluation data related to the sub-specialty "geriatric psychiatry" 462a—as well as the broader specialty of "neurology" 460b—may also be considered in generating rankings for treatment of Alzheimer's. In other words, experts that are well-regarded in the fields of "geriatric physiatry" 462a and "neurology" 460b, may be ranked higher in the treatment of "Alzheimer's diseases".

In view of the foregoing, at act 304b in method 300b of FIG. 3B—for each search filter criteria, the system 110 may: (i) initially, determine at least one primary taxonomy category associated with that search filter criteria (e.g., Alzheimer's disease 456a). The primary category may be a taxonomy category that maps directly to the search criteria, and (ii) subsequently, determine if there are one or more secondary taxonomy categories, also associated with the search filter criteria (e.g., neurogenerative diseases 450a, tauopathy 452a, dementia 456b, prior disease 452b, geriatric psychiatry 462a, and neurology 460b). Secondary categories indirectly map to the search filter criteria, and are relevant to generating rankings for the search filter criteria.

In at least one embodiment, the secondary categories are determined by referencing pre-determined relational data. For example, data storage 114, may store a relational model 700c (FIG. 7C), which comprises pre-defined relationships between various taxonomy categories. That is, the relational model can include pre-defined relationships between a primary taxonomy category (e.g., Alzheimer's disease 456a) and one or more secondary taxonomy categories. Accordingly, the processor 112 may simply access and/or reference the pre-defined relational model 700c to identify the relevant secondary taxonomy categories at act 304b of FIG. 3B.

In some cases, the pre-defined relational model 700c may also store weighted bias measures 702-720 for combining the taxonomy scores for each taxonomy category (e.g., analogous to the bias weight 316c in FIG. 3C). To this end, the taxonomy bias score, for each taxonomy category, can be related to its relative position in the relational model 700c. For example, the taxonomy bias score related to dementia 456b may depend on the taxonomy weighted score related to geriatric psychiatrists 462a.

In view of the above discussion, a number of important points will now be appreciated in respect of the described systems and methods.

First, the ability of the system to generate up-to-date expert rankings (e.g., based on a real-time or near real-time feed of evaluation data) may be a significant feature to ensuring the reliability and trustworthiness of the system. For example, in a highly-evolving field (e.g., a medical field), receiving up-to-date evaluation data may be critical to ensuring the system is presenting up-to-date identification, rating and rankings of medical experts. In turn, this up-to-date identification, rating and ranking may form the basis of life-critical decisions for users of the systems (e.g., in assessing which experts to select for a particular treatment).

Further, on a related note, when considering the volume of data sources 120 available—many of which are online data sources—it is simply not possible for the human-mind to: (i) access the multitude of online data sources, concurrently in real-time or near real-time, to receive evaluation data for potentially hundreds, thousands, or hundreds of thousands of experts (act 302a in FIG. 3A); (ii) pre-process the evaluation data to generate standardized data, in real-time or near real-time (act 304a in FIG. 3A), (iii) automatically analyze and process the received evaluation data, from each data source, to curate the evaluation data, including performing disambiguation of this data (e.g., acts 306a-310a of FIG. 3A), and (iv) generate complex filtered (or unfiltered) multi-dimensional ratings and rankings for these experts in graphical user interfaces, which can be continuously updated in real-time or near real-time based on newly received evaluation data (e.g., acts 312a-316a of FIG. 3A, and method 300b of FIG. 3B). Rather, advanced computing systems and technologies are necessarily required for realization of this concept.

Still further, the use of computing technologies is necessarily required to enable practical scalability of the system to accommodate identification, rating and rankings of a large numbers of experts (e.g., hundreds, thousands, hundreds of thousands or millions, rather than merely five or ten experts).

For instance, in an example application involving the medical field, it is important for the system to provide users with a consolidated and unified database of as many experts available in as many institutions, geographic regions and sub-domains of medical expertise, as possible. In turn, users can rely on the system to parse through all available experts (e.g., irrespective of the expert's geographic location, sub-domain of medical expertise, etc.). In contrast, if only a small segment of experts are available on the system, the utility of the system is diminished to the user. That is, the user is no longer able to rely on the system to parse through all available expert options, and identify the best options.

Therefore, a novel value of the system is in its ability to process large volumes of data, in relation to large number of experts—in real-time or near real-time—such that the system can be relied on as a trusted comparative tool for all available experts in a field, without the need for further research by the user. Yet, for the system to process large volumes of data corresponding to a large number of experts—and in real-time or near real-time—automated computing technologies with high processing power and large memory space are necessarily required. In at least some embodiments, the disclosed embodiments can be used to generate real-time or near real-time rankings for experts in a universe involving: (i) over 100 experts; (ii) over 1,000 experts; (iii) over 100,000 experts, etc., while concurrently accessing a universe of data sources that may include, e.g., (i) over 100 data sources, (ii) over 1,000 data sources, and (iii) over 100,000 data sources.

On this note, the methodology described in FIGS. 3A and 3B presents an efficient method of curating and then analyzing large volumes of data, such as to enable computing technologies to generate real-time or near real-time and up-to-date rankings with minimal delay or latency (e.g., low processing time and speed). That is, as the user enters search filter criteria (312a in FIG. 3A), the system is able to generate and display near instantaneous rankings, with minimal computational and processing time (e.g., the system can update the graphical interface to show filtered rankings with minimal delay or latency to the end-user).

Alternative computing systems, with less efficient processes for curating and analyzing evaluation data, would demonstrate large latency times in updating a graphical interface to show filtered rankings, e.g., owing to the large volumes of data the system is required to parse through before generating the rankings. In particular, the inventors have appreciated that a reason for the paucity of existing systems that can identify, rate and rank large numbers of experts in a unified and/or consolidated manner is that it can be overwhelming on the system's processing capability to analyze the data efficiently and accurately. This is addressed in the present case by the methodologies described herein, which assess and analyzes data in a novel and efficient manner, and with a view to minimizing computational time, power and resources, and in a highly-scalable manner.

Moreover, as the number of experts added to the system increases, the computational efficiency of the methods herein, as compared to alternative methods, also increases in proportion, such that in the universe of a large amount of evaluation datasets, the efficiency of the disclosed method and system becomes more pronounced, and the delay/latency is smaller. In particular, the low latency, in generating filtered rankings, is not only generally more desirable to the end-user, but can also have practical applications in important situations, such as for example, emergency situations where a user is attempting to immediately locate a medical expert to address a medical emergency.

IV. Example Machine Learning Model for Disambiguation and Normalization of Data The following describes a disambiguation and normalization process for evaluation data. The processes described herein rely on the use of various machine learning models.

The processes described herein can be applied anywhere, in the above discussion, which references disambiguation and/or normalization of data.

As explained at act 304*a*, FIG. 3A, evaluation data may need pre-processing. This can involve disambiguation and normalizing of the data. Disambiguation and normalizations are also useful in other stages of the data curation process (FIG. 3A).

Figure 8:
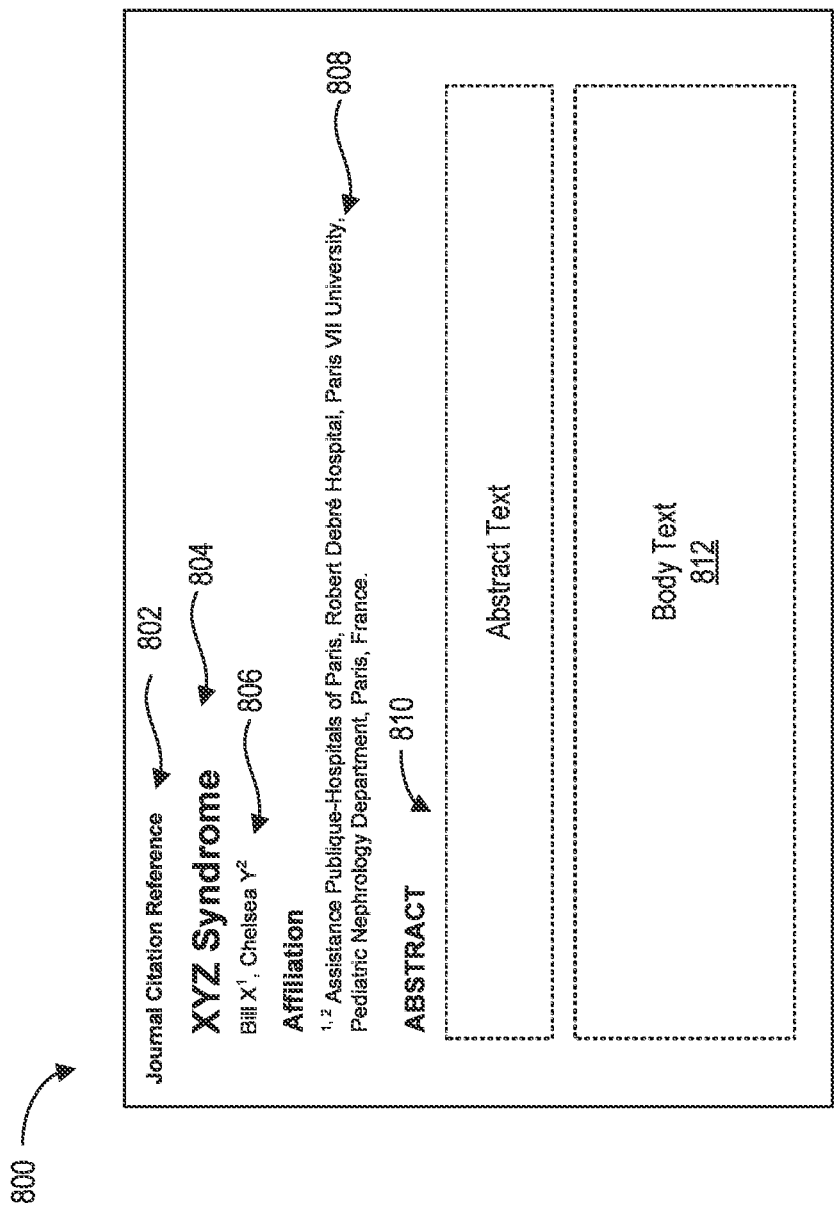
FIG. 8 illustrates an example cover page for publication data.

To further clarify this concept, reference is made to FIG. 8, which shows example publication data 800 that can be retrieved, and analyzed (see e.g., publication evaluation data 212, in FIG. 2). The publication data is only used by way of one non-limiting example of disambiguation and normalization.

Generally, the cover page—for a retrieved academic publication—includes multiple text sections. These include: a journal citation 802, a title 804, authors 806, institutional affiliation 808, an abstract 810, and the publication body text 812.

Focusing, by way of example, on the affiliation data 808—the affiliation data is a class of information related to the entity where an expert works and/or provides expertise. This can be a physical or legal entity. For example, the affiliation can be a hospital, a clinic, a research center, a legal office, a university, etc. An affiliation is used to identify the legal entity, and the physical location of that entity that relates to the expert.

When pre-processing publication data, it is important to resolve the affiliation data. This allows the system to identify which institution(s) the experts work-in. In turn, this assists in generating rankings of experts and associated institutions.

An expert can refer (or work) to none, one, or multiple affiliations. An expert can change affiliations during their career one or multiple times. An expert can refer simultaneously to multiple affiliations depending on the type of information expressed in the ranking. For instance, for publications in journals (e.g., legal, business publications), it is not unusual for an expert to refer to multiple affiliations if the subject is related to professional activities in a company and, at the same time, research for a university or research center.

Affiliations can be related to each other and completely independent from one another. An affiliation can belong to a parent affiliation and be part of a cluster at the city, state, national or international level. Like experts, the relationship between affiliations can be complex to represent in a hierarchical structure and, in multiple cases, better represented as a graph structure with Ontology mapping.

As almost every data source uses information, not only on expert but also on the affiliation(s), it is important to have the ability to extract affiliation information from data sources, process it, and classify it.

Importantly, in many cases, within the same or different data sources, it is not unusual to have the same affiliation named in multiple formats, names, languages, acronyms, etc. In some cases, a full address is provided, in others, just the city name. In most cases, the name of the affiliation is provided without further details. For example, different academic publication databases use different formats to express the same data.

For example, consider the following three affiliation texts, extracted from different publications:
  a) Assistance Publique-Hospitals of Paris, Robert Debré Hospital, Paris VII University, Pediatric Nephrology Department, Paris, France.
  b) Ped. Neph. Dept, AP HP, Univ. of Paris VI, Paris, France.
  c) Assistance Publique-Hôpitaux de Paris, Hôpital Robert Debré, Université Paris VII, Pediatric Nephrology Department, Paris, France.

All of these affiliations—extracted from publications—reference to the same institution. However, each affiliation is expressed in a slightly different manner. For example, (a) and (b) are both in English, but organize the information in a different order. Further, whereas text (a) uses full names, text (b) uses acronyms (e.g., Univ. of Paris VI). Text (c) also refers to the same institution, but is presented in French. In other cases, an affiliation text box can mix multiple languages, e.g., English and French.

In view of this, it is important that the system associate all three texts (a)-(c) with the same institution, notwithstanding discrepancies. This ensures the consistency of the system.

Figure 9A:
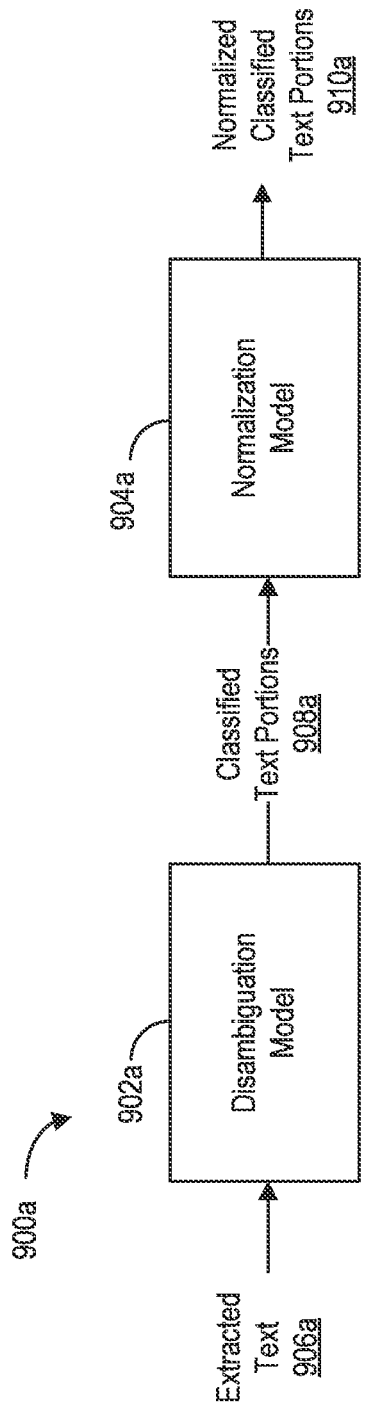
FIG. 9A is an example process for disambiguation and normalization.

Reference is now made to FIG. 9A, which shows an example process 1000*a* for disambiguation and normalization of textual evaluation data.

In one example, the process 900*a* is used for affiliation textual data—but it is understood that the process 900*a* can be applied to many other types of textual data.

As shown, the process 900*a* includes a disambiguation model 902*a* and a normalization model 904*a*. As explained herein, both models 902*a*, 904*a* can comprise trained machine learning model. In one example, the models are consolidated into a single trained machine learning model.

Disambiguation model 902*a* receives extracted text 906*a* (e.g., affiliation text). The disambiguation model 902*a* classifies different textual portions, within the text.

For example, considering the extracted text "Assistance Publique-Hospitals of Paris, Robert Debré Hospital, Paris VII University, Pediatric Nephrology Department, Paris, France." The disambiguation model 902*a* determines that "Paris VII University" corresponds to the university institution, and "Assistance Publique-Hopitaux de Paris" refers to the hospital.

In another example, the disambiguation model 902*a* can receive the text "1002a AP HP, Univ. of Paris VI, Paris, France". Here, the model determines that "Uni. of Paris VI" refers to the institution, similar to ""Paris VII University". Further, the model determines that "AP HP" refers to the hospital, similar to "Assistance Publique-Hopitaux de Paris"

Accordingly, the disambiguation model 902*a* acts as a classifier, to classify different textual portions of an extracted text. The output of the disambiguation model is then one or more classified text portions.

In some examples, the output of the disambiguation model 902*a* can include different text portions, and a classification label associated with that text portion.

In at least one example, the disambiguation model 902*a* is pre-configured to identify text portions associated with pre-defined classification labels. For example, the disambiguation model 902*a* can always analyze affiliation data to locate: the institution, department, address, city, state, etc.

In at least one example, disambiguation model 902*a* can populate a pre-defined table. The table includes a column for the pre-defined classification label, and a copy of relevant text portion. For example, if the affiliation text is as follows: "Dept. of Prostho., Gerodontology and Biomaterials, Univ. of Greifswald, Rotgerberstr. 8, 17475 Greifswald, Deutchland. xyz@web.de", the pre-defined table can be populated as follows:

| Classification Label | Extracted Text Portion |
| --- | --- |
| Department | Dept. of Prostho. |
| Institution | Univ. of Greifswald |
| Address | Rotgerberstr. 8 |
| City | Greifswald |
| State | |
| ZIP | 17475 |
| Country | Deutschland |
| Email address | xyz@web.de |
| Cluster | |
| Division | Gerodontology and Biomaterials |

The disambiguation model 902a can be pre-configured to identify different classification labels for different types of text. The above example is only one example for affiliation text.

Referring still to FIG. 9A, the output of the disambiguation model 902a are classified text portions 908a. This output is fed as an input into the normalization model 904a.

Broadly, the function of the normalization model 904a is to normalize the classified text, into a common format. For instance, using the above example—the normalized output can comprise the following:

| Classification Label | Normalized Extracted Text Portion |
| --- | --- |
| Department | Department of Prosthodontics |
| Institution | University of Greifswald |
| Address | Rotgerberstrauss 8 |
| City | Greifswald |
| State | |
| ZIP | 17475 |
| Country | Germany |
| Email address | xyz@web.de |
| Cluster | |
| Division | Gerodontology and Biomaterials |

Accordingly, the normalization model 904a standardizes the classified department from the abbreviated "Dept. of Pros." to "Department of Prosthodontics". Similarly, "Univ. of Griefswald" is now standardized to "University of Griefswald". The country "Deutchland" is now translated into a standard English, "Germany" (i.e., the normalization model also performs translation).

In this manner, the output of the normalization model 904a is normalized text 910a, made uniform. This allows the multi-dimensional ranking system to correctly, and accurately associate the publication evaluation data—and the expert authors—with the correct institution, department, city, and the like.

For example, a Dr. Bill X or Dr. Chelsea Y is now associated with the department of prosthodontics at the University of Griefswald. Further, the publication associated with Dr. Bill X or Dr. Chelsea Y, is also associated with the same institution and department.

The ability to disambiguate and normalize affiliation data within one data source, and across data sources, is one of the important blocks of correlating relevant data points to an expert. For example, if analyzing expert's publications—it is important to correlate multiple data sources to compound all the expert publications. Publication data sources could be library databases, worldwide publication databases, journal databases, EEC registries, etc. As there is no single source of truth for publications, the ability to correlate information at the affiliation level is one of many challenges to assessing an individual's expertise.

In addition, as stated previously, the affiliation disambiguation and normalization process needs to reconcile information across languages and ASCII characters (e.g., Kanzi, Cyrillic, Arabic, etc.) and comprehend spelling mistakes, acronyms, changes of names, cluster names, etc.

Unlike other ranking AI methods, the affiliation and disambiguation AI algorithm must be able to disambiguate data at the affiliation and departmental levels whenever possible.

Here, it will be appreciated that when dealing with domain of hundreds of thousands of databases, comprising millions of affiliation text blocks for various academic papers presented in a multitude formats—the process of accurately disambiguating and normalizing the affiliation text is a large undertaking. The use of computerized machine learning models therefore facilitates this process in an accurate and pragmatic manner.

While the discussion herein uses an example of disambiguating and normalizing affiliation data—it is understood that the same models and concepts can be used for any other type of text, extracted from different evaluation data.

In at least one example, the model trained for the disambiguation and normalization is a consolidated Bidirectional Encoder Representations from Transformers (BERT). This model relies on the training set of examples to automatically learn patterns. Extracted data source publication data with the information about authors' affiliations are used as a training set, as explained above.

Figure 9B:
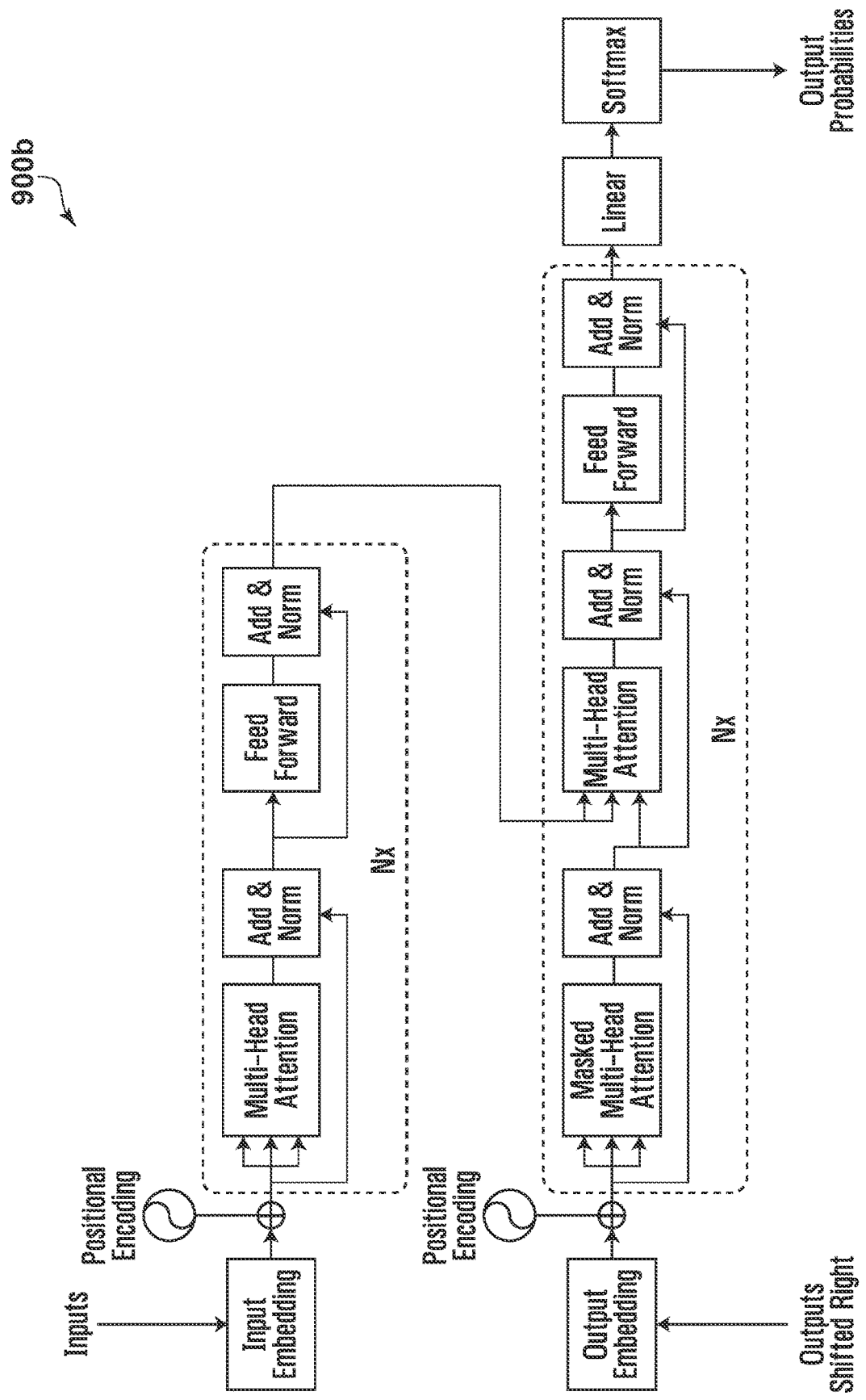
FIG. 9B is an example architecture for a transformer.

FIG. 9B shows an example transformer architecture 900b. Encoder and decoder stacks include N identical layers. Each layer contains two sub-layers. $x^i$ is an input to a Multi-Head Attention sub-layer (Sublayer1), where the output is:

$$z^i = \text{Sublayer1 Norm}(x^1 + \text{Sublayer}(x^i))$$

Output from position-wise fully connected feed-forward neural network (Sublayer2) is:

$$u^i = \text{Sublayer2Norm}(z^i + \text{Sublayer2}(z^i))$$

$u^i$ is fed to the Multi-Head Attention sub-layer in the decoder along with the output from the decoder's Masked Multi-Head Attention sublayer. The input to the Masked Multi-Head Attention sublayer is x(i−1). The output from the decoder flows into linear and SoftMax modules.

The model used with English text is 'roberta-large' while 'bert-base-multilingual-cased' model is used with non-English text.

The following piece of code corresponds to downloading the pretrained model and setting up necessary user-defined labels and model arguments:

```
from simpletransformers.ner import NERModel
from transformers import AutoTokenizer
logging.basicConfig(level=logging.DEBUG)
transformers_logger=logging.getLogger('transformers')
transformers_logger.setLevel(logging.WARNING)
model2=NERModel('bert', 'bert-base-multilingual-cased', labels=custom_labels, args=model_args1)
```

To fine-tune the model, it is necessary to set up the proper model parameters. An example variation is shown below:

```
from simpletransformers.ner import NERModel, NERArgs
model_args1=NERArgs( )
model_args1.overwrite_output_dir=True
model_args1.train_batch_size=16
model_args1.eval_batch_size=16
model_args1.evaluate_during_training=True
model_args1.learning_rate=0.00002408
model_args1.num_train_epochs=5
``` model_args1.fp16=True
model_args1.reprocess_input_data=True
model_args1.use_early_stopping=False
model_args1.early_stopping_delta=0.01
model_args1.early_stopping_metric="precision"
model_args1.early_stopping_metric_minimize=False
model_args1.early_stopping_patience=8
model_args1.save_model_every_epoch=False In one example, the training of the model is performed using a 12 gigabyte NVIDIA® Tesla® K80 GPU. Models being trained with English text are: 'roberta' and 'roberta-large'. The number of training epochs is between 5 and 10, and list of hyper parameters used for training the model are as follows:

model_args1=NERArgs( )
model_args1.overwrite_output_dir=
True #model_args1.output_dir=None
model_args1.train_batch_size=16
model_args1.eval_batch_size=16
model_args1.warmup_steps=500
model_args1.best_model_dir='/content/drive/My-Drive/RYTE/BERT affiliation/Best model'
model_args1.evaluate_during_training=True
model_args1.max_seq_length=64
model_args1.learning_rate=0.00002408
model_args1.learning_rate=0.00004295
model_args1.num_train_epochs=5 or 10
model_args1.fp16=True
model_args1.reprocess_input_data=True
model_args1.use_early_stopping=False
model_args1.early_stopping_delta=0.01
model_args1.early_stopping_metric="precision"
model_args1.early_stopping_metric_minimize=False
model_args1.early_stopping_patience=8
model_args1.evaluate_during_training_steps=181
model_args1.save_model_every_epoch=False V. Examples of Graphical User Interfaces (GUIs) for Multi-Dimensional Ranking Reference is now made to FIGS. 10A-10N, which show various screenshots for graphical user interfaces (GUIs) for searching and identifying of experts.

As explained previously, an aspect of the embodiments herein, is the ability of the system to identify, filter and rank relevant experts that meet user-selectable filter criteria.

Figure 10A:
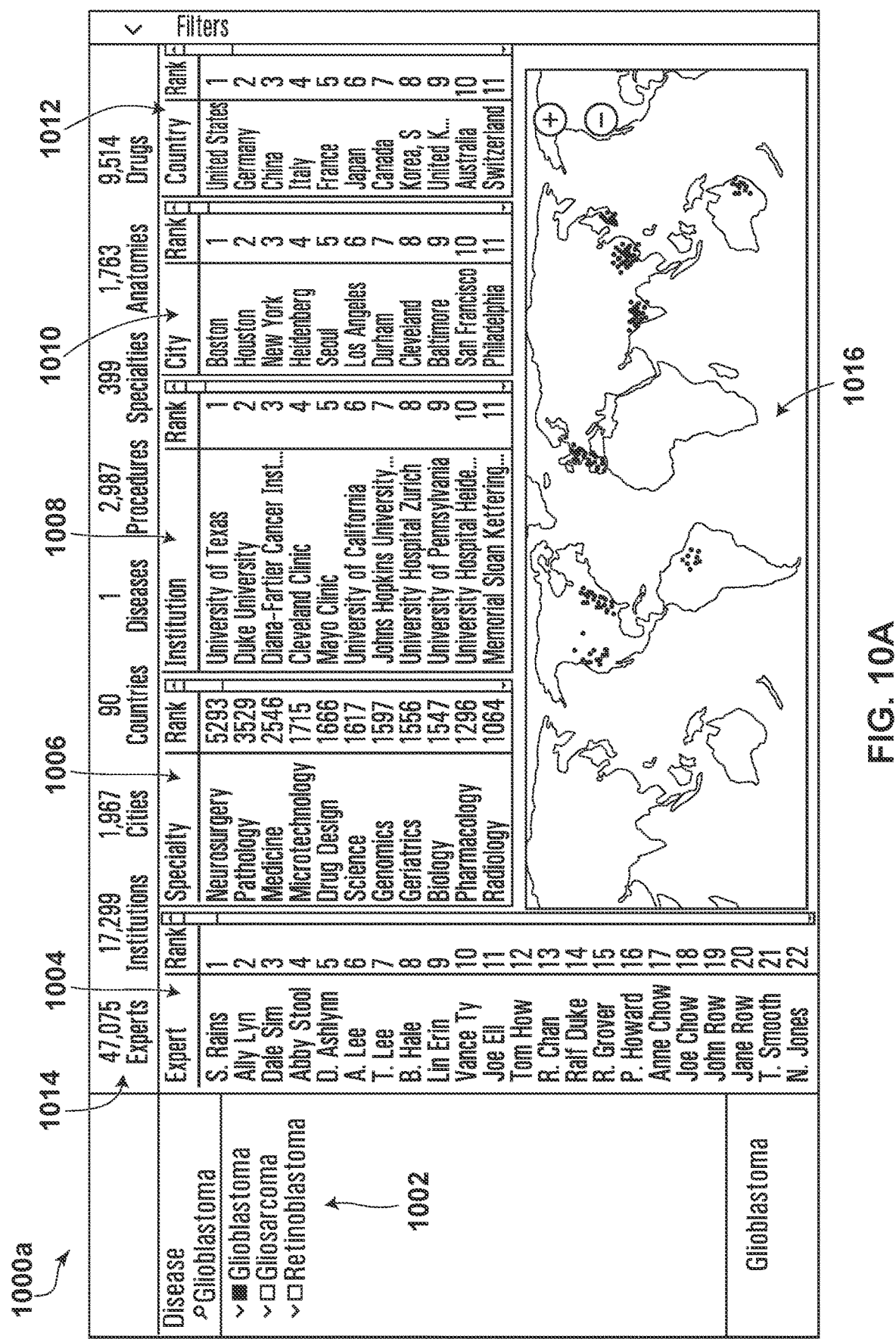
FIGS. 10A-10N are various graphical user interfaces (GUIs) for filtering and searching experts.
Figure 10B:
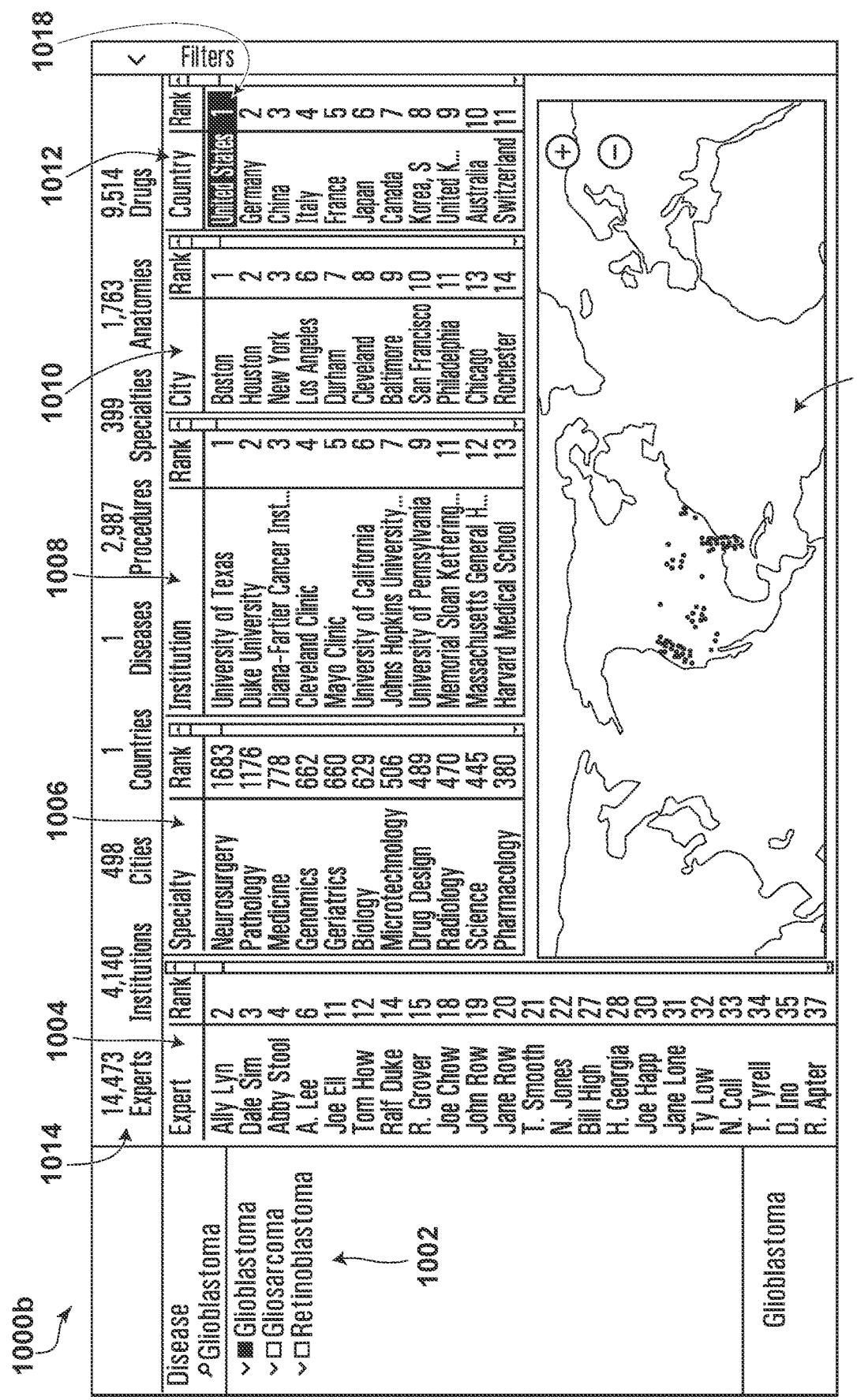
Figure 10C:
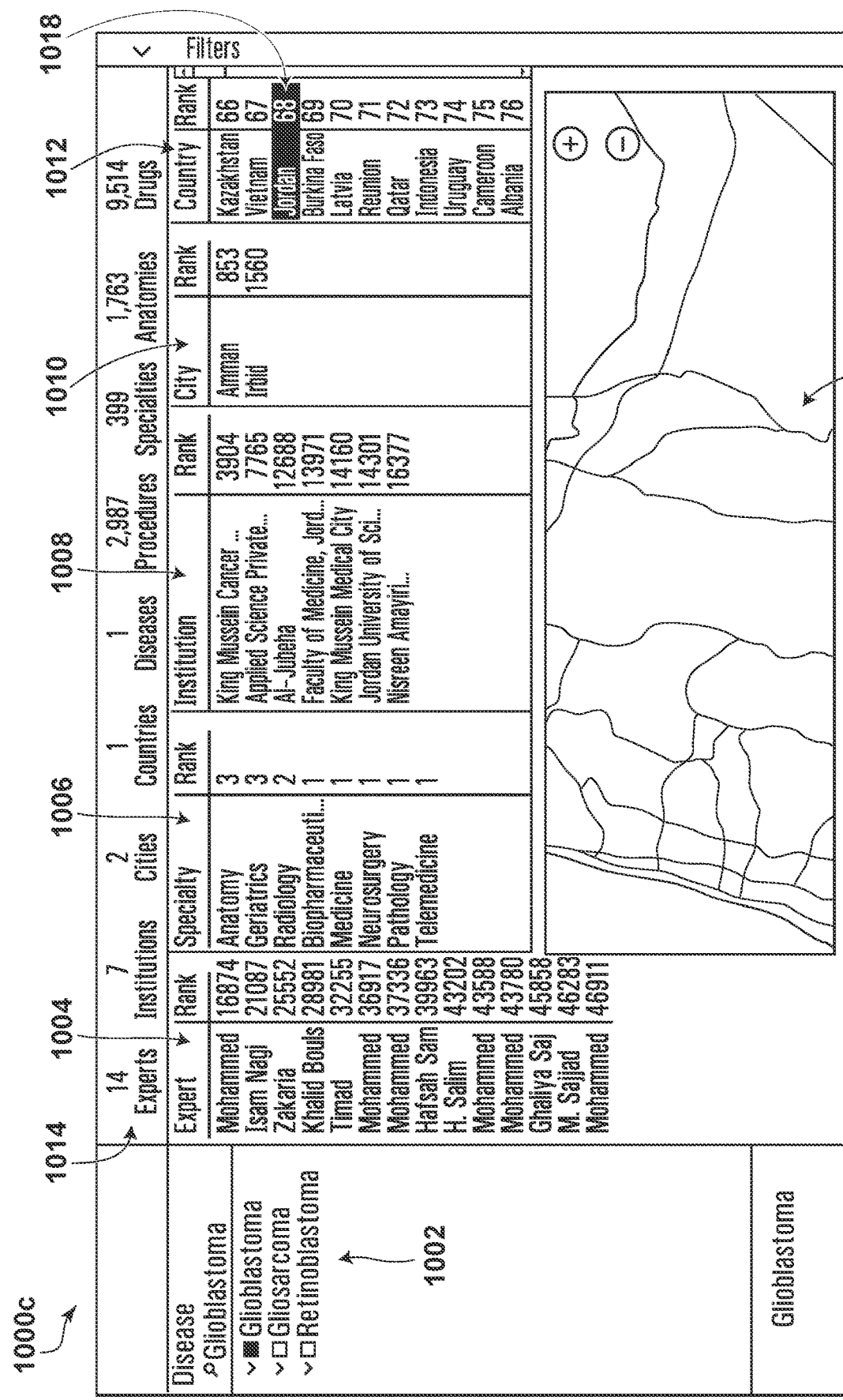
Figure 10D:
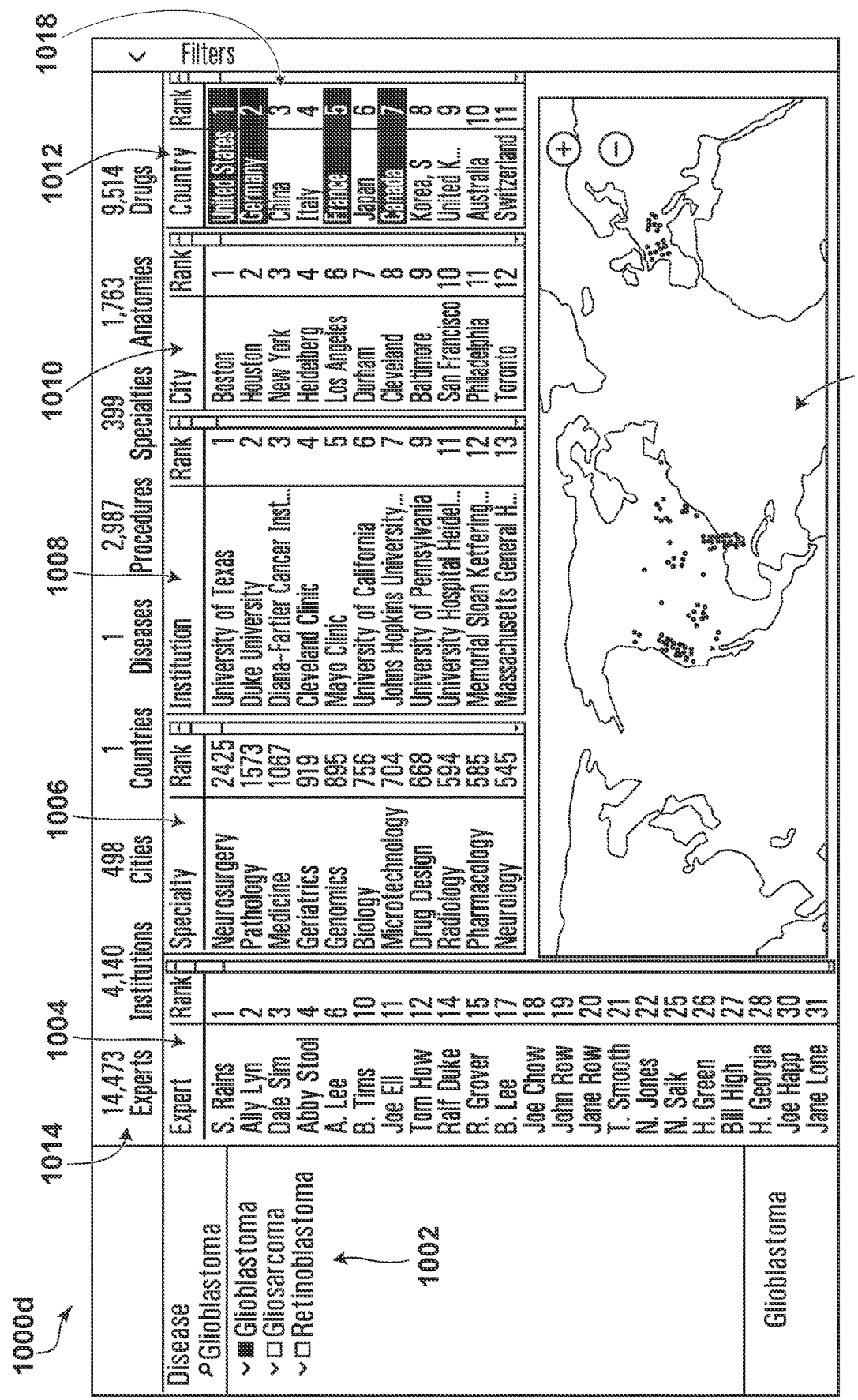
Figure 10E:
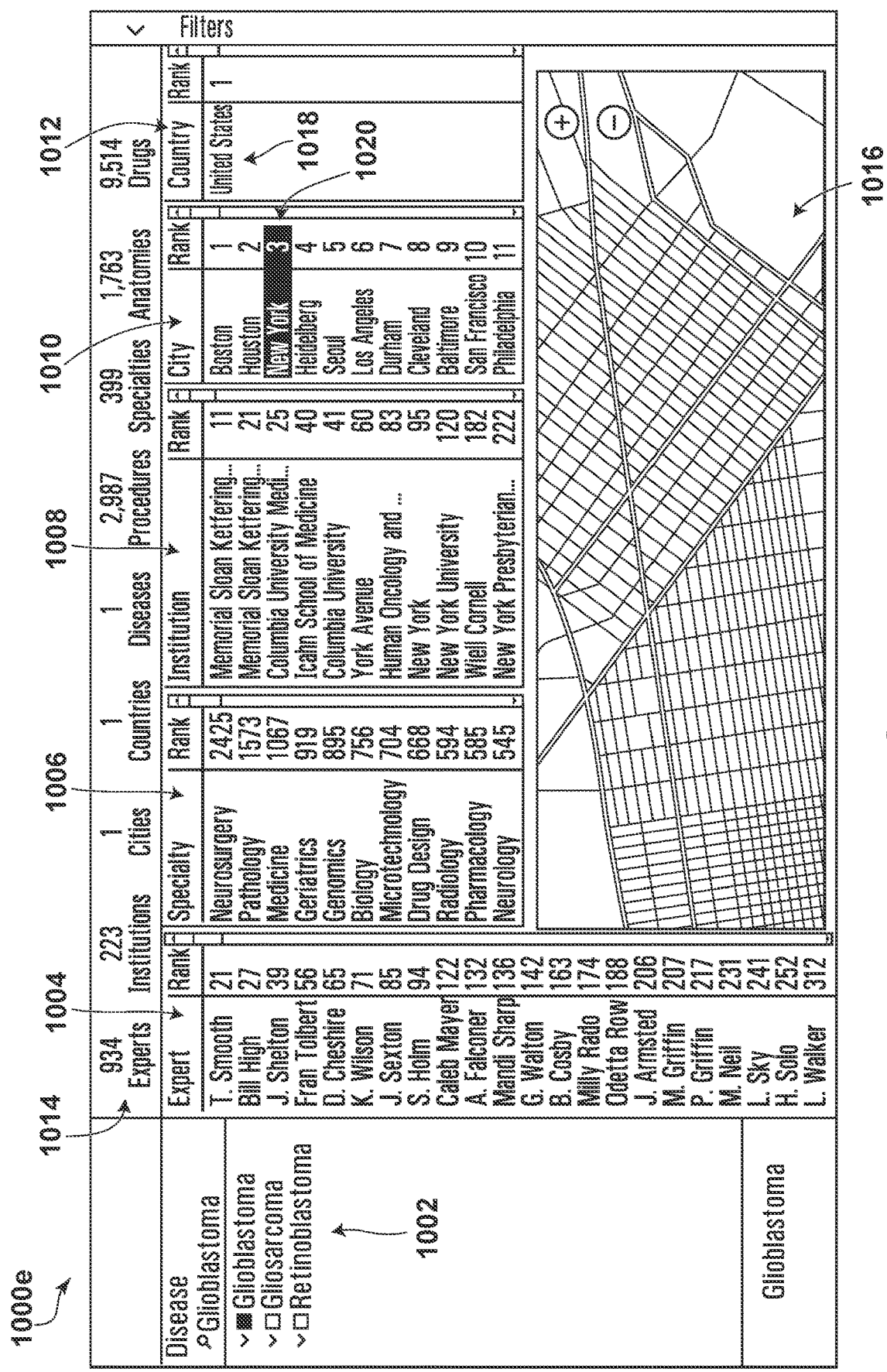
Figure 10F:
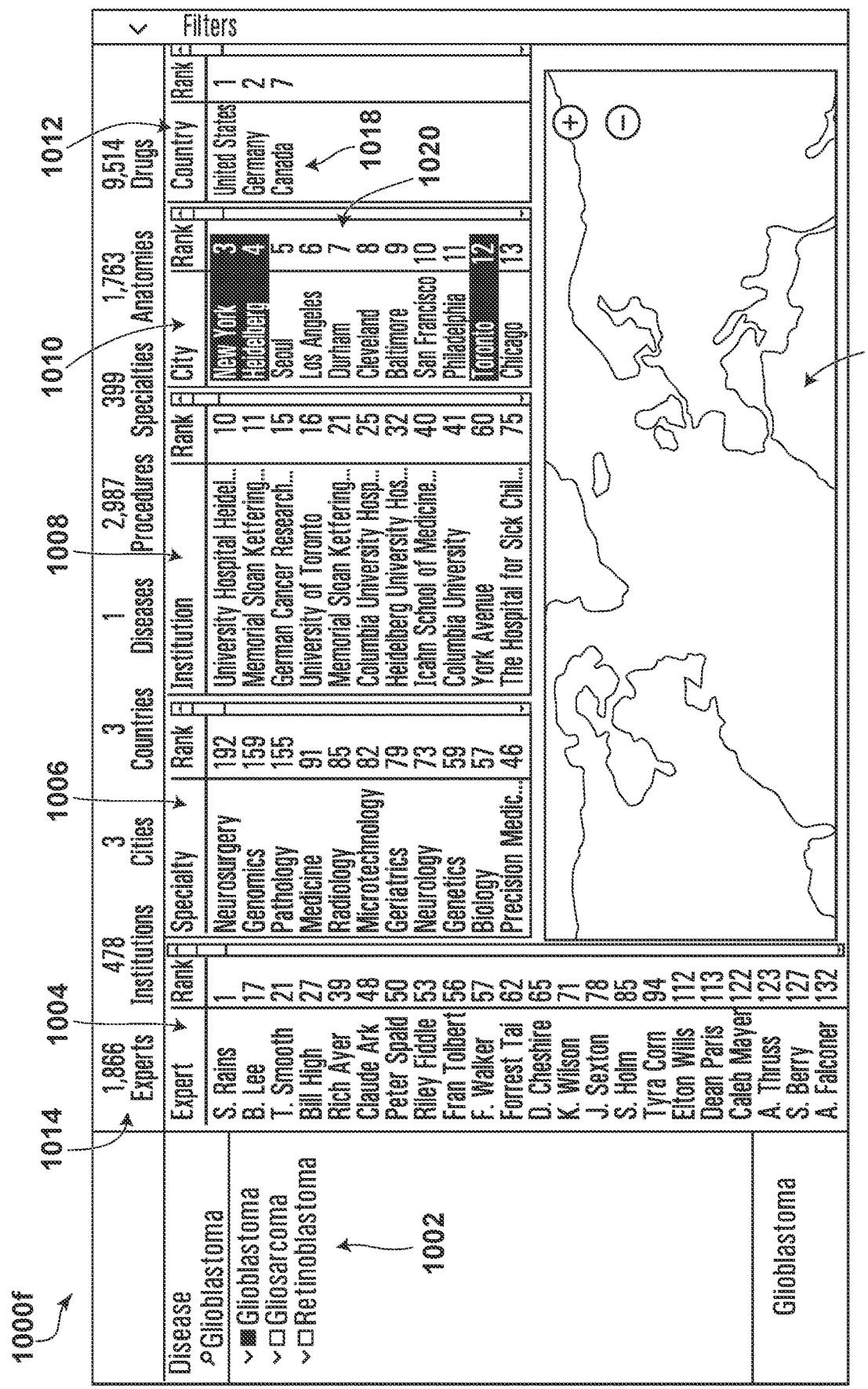
Figure 10G:
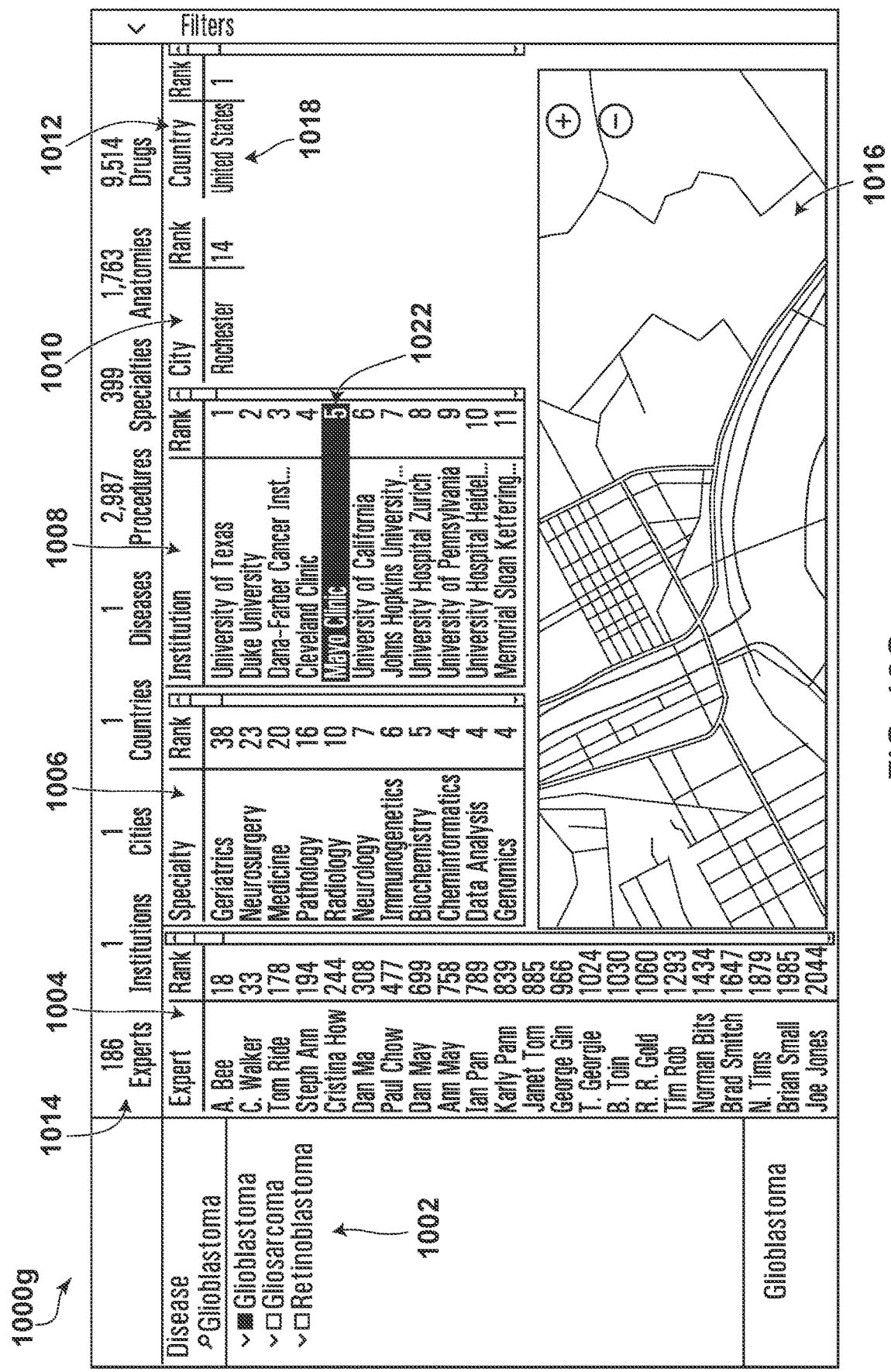
Figure 10H:
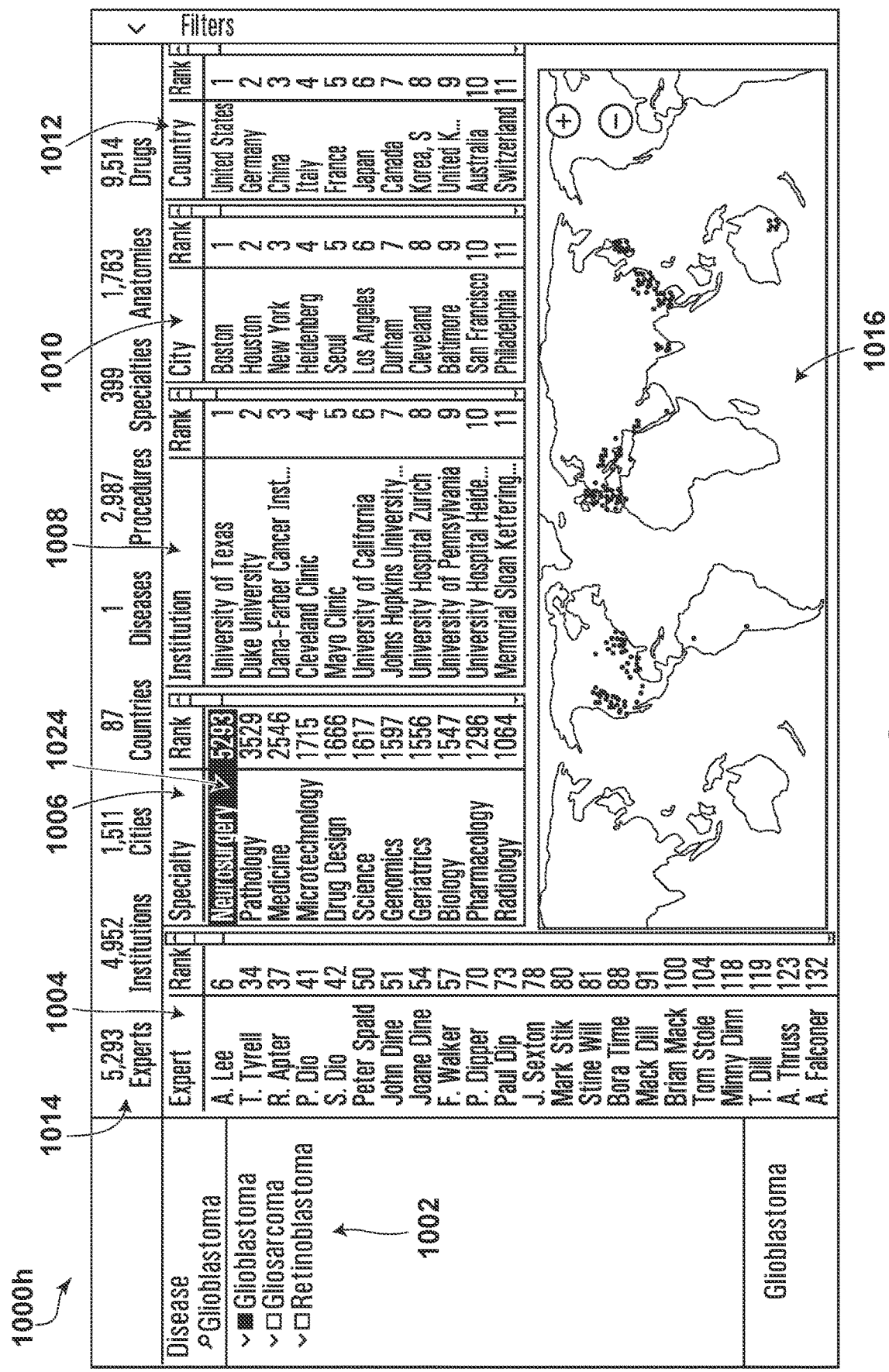
Figure 10I:
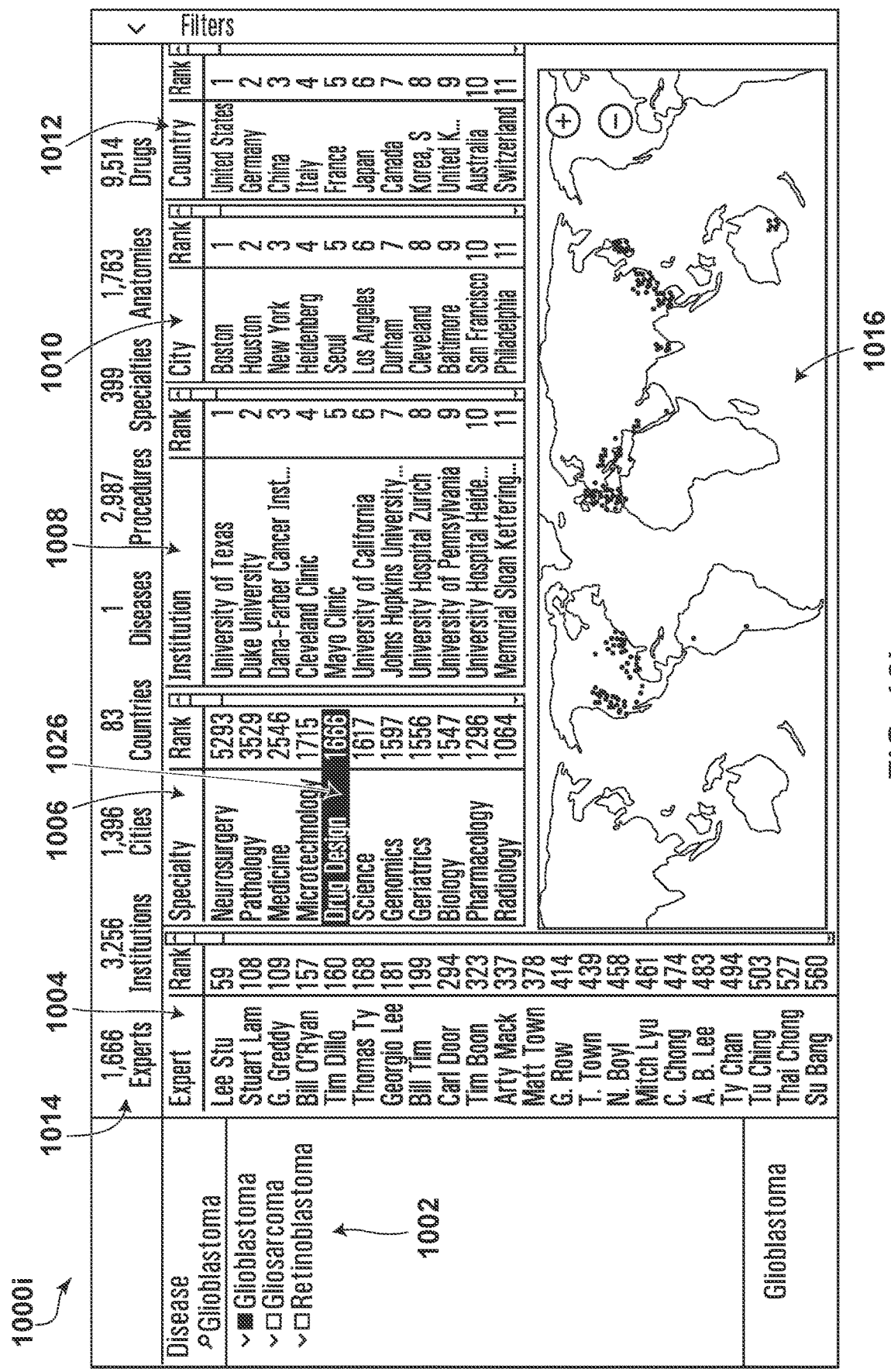
Figure 10J:
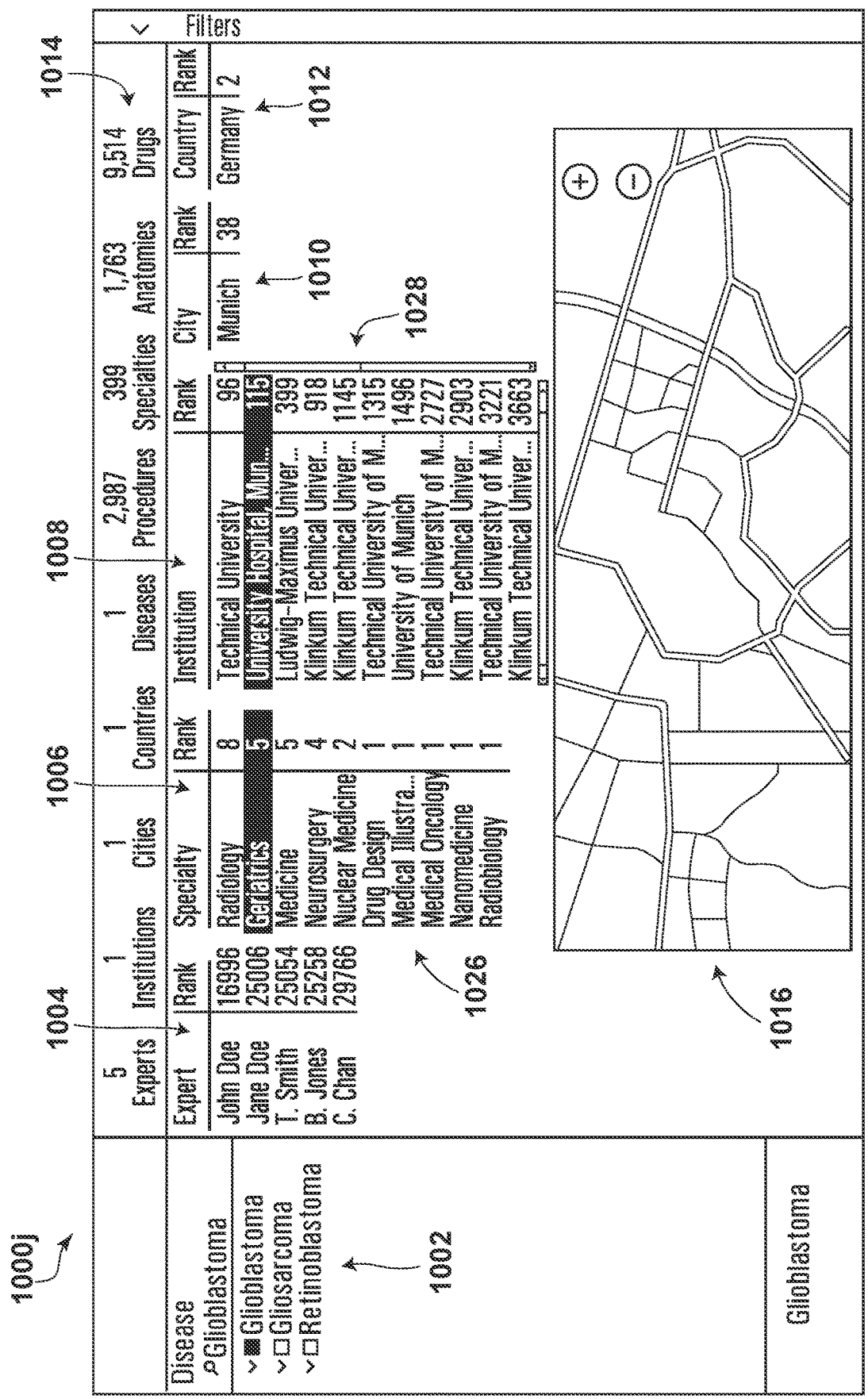
Figure 10K:
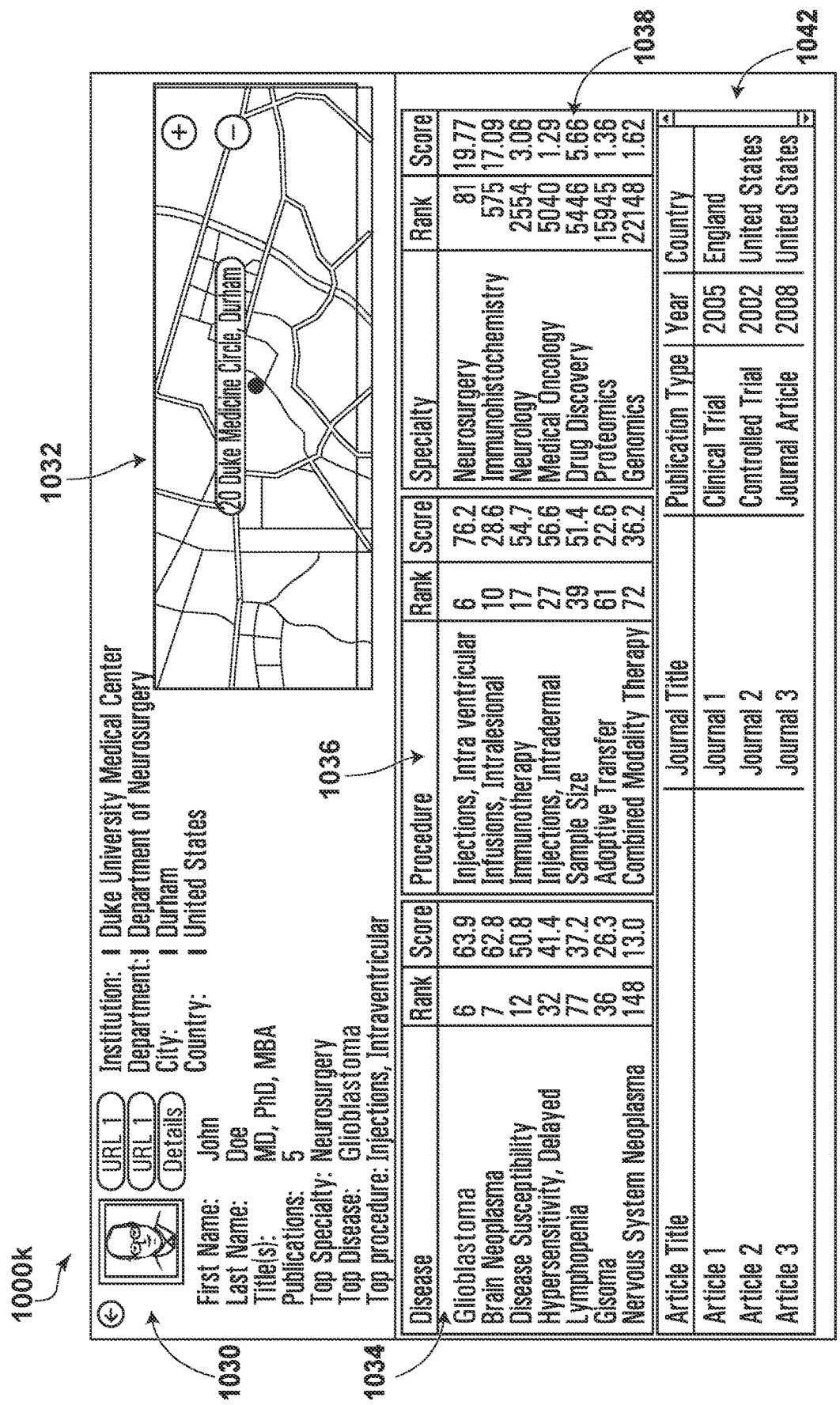
Figure 10L:
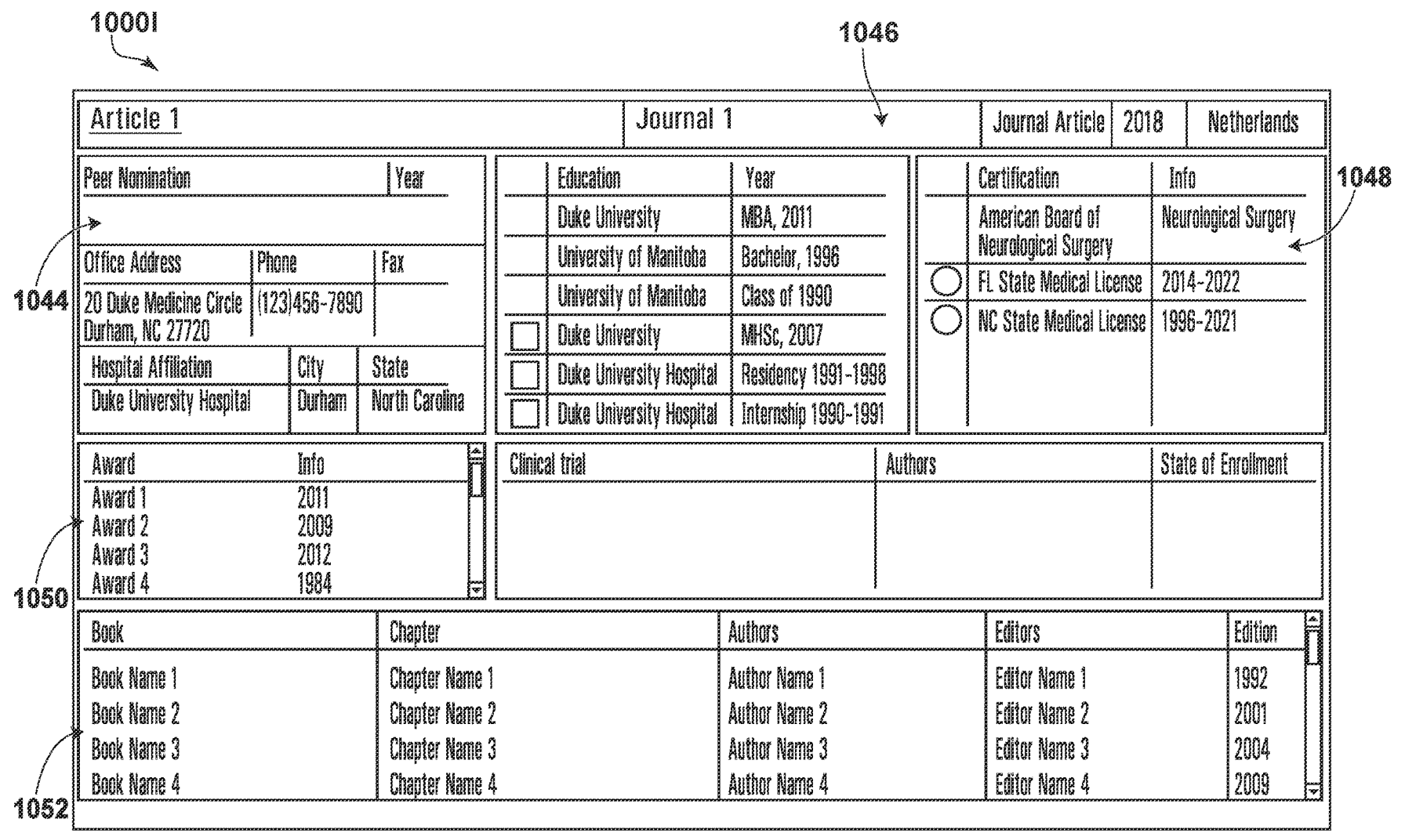
Figure 10M:
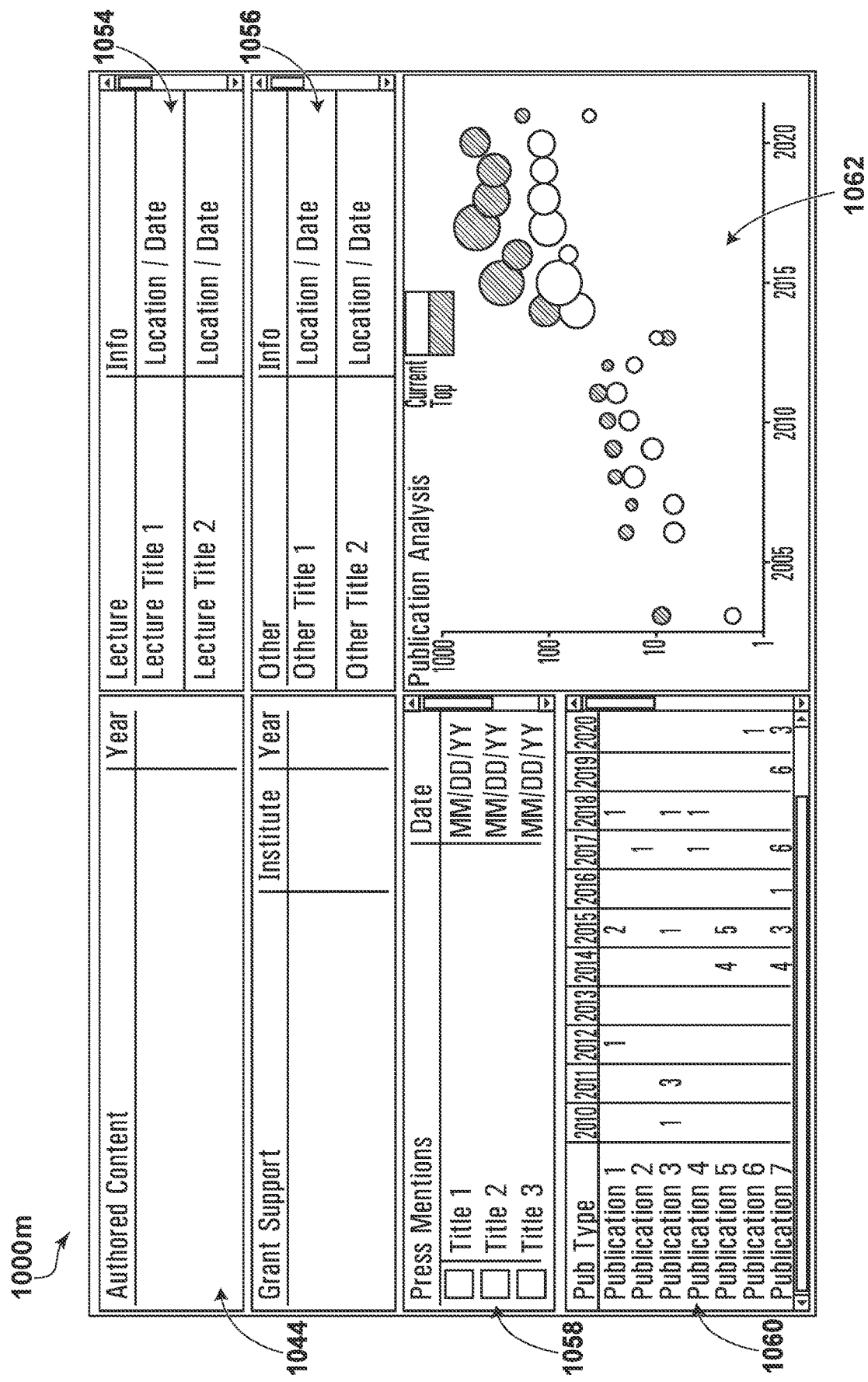
Figure 10N:
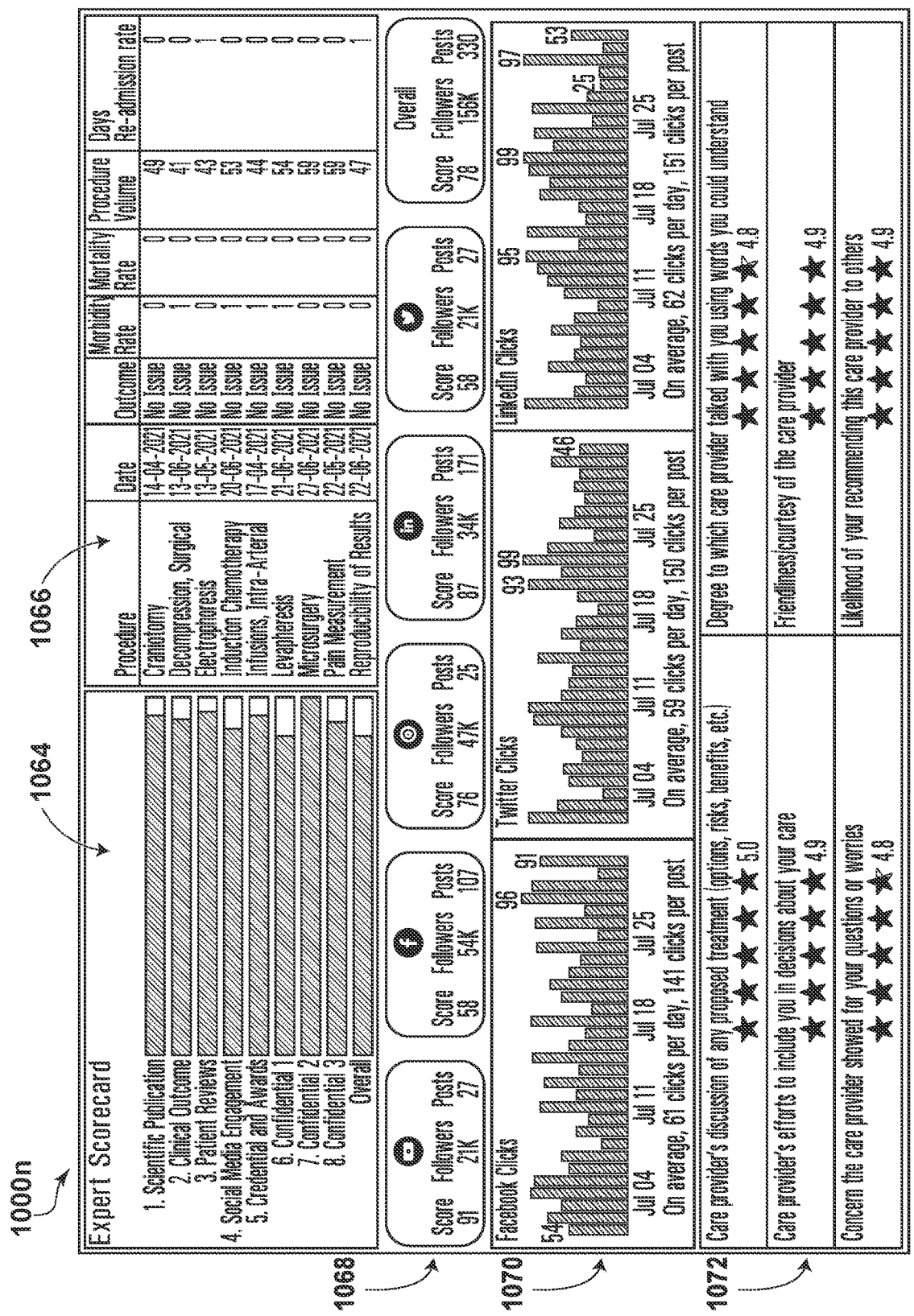

FIGS. 10A-10N show an example application for identifying, filtering and ranking medical experts.

In more detail, FIG. 10A shows an example search and filter GUI 1000a in which a user may select to filter for experts according to a disease 1002 (e.g., Glioblastoma). In turn, the system may perform acts 312a-316a of method 300a (FIG. 3A), as well as method 300b (FIG. 3B).

To this end, the ranking of the experts' 1004 may be generated based on determining the experts that are most well-regarded in the treatment of the selected disease 1002. The specialty ranking 1006 may indicate the medical specialties that are most pertinent to treating the disease 1004. The institutional ranking 1008 may be a ranking of the hospital which have resources to treat the disease.

In various cases, the institutional ranking may be generated based on considering factors such as: overall quality of the institution, the ranking of the medical practitioners that are employed at the hospital, etc. In some cases, the institutional rankings 1008 may be at least partially determined by: (i) identifying the experts associated with that institution (e.g., based on analyzing the expert-specific data); (ii) determine the expert-specific scores for these experts in relation to the selected filter criteria (act 314b of FIG. 3B), and (iii) aggregating the expert-specific scores to at least partially determine the institutional ranking, in relation to the search-filter criteria.

Similarly, the city ranking 1010 and country ranking 1012 may include a ranking of cities and countries based on the hospital and medical practitioners, located within that city of country, that are able to treat the selected disease 1002. In various cases, the city and country rankings 1010, 1012 may also be generated by aggregating expert-specific scores for experts associated with that city or country (e.g., as determined from expert-specific evaluation data).

In some cases, the GUI 1000a may also present an overview summary 1014 of all located results. The user may also be presented with a visualization 1016, showing the various locations of various ranked experts 1004.

Using the interface 1000a, a user may be enabled to further filter based on one or more scope limiting criteria. The scope limiting criteria can further filter experts based, for example, on institution and/or geographic region. In turn, the system can identify experts based on the scope limiting criteria (e.g., experts associated with a particular institution or located in a particular geographic region), and update the medical practitioner ranking according to the scope limiting criteria, and further update the GUI to display the filtered rankings.

For example, in the screenshots 1000b and 1000c of FIGS. 10B and 10C, respectively, a user may select a country 1018 (e.g., United States or Jordan). In turn, the software may update the interface to display only experts 1004, specialties 1006, institutions 1008 and cities 1010 that are relevant to that country selection. In some cases, as shown in the screenshot 1000d of FIG. 10D, a user may select more than one country 1018 (e.g., United States, Germany, France and Canada), and the interface may again update accordingly to display results 1004-1010 that are relevant to only the selected countries.

In some cases, the software may also enable the user to filter by city, such that the city is an additional scope limiting criteria. For example, as shown in screenshot 1000e of FIG. 10E, the user may make a city selection 1020 (e.g., New York). In turn, the ranked experts 1004, ranked specialties 1006, ranking institutions 1008 (as well as the general overview 1014) may again automatically update to identify and display only those results relevant to the city selection. In other cases, as best shown in screenshot 1000f of FIG. 10F, the city selection 1020 may include more than one city in the same or different countries (e.g., New York, Heidelberg and Toronto).

In another other cases, the scope limiting criteria may comprise the institution 1008. For example, as shown in screenshot 1000g of FIG. 10G, an institution selection 1022 may be made (e.g., the Mayo Clinic), and the interface may update the expert rankings 1004, specialty rankings 1006, city 1010, and country 1012 accordingly. In this manner, the user may be able to observe the relevant experts 1004 and specialties 1006 associated with the selected institution.

As discussed above, in various cases—a combination of search filter criteria and scope limiting criteria can be used to generate rankings. For instance, as shown in screenshots 1000h and 1000i of FIGS. 10H and 10I, respectively, a selection 1024 of the specialty 1006 may be made (e.g., neurosurgery or drug design) (e.g., the search filter criteria), and the worldwide results 1016 and 1008-1014 (e.g., the scope limiting criteria) may be accordingly updated to show the relevant ranked experts 1004 in that specialty, as well as the relevant institutions 1008, cities 1010 and countries 1012.

In screenshot 1000*j* of FIG. 10J, a specialty filter 1026 (e.g., search filter criteria) as well as further an institution filter 1028 (e.g., scope filter criteria) are selected. This, in turn, allows the software to filter and identify relevant experts 1004 according to the selected specialty, and limiting the scope to particular institutions.

As shown in screenshots 1000*k*-1000*n* of FIGS. 10K-10N, respectively, once a user selects an expert, the software may display details relevant to that expert. For example, this may include personal or biographical data 1030, a visual location indication 1032, the expert's score and ranking in respect of various diseases 1034, procedures 1036 and specialties 1038.

The interface may also show various other information, including published articles 1042, office location and institutional affiliation 1044, educational history 1046, certifications 1048, awards 1050, books and published chapters 1052, lectures 1054, other information 1056, press mentions 1058, and various details about their publications 1060, 1062. The interface may also include an expert scorecard 1064, procedure history information 1066, various social media-related data 1068 and 1070, as well as general ratings 1072.

As mentioned previously, this data may be generated by obtaining and analyzing various expert-specific evaluation data obtained from data sources 120 (FIG. 1). Accordingly, this interface may provide a holistic and condensed summary for the benefit of a user who is evaluating the expert.

In view of the above discussion, it will be appreciated that the disclosed embodiments—more than simply rating and ranking and experts—serve as a unified, consolidated and trusted searching platform for searching experts. By analyzing large data sets—received in real-time or near real-time—and using AI-powered (and/or non-AI powered) multi-dimensional analytics, users are able to enter search criteria, and the disclosed platform is able to match the user with relevant experts satisfying the search filter criteria. In doing so, the platform performs a significant function in demystifying the search process for users. For instance, users may quickly and reliably search for top medical experts in particular specialties and/or in treating particular diseases, and using the objective metrics provided by the platform. This, in turn, prevents recurring situations where users, deprived of a trusted search platform, may blindly approach medical experts for assistance, whereas such experts may not be otherwise qualified in the relevant specialty and/or treating the relevant disease. In many cases, these situations may result in harm to the user who is seeking medical treatment, and can be the source of medical malpractice claims against the medical practitioner.

It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

It should also be noted that the terms "coupled" or "coupling" as used herein can have several different meanings depending in the context in which these terms are used. For example, the terms coupled or coupling may be used to indicate that an element or device can electrically, optically, or wirelessly send data to another element or device as well as receive data from another element or device. Furthermore, the term "coupled" may indicate that two elements can be directly coupled to one another or coupled to one another through one or more intermediate elements.

It should be noted that terms of degree such as "substantially", "about" and "approximately" as used herein mean a reasonable amount of deviation of the modified term such that the end result is not significantly changed. These terms of degree may also be construed as including a deviation of the modified term if this deviation would not negate the meaning of the term it modifies.

In addition, as used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

Furthermore, any recitation of numerical ranges by endpoints herein includes all numbers and fractions subsumed within that range (e.g., 1 to 5 includes 1, 1.5, 2, 2.75, 3, 3.90, 4, and 5). It is also to be understood that all numbers and fractions thereof are presumed to be modified by the term "about" which means a variation of up to a certain amount of the number to which reference is being made if the end result is not significantly changed.

The terms "an embodiment," "embodiment," "embodiments," "the embodiment," "the embodiments," "one or more embodiments," "some embodiments," and "one embodiment" mean "one or more (but not all) embodiments of the present invention(s)," unless expressly specified otherwise.

The terms "including," "comprising" and variations thereof mean "including but not limited to," unless expressly specified otherwise. A listing of items does not imply that any or all of the items are mutually exclusive, unless expressly specified otherwise. The terms "a," "an" and "the" mean "one or more," unless expressly specified otherwise.

The example embodiments of the systems and methods described herein may be implemented as a combination of hardware or software. In some cases, the example embodiments described herein may be implemented, at least in part, by using one or more computer programs, executing on one or more programmable devices comprising at least one processing element, and a data storage element (including volatile memory, non-volatile memory, storage elements, or any combination thereof). These devices may also have at least one input device (e.g., a pushbutton keyboard, mouse, a touchscreen, and the like), and at least one output device (e.g., a display screen, a printer, a wireless radio, and the like) depending on the nature of the device. The devices may also have at least one communication device (e.g., a network interface).

It should also be noted that there may be some elements that are used to implement at least part of one of the embodiments described herein that may be implemented via software that is written in a high-level computer programming language such as object oriented programming. Accordingly, the program code may be written in C, C++ or any other suitable programming language and may comprise modules or classes, as is known to those skilled in object oriented programming. Alternatively, or in addition thereto, some of these elements implemented via software may be written in assembly language, machine language or firmware as needed. In either case, the language may be a compiled or interpreted language.

At least some of these software programs may be stored on a storage media (e.g., a computer readable medium such as, but not limited to, ROM, magnetic disk, optical disc) or a device that is readable by a general or special purpose programmable device.

The software program code, when read by the programmable device, configures the programmable device to operate in a new, specific and predefined manner in order to perform at least one of the methods described herein.

Furthermore, at least some of the programs associated with the systems and methods of the embodiments described herein may be capable of being distributed in a computer program product comprising a computer readable medium that bears computer usable instructions for one or more processors. The medium may be provided in various forms, including non-transitory forms such as, but not limited to, one or more diskettes, compact disks, tapes, chips, and magnetic and electronic storage.

The present invention has been described here by way of example only, while numerous specific details are set forth herein in order to provide a thorough understanding of the exemplary embodiments described herein. However, it will be understood by those of ordinary skill in the art that these embodiments may, in some cases, be practiced without these specific details. In other instances, well-known methods, procedures and components have not been described in detail so as not to obscure the description of the embodiments. Various modification and variations may be made to these exemplary embodiments without departing from the spirit and scope of the invention, which is limited only by the appended claims.

The invention claimed is:

1. A method for generating a ranking of a plurality of experts, the method comprising:
generating the ranking based on search filter criteria, wherein the ranking is generated by:
accessing evaluation data related to the plurality of experts, wherein,
one or more of a disambiguation model and a normalization model are applied to at least some of the evaluation data, the disambiguation and normalization models being trained machine learning models, and
the evaluation data is associated with one or more association factors; and
identifying evaluation data related to the search filter criteria, wherein the identification is based on the associations corresponding to the evaluation data; and
analyzing the identified evaluation data to generate expert-specific scores, for each of the plurality of experts; and
outputting the ranking of the plurality of experts based on the expert-specific scores.

2. The method of claim 1, wherein the association factors comprise associations with: (i) at least one evaluation data category, (ii) at least one taxonomy category, and (iii) at least one expert of the plurality of experts.

3. The method of claim 1, wherein generating the rankings based on the search filter criteria further comprises:
identifying taxonomy categories associated with the search filter criteria;
for each identified taxonomy category, determining (i) a subset of associated taxonomy-specific evaluation data, and (ii) one or more evaluation data categories associated with that evaluation data;
for each expert, of the plurality of experts,
in respect of each taxonomy category:
identifying, in the taxonomy-specific evaluation data, a subset of expert-specific evaluation data, for that expert;
in respect of each evaluation data category for that taxonomy category, analyzing the corresponding expert-specific evaluation data to determine a corresponding category score for that category; and
based on the category-specific scores, determining a taxonomy score for that taxonomy category; and
determining the expert-specific score, wherein the expert-specific score is based on the taxonomy scores for each of the taxonomy categories, for that expert.

4. The method of claim 3, wherein the taxonomy score is generated by combining the category-specific scores for that taxonomy category.

5. The method of claim 4, wherein each taxonomy score is generated by determining a weighted-combination of the corresponding category-specific scores.

6. The method of claim 3, wherein expert-specific score is determined by combining the taxonomy scores for each taxonomy category, for that expert.

7. The method of claim 6, wherein each expert-specific score is generated using a weighted-combination of each of the corresponding taxonomy scores.

8. The method of claim 1, wherein:
the disambiguation model is configured to generate classification labels for different text portions in the evaluation data; and
the normalization model is configured to normalize text portions, in the evaluation data, into a standardized format.

9. The method of claim 8, wherein the output of the disambiguation model is an input into the normalization model, and wherein,
the normalization model normalizes text portions based on the classification labels, generated for those text portions, by the disambiguation model.

10. The method of claim 1, wherein the model trained for the disambiguation and normalization models is a consolidated Bi-directional Encoder Representations from Transformers (BERT) model.

11. A system for generating a ranking of a plurality of experts, the system comprising:
at least one data storage storing associated evaluation data, the associated evaluation data comprising evaluation data associated with one or more association factors,
wherein one or more of a disambiguation model and a normalization model are applied to at least some of the evaluation data, the disambiguation and normalization models being trained machine learning models, and
at least one processor in communication with the at least one data storage, the at least one processor configured for:
generating a ranking of the plurality of experts based on search filter criteria, wherein the ranking is generated by:
identifying associated evaluation data, related to the search filter criteria;

analyzing the identified associated evaluation data to generate expert-specific scores, for each of the plurality of experts; and outputting the ranking of the plurality of experts based on the expert-specific scores.

12. The system of claim 11, wherein the association factors comprise associations with: (i) at least one evaluation data category, (ii) at least one taxonomy category, and (iii) at least one expert of the plurality of experts.

13. The system of claim 11, wherein generating the rankings based on the search filter criteria further comprises the at least one processor being further configured for:

identifying taxonomy categories associated with the search filter criteria;

for each identified taxonomy category, determining (i) a subset of associated taxonomy-specific evaluation data, and (ii) one or more evaluation data categories associated with that evaluation data;

for each expert, of the plurality of experts,
in respect of each taxonomy category:
identifying, in the taxonomy-specific evaluation data, a subset of expert-specific evaluation data, for that expert;
in respect of each evaluation data category for that taxonomy category, analyzing the corresponding expert-specific evaluation data to determine a corresponding category score for that category; and
based on the category-specific scores, determining a taxonomy score for that taxonomy category; and
determining the expert-specific score, wherein the expert-specific score is based on the taxonomy scores for each of the taxonomy categories, for that expert.

14. The system of claim 13, wherein determining the taxonomy score further comprises the at least one processor being configured for:

combining the category-specific scores for that taxonomy category.

15. The system of claim 14, wherein determining the taxonomy score further comprises the at least one processor being configured for:

determining a weighted-combination of the corresponding category-specific scores.

16. The system of claim 13, wherein determining the expert-specific score further comprises the at least one processor being configured for:

combining the taxonomy scores for each taxonomy category, for that expert.

17. The system of claim 16, wherein determining the expert-specific score further comprises the at least one processor being configured for:

determining a weighted-combination of each of the corresponding taxonomy scores.

18. The system of claim 11, wherein:

the disambiguation model is configured to generate classification labels for different text portions in evaluation data; and the normalization model is configured to normalize text portions, in the evaluation data, into a standardized format.

19. The system of claim 18, wherein the output of the disambiguation model is an input into the normalization model, and wherein, the normalization model normalizes text portions based on the classification labels, generated for those text portions, by the disambiguation model.

20. The system of claim 11, wherein the model trained for the disambiguation and normalization models is a consolidated Bi-directional Encoder Representations from Transformers (BERT) model.

* * * * *